(12) United States Patent
Hitomi et al.

(10) Patent No.: US 7,182,050 B2
(45) Date of Patent: Feb. 27, 2007

(54) CONTROL DEVICE FOR SPARK-IGNITION ENGINE

(75) Inventors: Mitsuo Hitomi, Fuchu-cho (JP);
Taketoshi Yamauchi, Fuchu-cho (JP);
Yoshiyuki Shinya, Fuchu-cho (JP);
Kouji Sumida, Fuchu-cho (JP);
Takayoshi Hayashi, Fuchu-cho (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 10/472,523

(22) PCT Filed: Jan. 31, 2003

(86) PCT No.: PCT/JP03/00961

§ 371 (c)(1),
(2), (4) Date: Apr. 15, 2004

(87) PCT Pub. No.: WO03/064837

PCT Pub. Date: Aug. 7, 2003

(65) Prior Publication Data

US 2004/0168655 A1    Sep. 2, 2004

(30) Foreign Application Priority Data

| Jan. 31, 2002 | (JP) | 2002-024548 |
| Feb. 6, 2002 | (JP) | 2002-029836 |
| Jun. 25, 2002 | (JP) | 2002-185242 |
| Aug. 6, 2002 | (JP) | 2002-228790 |
| Aug. 12, 2002 | (JP) | 2002-234589 |
| Aug. 12, 2002 | (JP) | 2002-235206 |
| Sep. 24, 2002 | (JP) | 2002-278022 |
| Sep. 26, 2002 | (JP) | 2002-281293 |
| Sep. 30, 2002 | (JP) | 2002-287886 |
| Oct. 4, 2002 | (JP) | 2002-292875 |
| Oct. 8, 2002 | (JP) | 2002-294835 |
| Nov. 21, 2002 | (JP) | 2002-338214 |

(51) Int. Cl.
*F02B 41/34* (2006.01)

(52) U.S. Cl. .................. 123/58.8; 123/698

(58) Field of Classification Search ............... 123/58.8, 123/698, 703, 295, 308
See application file for complete search history.

(56) References Cited

U.S. PATENT DOCUMENTS 4,041,910 A * 8/1977 Houseman ................. 123/58.8
(Continued)

FOREIGN PATENT DOCUMENTS

JP         59-49742        4/1984
(Continued)

OTHER PUBLICATIONS

International Search Report for PCT-JP03-00961.
(Continued)

*Primary Examiner*—Stephen K. Cronin
*Assistant Examiner*—Jason Benton
(74) *Attorney, Agent, or Firm*—Nixon Peabody LLP; Donald R. Studebaker

(57) ABSTRACT

The invention is intended to provide improved emission-cleaning performance by use of a three-way catalyst alone, without the need for a lean NOx catalyst, while ensuring a fuel economy improvement effect of lean burn operation. A multicylinder spark-ignition engine is constructed such that, in a pair of preceding and following cylinders whose exhaust and intake strokes overlap each other, burned gas discharged from the preceding cylinder (2A, 2D) which is currently in the exhaust stroke is introduced directly into the following cylinder (2B, 2C) which is currently in the intake stroke through an intercylinder gas channel (22) and gas discharged from only the following cylinder (2B, 2C) is led to an exhaust passage (20) provided with a three-way catalyst (24) in a low-load, low-speed operating range. Fuel supply to the individual cylinders is controlled in such a manner that combustion in the preceding cylinder (2A, 2D) is made under lean mixture conditions at an air-fuel ratio larger than the stoichiometric air-fuel ratio by a specific amount and combustion in the following cylinder (2B, 2C) is made under conditions of the stoichiometric air-fuel ratio created by supplying fuel to the burned gas introduced from the preceding cylinder (2A, 2D).

26 Claims, 29 Drawing Sheets

U.S. PATENT DOCUMENTS

| | | | | |
|---|---|---|---|---|
| 4,159,700 | A * | 7/1979 | McCrum | 123/58.8 |
| 4,194,472 | A * | 3/1980 | Amano et al. | 123/274 |
| 4,237,832 | A * | 12/1980 | Hartig et al. | 123/58.8 |
| 6,178,933 | B1 * | 1/2001 | Lavy | 123/58.8 |
| 6,328,003 | B1 * | 12/2001 | Gaertner et al. | 123/58.8 |
| 6,427,644 | B1 * | 8/2002 | Dabadie et al. | 123/58.8 |
| 6,431,128 | B1 * | 8/2002 | Dabadie | 123/58.8 |
| 6,877,464 | B2 * | 4/2005 | Hitomi et al. | 123/58.8 |
| 2001/0017123 | A1 | 8/2001 | Raab et al. | |

FOREIGN PATENT DOCUMENTS

| | | |
|---|---|---|
| JP | 03-145557 | 6/1991 |
| JP | 06-257477 | 9/1994 |
| JP | 07-269381 | 10/1995 |
| JP | 11-343874 | 12/1999 |
| JP | 2000-320333 | 11/2000 |
| JP | 2001-082229 | 3/2001 |
| JP | 2001-152919 | 5/2001 |
| JP | 2001-159338 | 6/2001 |
| JP | 2001-207887 | 8/2001 |
| JP | 2002-130006 | 5/2002 |
| JP | 2002-155780 | 5/2002 |

OTHER PUBLICATIONS

Notice for Reasons for Rejection dated Jun. 27, 2006 for Japanese Patent Application No. 2002-278022.

Notice of Reasons for Rejection dated Jun. 27, 2005 for Japanese Patent Application No. 2002-287886.

* cited by examiner

FIG.7
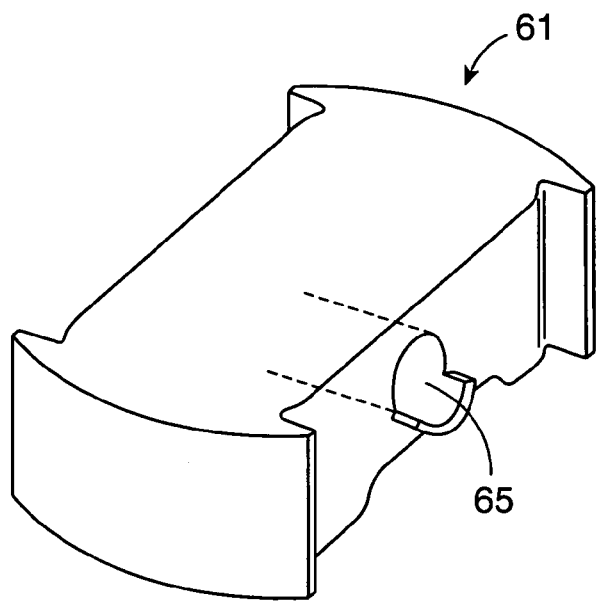
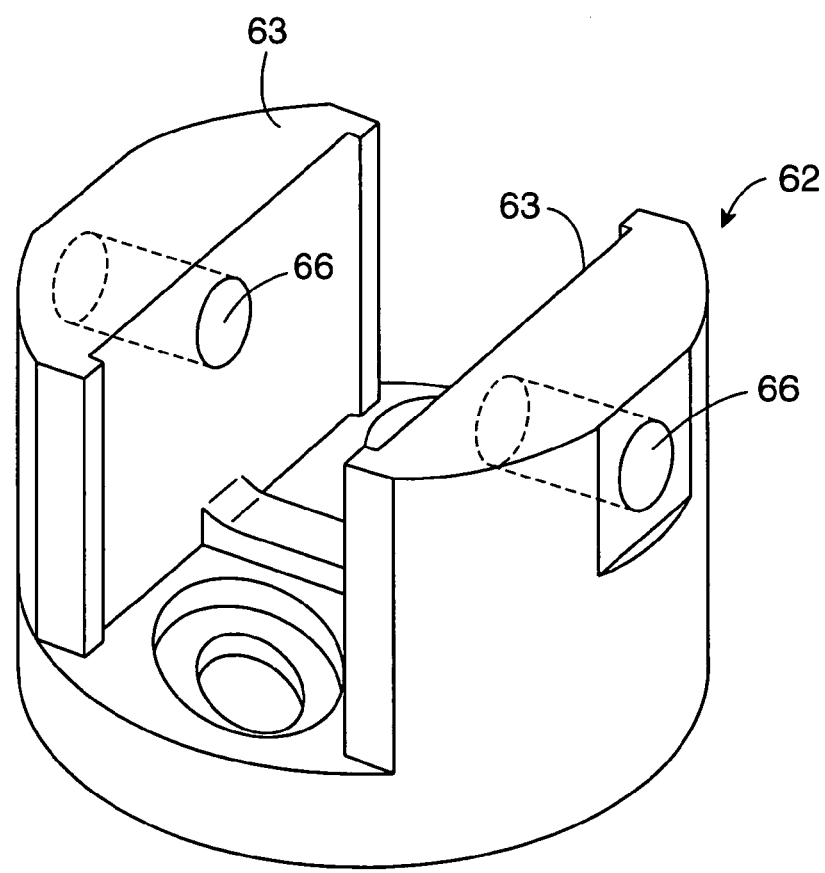

CONTROL DEVICE FOR SPARK-IGNITION ENGINE

TECHNICAL FIELD

This invention relates to a control device for a spark-ignition engine. More particularly, the invention pertains to a device for controlling combustion state in individual cylinders to improve fuel economy and characteristics of emissions in a multicylinder engine.

BACKGROUND ART

There exists a conventionally known technique for achieving an improvement in fuel economy by performing combustion in a state of "lean" air-fuel ratio in which air-fuel mixture in individual cylinders of a spark-ignition engine is burnt at an air-fuel ratio larger than the stoichiometric air-fuel ratio. One example of this kind is shown in Japanese Unexamined Patent Publication No. H10-274085, which employs fuel injectors for injecting fuel directly into combustion chambers to cause stratified charge combustion by injecting fuel during a compression stroke in a low-speed, low-load range, for example, to thereby accomplish extremely lean mixture combustion.

In this kind of engine, it is impossible to achieve sufficient emission-cleaning performance with respect to nitrogen oxides (NOx) under lean burn operating conditions by using an ordinary three-way catalyst alone, which is a catalyst having high performance to convert hydrocarbons (HC), carbon monoxide (CO) and NOx at about the stoichiometric air-fuel ratio, as an emission-cleaning converter. Therefore, as shown in the aforementioned Publication, the engine is provided with a lean NOx catalyst which adsorbs NOx in an oxygen-rich atmosphere and releases and reduces NOx in an atmosphere where oxygen concentration has decreased. If the amount of NOx adsorbed by the lean NOx catalyst has increased under the lean burn operating conditions when the lean NOx catalyst of this kind is being used, the fuel is injected not only for primary combustion but an additional amount of fuel is injected during an expansion stroke to decrease the air-fuel ratio and generate CO for accelerating release and reduction of NOx as shown in the aforementioned Publication, for example.

The aforementioned engine which performs conventional lean burn operation requires the lean NOx catalyst to provide NOx-converting performance during the lean burn operating conditions. This type of engine also requires the three-way catalyst for cleaning emissions in such engine operating ranges as a high-load range in which the engine is operated at the stoichiometric air-fuel ratio. The lean NOx catalyst provided along with the three-way catalyst needs to have a relatively large capacity to provide a capability to adsorb a certain amount of NOx and is expensive as compared to the three-way catalyst, so that the provision of this lean NOx catalyst is disadvantageous from the viewpoint of product cost.

In addition, it is necessary to temporarily decrease the air-fuel ratio by feeding additional amounts of fuel to accelerate release and reduction of NOx at specific intervals of time when the amount of NOx adsorbed increases as stated above in order to maintain the converting performance of the lean NOx catalyst. This would jeopardize fuel economy improvement effect offered by lean burn operation.

Furthermore, the lean NOx catalyst is susceptible to poisoning by sulfurization when used fuel contains high sulfur content. The lean NOx catalyst should therefore be subjected to regeneration treatment, such as catalyst heating and feeding of a reducing agent, to prevent this sulfur-poisoning problem. This regeneration treatment of the lean NOx catalyst is likely to cause a reduction in the fuel economy improvement effect and deterioration of its durability.

The invention has been made in consideration of the aforementioned problems of the prior art. Accordingly, it is an object of the invention to provide a control device of a spark-ignition engine capable of providing improved emission-cleaning performance by use of a three-way catalyst alone, without the need for a lean NOx catalyst, while ensuring a fuel economy improvement effect of lean burn operation.

DISCLOSURE OF THE INVENTION

A control device of the invention is for use in a multicylinder spark-ignition engine of which individual cylinders go through successive cycles of intake, compression, expansion and exhaust strokes with specific phase delays, in which fresh air and gas flow paths are connected to form a two-cylinder interconnect configuration at least in a low-load, low-speed operating range such that, in a pair of preceding and following cylinders whose exhaust and intake strokes overlap each other, burned gas discharged from the preceding cylinder which is currently in the exhaust stroke is introduced directly into the following cylinder which is currently in the intake stroke through an intercylinder gas channel and gas discharged from only the following cylinder is led to an exhaust passage provided with a three-way catalyst. The control device comprises a controller for controlling fuel supply to the individual cylinders in such a manner that combustion in the preceding cylinder is made under lean mixture conditions at an air-fuel ratio larger than the stoichiometric air-fuel ratio by a specific amount, fuel for the following cylinder is supplied to the burned gas generated by combustion in the preceding cylinder, and combustion in the following cylinder is made under conditions of the stoichiometric air-fuel ratio when the engine is in the two-cylinder interconnect configuration.

In this construction, combustion in the preceding cylinder is made at a "lean" air-fuel ratio at least in the low-load, low-speed operating range so that a significant fuel economy improvement effect is achieved due to an increase in thermal efficiency and a reduction in pumping loss and the amount of NOx generated in the preceding cylinder is kept to a relatively low level. On the other hand, since the burned gas is introduced from the preceding cylinder into the following cylinder, a condition equivalent to what would occur when a great deal of exhaust gas is introduced by exhaust gas recirculation (EGR) is created in the following cylinder. As a result, pumping loss is reduced and NOx emission is sufficiently decreased in the following cylinder. In addition, since combustion in the following cylinder is made under conditions of the stoichiometric air-fuel ratio created by supplying the fuel to the burned gas, sufficient emission-cleaning performance is achieved by the three-way catalyst alone and the provision of a lean NOx catalyst becomes unnecessary.

While high-temperature gas discharged from the preceding cylinder passes through the intercylinder gas channel, gas temperature is regulated by moderate heat dissipation along its length. Because this gas in which the burned gas and excess air are mixed and dispersed uniformly is introduced into the following cylinder, an ideal condition is created for introduction of a great deal of EGR gas. In addition, since the fuel is injected into the gas at a relatively high temperature, evaporation of the fuel is accelerated and combustion in the following cylinder is performed in a desirable fashion.

In the control device for the spark-ignition engine of the invention, two cylinders may constitute the aforesaid pair of the preceding and following cylinders if the exhaust stroke of one cylinder perfectly coincides in timing with the intake stroke of the other cylinder, or if the exhaust stroke of one cylinder precedes and coincides in part with the intake stroke of the other cylinder. If the preceding and following cylinders meet these conditions, the burned gas discharged from the preceding cylinder is smoothly introduced into the following cylinder through the intercylinder gas channel and pumping loss is effectively reduced.

Preferably, the control device further comprises a flow path switcher for switching the fresh air and gas flow paths to form an independent cylinder configuration in a high-load, high-speed operating range, in which intake ports and exhaust ports of the individual cylinders work independently of one another such that fresh air is introduced through an intake passage into the intake ports of the individual cylinders and exhaust gas discharged through the exhaust ports of the individual cylinders is led to the exhaust passage, wherein the aforementioned controller makes the air-fuel ratio in the individual cylinders equal to or smaller than the stoichiometric air-fuel ratio in the high-load, high-speed operating range.

This construction serves to improve fuel economy and characteristics of emissions in the low-load, low-speed operating range and to ensure engine output performance in the high-load, high-speed operating range.

It is preferable in the above construction that the preceding cylinder be provided with an intake port connected to the intake passage, a first exhaust port connected to the exhaust passage and a second exhaust port connected to the intercylinder gas channel, the following cylinder be provided with a first intake port connected to the intake passage, a second intake port connected to the intercylinder gas channel and an exhaust port connected to the exhaust passage, and the flow path switcher include a valve stop mechanism which individually switches first and second exhaust valves for opening and closing the first and second exhaust ports of the preceding cylinder as well as first and second intake valves for opening and closing the first and second intake ports of the following cylinder between activated and deactivated states, and a valve stop mechanism controller which sets the first exhaust valve and the first intake valve to the deactivated state and the second exhaust valve and the second intake valve to the activated state in the low-speed, low-load operating range, and sets the first exhaust valve and the first intake valve to the activated state and the second exhaust valve and the second intake valve to the deactivated state in the high-load, high-speed operating range.

This construction makes it possible to easily switch the fresh air and gas flow paths in a manner suited for the low-speed, low-load operating range and the high-load, high-speed operating range by controlling the valve stop mechanism.

Preferably, the engine is made switchable between special operation mode in which combustion is made in the two-cylinder interconnect configuration and normal operation mode in which combustion is made with the intake ports and the exhaust ports of the individual cylinders working independently of one another according to engine operating conditions, and the control device further comprises an intake air pulsation detector for detecting intake air pulsations, wherein the control device judges at switching of the engine operation mode whether the fresh air and gas flow paths have been switched by the flow path switcher with reference to a sensing signal output from the intake air pulsation detector and performs air-fuel ratio control operation corresponding to the operation mode selected after switching of the flow paths following a point in time when the switching of the flow paths has been detected.

In this construction, the control device performs the air-fuel ratio control operation corresponding to the newly selected operation mode upon confirming the completion of the switching of the flow paths by the flow path switcher when the engine has been switched between the special operation mode and the normal operation mode.

In a case where the operation mode is switched according to the engine operating conditions as stated above, the control device should preferably judge that the switching of the flow paths has been completed at a point in time when a sudden change in the period of intake air pulsations is verified with reference to a sensing signal output from an intake air quantity detector for detecting the amount of intake air.

This construction makes it possible to exactly judge whether the switching of the flow paths has actually been done by detecting the change in the period of intake air pulsations occurring at the switching of the intake and exhaust flow paths with reference to the sensing signal output from the intake air quantity detector.

In checking the sudden change in the period of intake air pulsations in the aforementioned manner, it is preferable to judge that the switching of the flow paths from the two-cylinder interconnect configuration to the independent cylinder configuration has been done when it is verified that the period of intake air pulsations has become shorter.

According to this arrangement, the period of intake air pulsations becomes shorter as a result of an increase in the number of intake air pulsations per unit time when the intake and exhaust flow paths are switched from the two-cylinder interconnect configuration to the independent cylinder configuration creating a condition in which fresh air is introduced into the individual cylinders. It is possible to exactly judge that the switching from the two-cylinder interconnect configuration to the independent cylinder configuration has been done by the flow path switcher based on this change in the period of intake air pulsations.

It is preferable to change the intake and exhaust flow paths by varying the amount of valve lift determined by a valve actuating mechanism provided to each cylinder.

According to this arrangement, switching of the operation mode between the special operation mode and the normal operation mode is quickly done and the air-fuel ratio control operation corresponding to the operation mode selected after the switching of the flow paths is performed after it has been verified that operation for switching the flow paths by varying the amount of valve lift determined by the valve actuating mechanism provided to each cylinder has been completed with reference to the sensing signal output from the intake air pulsation detector.

In the case where the operation mode is switched according to the engine operating conditions as stated above, it is preferable to provide multiple pairs of the preceding and following cylinders of which intake and exhaust strokes overlap with each other and to perform the air-fuel ratio control operation corresponding to the operation mode selected after the switching of the flow paths in all the pairs of the preceding and following cylinders following a point in time when the switching of the flow paths has been first verified in one of the multiple pairs of the multiple pairs of the preceding and following cylinders.

According to this arrangement, the air-fuel ratio control operation corresponding to the operation mode selected after the switching of the flow paths is performed on all the pairs of the preceding and following cylinders at the point in time when the switching of the flow paths has been verified in one pair of the preceding and following cylinders with reference to sensing signal output from the intake air pulsation detector while the switching of the flow paths in the multiple pairs of the preceding and following cylinders is made in a specific order. As a consequence, the air-fuel ratio control operation corresponding to the newly selected operation mode is executed quickly and properly.

In the case where the operation mode is switched according to the engine operating conditions as stated above, it is preferable to judge that the flow paths have been switched at a point in time when a switching signal has been output to the flow path switcher following a change in the engine operating conditions and the occurrence of a change in intake air pulsations has been verified with reference to the sensing signal output from the intake air pulsation detector.

This arrangement makes it possible to prevent an incorrect judgment due to sensing errors of the intake air pulsation detector or noise contained in its sensing signal and perform the air-fuel ratio control operation corresponding to the operation mode selected after the switching of the flow paths after it has been exactly verified that the switching of the flow paths has been done in accordance with the aforementioned sensing signal.

If the control device is caused to begin preparation for executing the air-fuel ratio control operation after the switching of the engine operation mode at a point in time when it is verified that the flow path switching signal has been output to the flow path switcher, the air-fuel ratio control operation corresponding to the operation mode selected after the switching of the flow paths is quickly performed after it has been exactly verified that the switching signal has been output to the flow path switcher and the switching of the flow paths has been done as a result of the occurrence of a change in intake air pulsations according to the sensing signal output from the intake air pulsation detector.

Preferably, the control device of the invention further comprises an exhaust gas concentration detector disposed in the exhaust passage provided with the three-way catalyst for detecting the stoichiometric air-fuel ratio and an exhaust gas concentration detector disposed in the intercylinder gas channel for detecting a lean mixture state, wherein the controller feedback-controls the amounts of fuel injected into the individual cylinders based on values detected by the individual exhaust gas concentration detectors in such a manner that the air-fuel ratio in the preceding cylinder becomes larger than the stoichiometric air-fuel ratio by a specific amount and the air-fuel ratio in the following cylinder becomes equal to the stoichiometric air-fuel ratio when the engine is in the two-cylinder interconnect configuration.

This construction makes it possible perform such control operation high accuracy that produces a specific air-fuel ratio in the preceding cylinder and the stoichiometric air-fuel ratio in the following cylinder.

Preferably, the control device of the invention should be such that the engine has a fuel injector for injecting fuel directly into the preceding cylinder and the aforementioned controller causes stratified charge combustion to occur in the preceding cylinder by injecting the fuel during its compression stroke from the fuel injector while producing a lean mixture state therein when the engine is in the two-cylinder interconnect configuration.

In this construction, combustion in the preceding cylinder is made in a desirable fashion by stratification even at a "lean" air-fuel ratio.

If the engine is further provided with a fuel injector for injecting fuel directly into the following cylinder and the controller causes stratified charge combustion to occur in the following cylinder by injecting at least part of the fuel during its compression stroke while producing the stoichiometric air-fuel ratio therein when the engine is in the two-cylinder interconnect configuration, stratified charge combustion or slightly stratified charge combustion is produced in the following cylinder, so that combustion in the following cylinder is made in a desirable fashion even in a condition equivalent to what would occur when a great deal of exhaust gas is introduced by EGR operation.

Alternatively, the controller may cause uniform charge combustion to occur in the following cylinder while producing the stoichiometric air-fuel ratio therein when the engine is in the two-cylinder interconnect configuration. This is effective if it is possible to maintain ignitability even when the fuel is uniformly dispersed in the following cylinder due to a sufficiently high temperature of the burned gas introduced from the preceding cylinder into the following cylinder, for example.

The engine may be provided with a fuel injector disposed in an intake passage of the following cylinder for injecting fuel directly into the following cylinder, the intake passage constituting the intercylinder gas channel, and the controller may cause uniform charge combustion to occur in the following cylinder by injecting the fuel during its intake stroke while producing the stoichiometric air-fuel ratio therein when the engine is in the two-cylinder interconnect configuration.

According to this arrangement, heat of exhaust gas introduced from the preceding cylinder into the following cylinder is moderately dissipated, and the fuel is supplied to a great deal of ideal EGR gas in which excess air and burned gas are mixed, so that mixing of the fuel with the EGR gas and evaporation of the fuel are accelerated and combustibility in the following cylinder is improved with a great deal of EGR gas introduced thereinto. As a result, emission and fuel economy performance is improved and the possibility of self-ignition operation of the following cylinder is increased due to improvements in mixability of the burned gas, air and fuel and in evaporability of the fuel even when a great deal of exhaust gas is introduced by EGR operation.

When the engine is in the two-cylinder interconnect configuration, it is preferable to make the air-fuel ratio in the preceding cylinder approximately equal to twice the stoichiometric air-fuel ratio or larger. This arrangement serves to sufficiently increase fuel economy improvement effect gained by the "lean" air-fuel ratio, prevent the amount of excess air in the burned gas introduced into the following cylinder from becoming too small, and ensure combustibility in the following cylinder.

Preferably, the control device of the invention should be such that the controller includes a total fuel injection quantity calculator for calculating the sum of the amounts of fuel to be injected into the preceding cylinder and the following cylinder based on the amount of intake air introduced into the preceding cylinder in such a manner that combustion in the preceding cylinder is made under the lean mixture conditions at the air-fuel ratio larger than the stoichiometric air-fuel ratio by the specific amount and combustion in the following cylinder is made under the conditions of the stoichiometric air-fuel ratio when the engine is in the two-cylinder interconnect configuration, a ratio setter for setting a ratio of the air-fuel ratio for the preceding cylinder to the air-fuel ratio for the following cylinder according to engine operating conditions in such a manner that a balance is achieved between a torque generated by the preceding cylinder and a torque generated by the following cylinder when the engine is in the two-cylinder interconnect configuration, and a final fuel injection quantity calculator for calculating final amounts of fuel to be injected into the preceding cylinder and the following cylinder based on the ratio of the air-fuel ratios set by the ratio setter and the sum of the amounts of fuel to be injected calculated by the total fuel injection quantity calculator.

In this construction, the amounts of fuel to be injected into the preceding cylinder and the following cylinder is determined as described above and the amounts of fuel so determined are injected such that a balance is achieved between the torques generated by the preceding cylinder and the following cylinder in the special operation mode in which combustion is made in the two-cylinder interconnect configuration. Consequently, the occurrence of a difference in the torques generated by the preceding cylinder and the following cylinder due to a difference in thermal efficiency including pumping loss is avoided or suppressed.

The ratio of the air-fuel ratios set by the ratio setter may be determined based on a parameter concerning pumping loss or thermal efficiency of the preceding cylinder and the following cylinder. The aforementioned ratio of the air-fuel ratios may be determined from data on experimentally obtained torques generated by the preceding cylinder and the following cylinder or from parameters concerning the pumping loss and thermal efficiency of the preceding cylinder and the following cylinder.

Preferably, the aforementioned controller further includes a combustibility judgment section for judging in advance whether the state of combustion in the preceding cylinder and the following cylinder predicted based on the ratio of the air-fuel ratios obtained by the ratio setter falls in a normally combustible range, wherein the final fuel injection quantity calculator calculates the final amounts of fuel to be injected based on the ratio of the air-fuel ratios set by the ratio setter only if the judgment result of the combustibility judgment section is in the affirmative.

In this construction, calculation of the amounts of fuel to be injected based on the ratio of the air-fuel ratios determined as described above is prohibited so that the occurrence of misfire or abnormal combustion (knocking) can be avoided if it is difficult to make normal combustion in the preceding cylinder or the following cylinder according to that ratio of the air-fuel ratios even when the ratio of the air-fuel ratios which could theoretically achieve a torque balance between the preceding cylinder and the following cylinder has been obtained.

If the judgment result of the combustibility judgment section is in the negative, the final fuel injection quantity calculator should preferably calculate the final amounts of fuel to be injected into the individual cylinders based on a ratio preset within a range in which normal combustion can be made in the individual cylinders. This arrangement serves to prevent the occurrence of misfire and abnormal combustion and make normal combustion in the preceding cylinder and the following cylinder.

Preferably, the aforementioned controller further includes an ignition controller for selecting whether to produce combustion in the following cylinder by compressed self-ignition or by forced ignition according to the engine operating conditions when the engine is in the two-cylinder interconnect configuration, wherein the ratio setter varies the ratio of the air-fuel ratios to be set depending on whether combustion is made by compressed self-ignition or by forced ignition.

In this construction, the difference in the torques generated by the preceding cylinder and the following cylinder would increase when combustion in the following cylinder is made by compressed self-ignition in the special operation mode, because the thermal efficiency in the following cylinder is improved. Since a ratio of the air-fuel ratios different from that for a case where compressed self-ignition is not performed, or a ratio determined taking into account the improvement in the thermal efficiency in the following cylinder, is set, however, the occurrence of a difference in the torques generated by the preceding cylinder and the following cylinder is avoided or suppressed as in the case where compressed self-ignition is not performed.

Preferably, the control device of the invention should be such that the engine is controlled in a manner that makes combustion by compressed self-ignition in the following cylinder at least in part of an operating range in which the engine is in the two-cylinder interconnect configuration and, when the engine is in the operating range in which the two-cylinder interconnect configuration is formed and the engine is still in a specific low-temperature state in which the temperature in the following cylinder is judged to have not reached a level suitable for combustion by compressed self-ignition, the air-fuel ratio in the following cylinder is made substantially equal to the stoichiometric air-fuel ratio to make combustion by forced ignition therein, whereas the air-fuel ratio in the preceding cylinder is made larger than a case where combustion is made by compressed self-ignition in the following cylinder.

According to this arrangement, a mixture in an entire combustion chamber of the following cylinder burns up in an instant when combustion by compressed self-ignition is made therein, so that it is possible to prevent delayed combustion which would not produce any work and gain a high fuel economy improvement effect. When the engine is still in the low-temperature state in which the temperature in the following cylinder has not reached the level suitable for combustion by compressed self-ignition and combustion by forced ignition is made in the following cylinder, thermal efficiency is improved because the air-fuel ratio in the preceding cylinder is increased. Since the total amount of fuel injected into the preceding cylinder and the following cylinder is kept constant if the amount of intake air remains constant, the amount of fuel injected into the following cylinder increases by as much as the amount of fuel injected into the preceding cylinder is reduced for increasing the air-fuel ratio. Nevertheless, evaporation of the fuel is accelerated in the following cylinder, resulting in an improvement in combustibility, and pumping loss in the following cylinder becomes smaller than in the preceding cylinder because what is introduced into the following cylinder is the high-temperature burned gas led from the preceding cylinder. By increasing the proportion of the fuel combusted in the following cylinder in this manner, it is possible to swiftly increase the temperature in the following cylinder and transfer it to a state of combustion by compressed self-ignition soon while achieving a further improvement in overall fuel economy.

Preferably, the air-fuel ratio in the preceding cylinder is set such that the excess-air factor becomes equal to or larger than 3 and stratified charge combustion is made in the preceding cylinder when the engine is in the specific low-temperature state.

According to this arrangement, it is possible to significantly improve thermal efficiency and obtain a remarkable fuel economy improvement effect by making the excess-air factor in the preceding cylinder equal to or larger than 3 to produce an extremely "lean" air-fuel ratio of approximately 50, for example. Compared to a case where one-half of the total amount of fuel is supplied to the following cylinder, for example, the amount of fuel supplied to the following cylinder is increased by 30% or more in this arrangement. This provides a great contribution to fuel economy improvement and serves to quickly increase the temperature in the following cylinder. It is to be pointed out that even if the following cylinder is set to such an extremely "lean" air-fuel ratio, it is possible to produce a state of stable combustion in the following cylinder by making stratified charge combustion in which fuel concentration around a spark plug at an ignition point is increased.

Preferably, the air-fuel ratio in the preceding cylinder is made relatively large in a specific low-load region of the operating range in which the engine is in the two-cylinder interconnect configuration compared to a higher-load region.

According to this arrangement, the lower the engine load, the larger the air-fuel ratio in the preceding cylinder is made in the aforementioned specific low-load region, resulting in a further improvement in fuel economy.

Preferably, control operation for the aforementioned specific low-temperature state should be performed when the engine is at or close to its idling speed. This makes it possible to achieve stable combustion free of misfire and produce a high fuel economy improvement effect by swiftly increasing the temperature in the following cylinder even when the engine is in the low-load, low-speed operating range in which the engine is at or close to its idling speed.

BRIEF DESCRIPTION OF THE DRAWINGS

FIG. 7 is a perspective diagram showing the specific construction of a center tappet and a side tappet;

BEST MODE FOR CARRYING OUT THE INVENTION

Embodiments of the present invention are now described with reference to the drawings.

Figure 1:
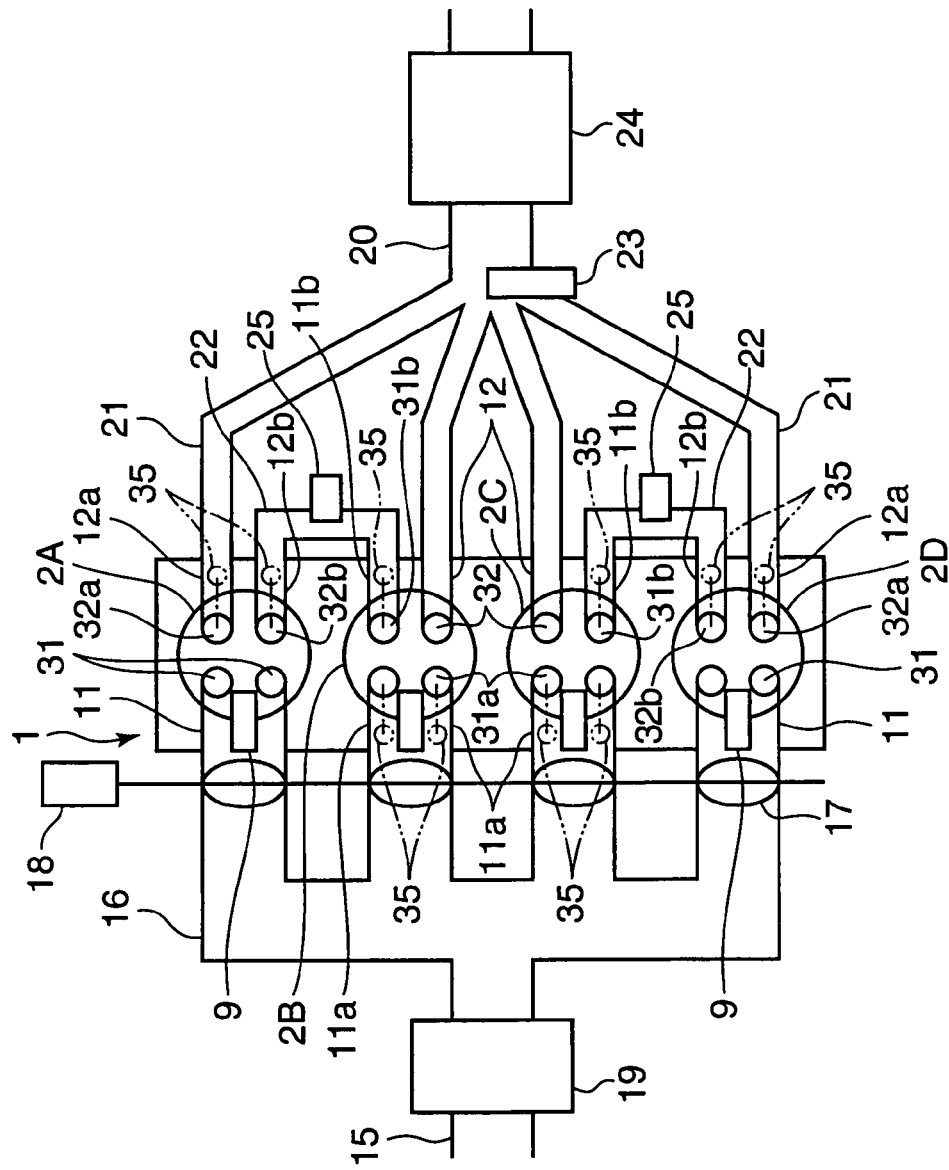
FIG. 1 is a general plan view of an entire engine provided with a control device according to an embodiment the invention.
Figure 2:
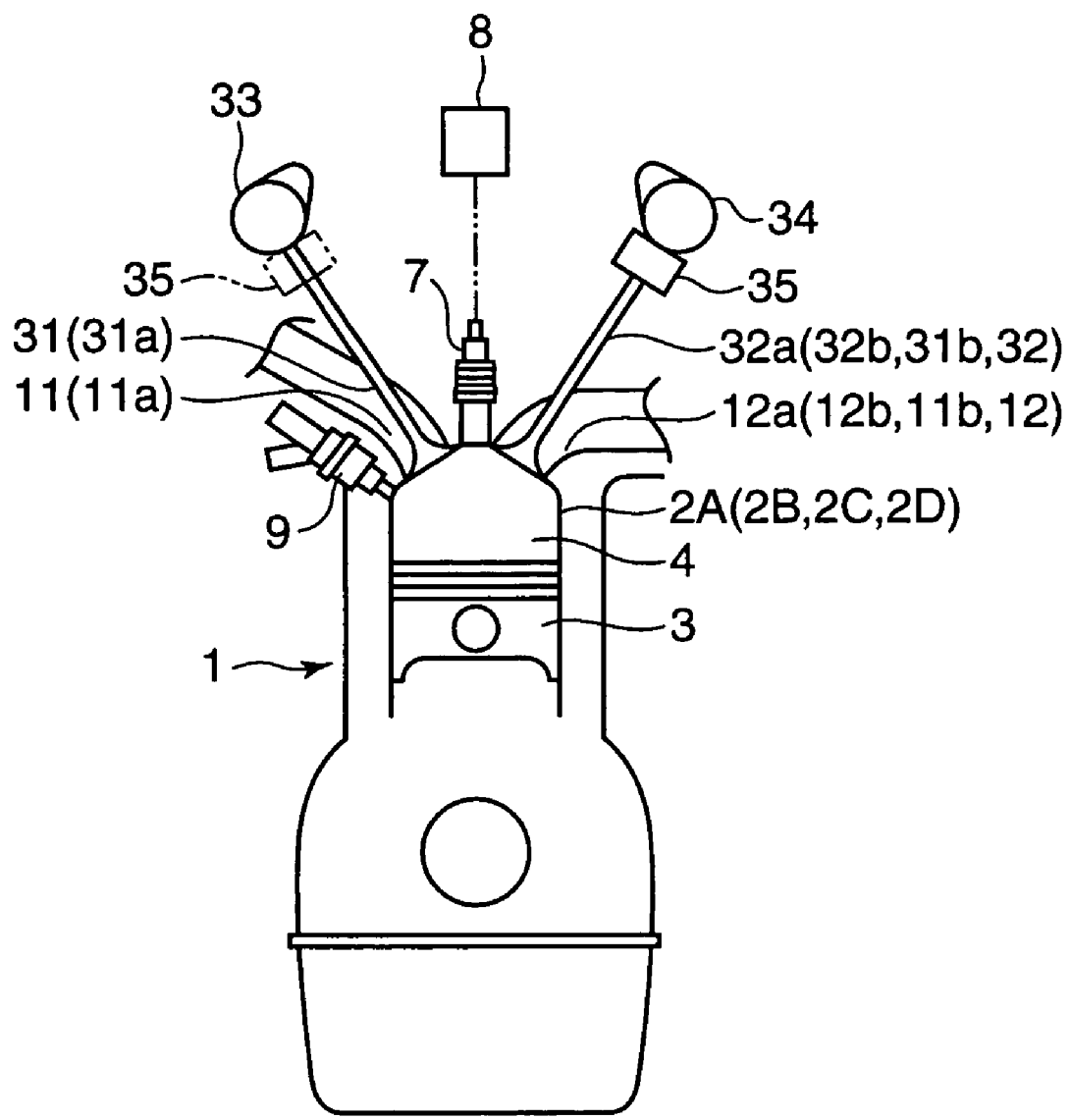
FIG. 2 is a schematic cross-sectional view of an engine body and associated elements.

FIG. 1 shows the general construction of an engine provided with a control device according to an embodiment the invention, and FIG. 2 generally shows the construction of one cylinder of an engine body, intake and exhaust valves provided in the cylinder, etc. Referring to these Figures, the engine body 1 has a plurality of cylinders. Specifically, it has four cylinders designated 2A to 2D in the illustrated embodiment, with one each piston 3 fitted in the individual cylinders 2A–2D and a combustion chamber 4 formed above the piston 3.

There is provided a spark plug 7 at the top of the combustion chamber 4 in each cylinder 2 in such a way that a far end of the spark plug 7 is located inside the combustion chamber 4. The spark plug 7 is connected to an ignition circuit 8 which permits electronic control of ignition timing.

On one side of the combustion chamber 4 of each cylinder 2, there is provided a fuel injector 9 for injecting fuel directly into the combustion chamber 4. The fuel injector 9 incorporates a needle valve and a solenoid which are not illustrated. Driven by a later-described pulse signal input, the fuel injector 9 causes its needle valve to open at pulse input timing during a period corresponding to the pulselength of the pulse signal and injects a specific amount of fuel determined by the valve open period. Although not illustrated, the fuel is supplied from a fuel pump to the fuel injector 9 through a fuel-feeding passage, a fuel-feeding system being so constructed to provide a fuel pressure higher than the internal pressure of the combustion chamber 4 in each compression stroke.

Intake ports 11, 11a, 11b and exhaust ports 12, 12a, 12b open to the combustion chambers 4 of the individual cylinders 2A–2D. An intake passage 15 and an exhaust passage 20 are connected to these ports which are opened and closed by intake valves 31, 31a, 31b and exhaust valves 32, 32a, 32b, respectively.

Figure 9:
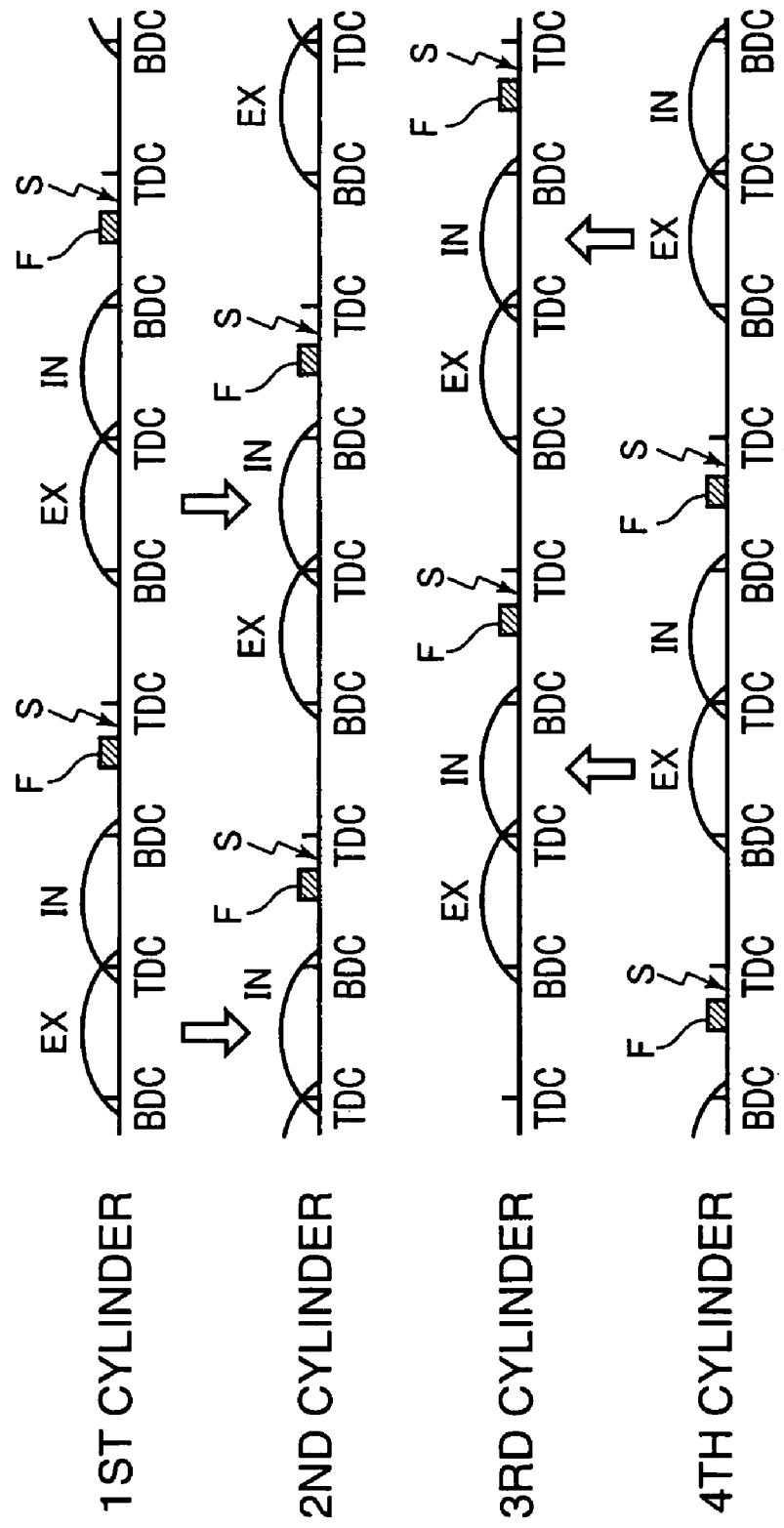
FIG. 9 is a diagram showing timing of exhaust strokes and intake strokes as well as fuel injection timing and ignition timing of individual cylinders.

The individual cylinders 2A–2D go through successive cycles of intake, compression, expansion and exhaust strokes with specific phase delays. In the four-cylinder engine, of which cylinders 2A–2D are hereinafter referred to as the first cylinder 2A, the second cylinder 2B, the third cylinder 2C and the fourth cylinder 2D as viewed from one end of cylinder bank, the aforementioned cycles are carried out in the order of the first cylinder 2A, the third cylinder 2C, the fourth cylinder 2D and the second cylinder 2B with a successive phase delay of 180° as shown in FIG. 9, in which "EX" designates exhaust strokes, "IN" designates intake strokes, "F" designates fuel injection and "S" designates ignition.

There is provided an intercylinder gas channel 22 between two cylinders of which exhaust and intake strokes overlap so that already burned gas can be led from the cylinder in the exhaust stroke (hereinafter referred to as the preceding cylinder in the present Description of the invention) to the cylinder in the intake stroke (hereinafter referred to as the following cylinder in the present Description of the invention) during a period of overlap of the exhaust and intake strokes. In the four-cylinder engine of the present embodiment, the exhaust stroke (EX) of the first cylinder 2A overlaps the intake stroke (IN) of the second cylinder 2B and the exhaust stroke (EX) of the fourth cylinder 2D overlaps the intake stroke (IN) of the third cylinder 2C as shown in FIG. 9. Therefore, the first cylinder 2A and the second cylinder 2B constitute one cylinder pair while the fourth cylinder 2D and the third cylinder 2C constitute another cylinder pair, the first cylinder 2A and the fourth cylinder 2D being the preceding cylinders and the second cylinder 2B and the third cylinder 2C being the following cylinders.

Specifically, the intake and exhaust ports 11, 11a, 11b, 12, 12a, 12b of the individual cylinders 2A–2D, the intake and exhaust channels 15, 20 and the intercylinder gas channels 22 connected to them are configured as described in the following.

The intake ports 11 for introducing fresh air, the first exhaust ports 12a for letting out burned gas (exhaust gas) into the exhaust passage 20 and the second exhaust ports 12b for delivering the burned gas to the respective following cylinders are provided in the first cylinder 2A and the fourth cylinder 2D which are the preceding cylinders. In the second cylinder 2B and the third cylinder 2C which are the following cylinders, there are provided the first intake ports 11a for introducing fresh air, the second intake ports 11b for introducing the burned gas from the preceding cylinders 2A, 2D and the exhaust ports 12 for letting out the burned gas into the exhaust passage 20 are provided.

In the example shown in FIG. 1, two each intake ports 11 are provided in the first and fourth cylinders 2A, 2D and two each first intake ports 11a are provided in the second and third cylinders 2B, 2C in parallel arrangement on left half sides of the respective combustion chambers 4 as illustrated. Also, one each first exhaust port 12a and second exhaust port 12b are provided in the first and fourth cylinders 2A, 2D and one each second intake port 11b and exhaust port 12 are provided in the second and third cylinders 2B, 2C in parallel arrangement on right half sides of the respective combustion chambers 4 as illustrated.

Downstream ends of individual intake channels 16 branched out from the intake passage 15 are connected to the intake ports 11 of the first and fourth cylinders 2A, 2D or to the first intake ports 11a of the second and third cylinders 2B, 2C. Close to the downstream ends of the individual branched intake channels 16, there are provided multiple throttle valves 17 which are interlocked by a common shaft. The multiple throttle valves 17 are driven by an actuator 18 according to a control signal to regulate the amount of intake air. An airflow sensor 19 for detecting the amount of intake air is provided in the common intake passage 15 upstream of its joint portion.

Upstream ends of individual exhaust channels 21 branched from the exhaust passage 20 are connected to the first exhaust ports 12a of the first and fourth cylinders 2A, 2D or to the exhaust ports 12 of the second and third cylinders 2B, 2C. The intercylinder gas channels 22 are provided between the first cylinder 2A and the second cylinder 2B and between the third cylinder 2C and the fourth cylinder 2D. Upstream ends of the intercylinder gas channels 22 are connected to the second exhaust ports 12b of the first and fourth cylinders 2A, 2D which are the preceding cylinders while downstream ends of the intercylinder gas channels 22 are connected to the second intake ports 11b of the second and third cylinders 2B, 2C which are the following cylinders.

An $O_2$ sensor 23 (serving as an exhaust gas concentration detector for detecting the stoichiometric air-fuel ratio) is provided at a joint portion of the exhaust passage 20, downstream of the individual branched exhaust channels 21, and a three-way catalyst 24 is provided in the exhaust passage 20 further downstream of the $O_2$ sensor 23. As is commonly known, the three-way catalyst 24 is a catalyst which exhibits high converting performance with respect to HC, CO and NOx when the air-fuel ratio of the exhaust gas is approximately equal to the stoichiometric air-fuel ratio (i.e., excess-air factor $\lambda=1$).

Provided for detecting the air-fuel ratio by measuring the concentration of oxygen in the exhaust gas, the aforementioned $O_2$ sensor 23 is formed of a $\lambda O_2$ sensor whose output suddenly changes particularly at around the stoichiometric air-fuel ratio.

A linear $O_2$ sensor 25 (serving as an exhaust gas concentration detector for detecting a "lean" air-fuel ratio) whose output linearly varies with changes in oxygen concentration in the exhaust gas is provided in each of the aforementioned intercylinder gas channels 22.

The intake and exhaust valves for opening and closing the aforementioned intake and exhaust ports of the individual cylinders 2A–2D and a valve actuating mechanism for controlling them are constructed as follows.

The intake ports 11, the first exhaust ports 12a and the second exhaust ports 12b of the first and fourth cylinders 2A, 2D are provided with the intake valves 31, the first exhaust valves 32a and the second exhaust valves 32b, respectively. Similarly, the first intake ports 11a, the second intake ports 11b and the exhaust ports 12 of the second and third cylinders 2B, 2C are provided with the first intake valves 31a, the second intake valves 31b and the exhaust valves 32, respectively. The valve actuating mechanism including respective camshafts 33, 34 drives these intake and exhaust valves to open and close them with specific timing such that the exhaust and intake strokes of the individual cylinders 2A–2D are performed with the specific phase delays mentioned above.

Among the aforementioned intake and exhaust valves, the first exhaust valves 32a, the second exhaust valves 32b and the first intake valves 31a are individually provided with valve stop mechanisms 35 for switching the respective valves between activated and deactivated states. Each of these valve stop mechanisms 35, provided on tappets fitted between cams and valve stems of the camshafts 33, 34, for example, can switch the relevant valve between a state in which motion of the cam is transmitted to the valve causing it to open and close in accordance with supplying and drawing of hydraulic oil and a state in which no motion of the cam is transmitted causing it to become immovable. The construction of the valve stop mechanisms 35 will be later described more specifically.

Figure 3:
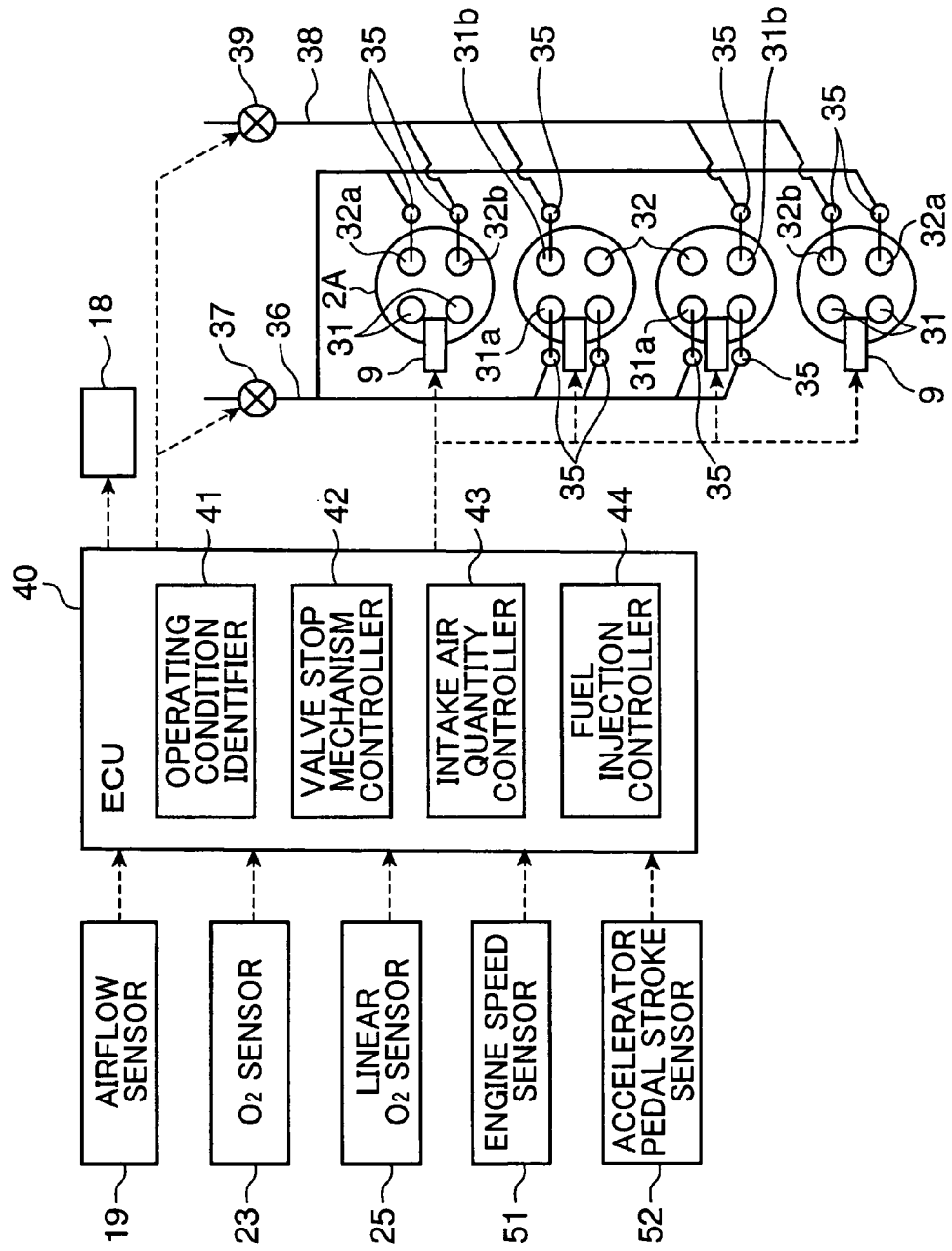
FIG. 3 is a block diagram of a control system.

A first control valve 37 is provided in a passage 36 for supplying and drawing the hydraulic oil to and from the valve stop mechanisms 35 of the first exhaust valves 32a and those of the first intake valves 31a, while a second control valve 39 is provided in a passage 38 for supplying and drawing the hydraulic oil to and from the valve stop mechanisms 35 of the second exhaust valves 32b and those of the second intake valves 31b (see FIG. 3).

FIG. 3 shows the construction of a drive/control system. Referring to this Figure, signals output from the airflow sensor 19, the $O_2$ sensor 23 and the linear $O_2$ sensors 25 are input to an ECU (electronic control unit) 40 including a microcomputer for controlling the engine. Also input to the ECU 40 are signals from an engine speed sensor 51 for detecting engine speed for judging operating condition of the engine and an accelerator pedal stroke sensor 52 for detecting throttle opening (the amount of depression of an accelerator). On the other hand, the ECU 40 outputs control signals to the individual fuel injectors 9, the actuator 18 of the multiple throttle valves 17 as well as to the first and second control valves 37, 39.

The ECU 40 includes an operating condition identifier 41, a valve stop mechanism controller 42, an intake air quantity controller 43 and a fuel injection controller 44.

Figure 4:
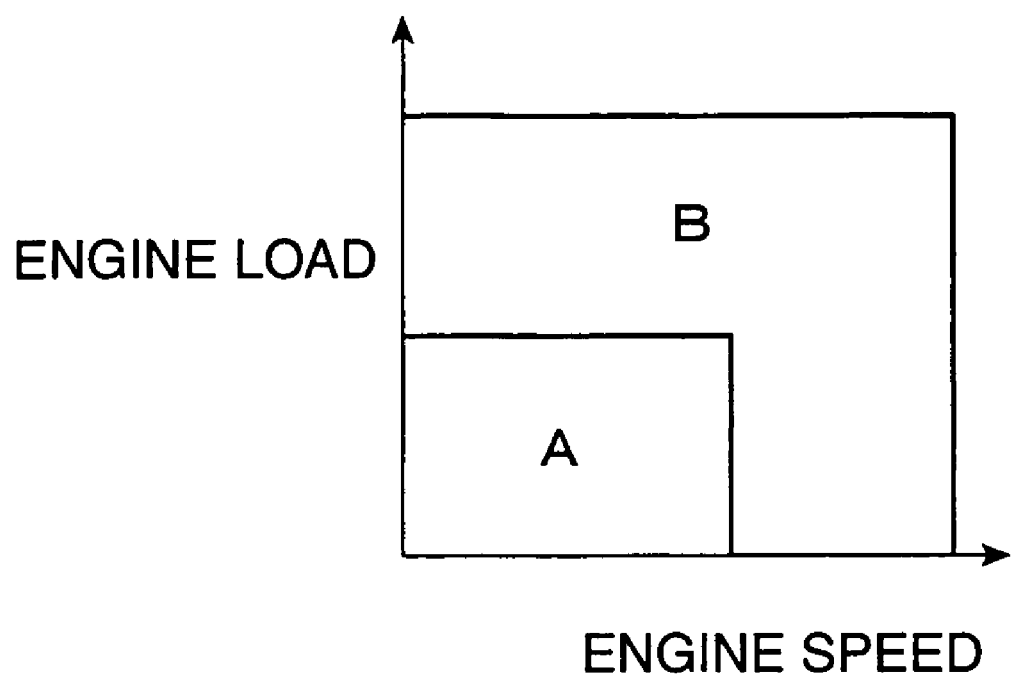
FIG. 4 is an explanatory diagram showing engine operating ranges.

The operating condition identifier 41 examines the operating condition of the engine (engine speed and load) based on the signals from the engine speed sensor 51 and the accelerator pedal stroke sensor 52 and judges whether the engine operating condition falls in an operating range A on a low-load, low-speed side or in an operating range B on a high-load, high-speed side shown in FIG. 4.

The valve stop mechanism controller 42 controls the individual valve stop mechanisms 35 as follows by controlling each of the aforementioned control valves 37, 39 depending on whether the engine operating condition falls in the operating range A on the low-load, low-speed side or in the operating range B on the high-load, high-speed side.

Operating range A: The first exhaust valves 32a and the first intake valves 31a are in the deactivated state while the second exhaust valves 32b and the second intake valves 31b are in the activated state.

Operating range B: The first exhaust valves 32a and the first intake valves 31a are in the activated state while the second exhaust valves 32b and the second intake valves 31b are in the deactivated state.

The valve stop mechanism controller 42 and the individual valve stop mechanisms 35 controlled by it together constitute a flow path switcher for switching gas flow paths as will be later described in great detail.

The intake air quantity controller 43 controls the opening of each throttle valve 17 (throttle opening) by controlling the actuator 18. The intake air quantity controller 43 determines a target intake air quantity from a map, for example, based on the engine operating condition and controls the throttle opening according to the target intake air quantity obtained. In the low-load, low-speed operating range A, introduction of intake air to the following cylinders (second and third cylinders 2B, 2C) through the branched intake channels 16 is interrupted and excess air in the gas introduced from the preceding cylinders is used for combustion as will be later described. Therefore, the throttle opening is regulated in such a manner that air necessary for combustion of fuel in a total of two preceding and following cylinders is supplied to the preceding cylinders (first and fourth cylinders 2A, 2D).

The aforementioned fuel injection controller 44 serves to control the amounts of fuel to be injected from the fuel injectors 9 provided in the individual cylinders 2A–2D and injection timing according to the engine operating condition. In particular, the fuel injection controller 44 differently controls fuel injection depending on whether the engine operating condition falls in the operating range A or in the operating range B.

Specifically, when the engine operating condition falls in the operating range A on the low-load, low-speed side, the fuel injection controller 44 controls the amounts of fuel injected into the preceding cylinders (first and fourth cylinders 2A, 2D) such that the air-fuel ratio becomes larger than the stoichiometric air-fuel ratio, preferably approximately equal to twice the stoichiometric air-fuel ratio or larger, to create a lean mixture, and sets injection timing to inject the fuel during the compression stroke to thereby produce stratified charge combustion in the preceding cylinders 2A, 2D. On the other hand, the fuel injection controller 44 controls the amounts of fuel injected into the following cylinders (second and third cylinders 2B, 2C) to obtain the stoichiometric air-fuel ratio therein by feeding the fuel into burned gas of a "lean" air-fuel ratio introduced from the preceding cylinders 2A, 2D, and sets injection timing to enable ignition and combustion in an atmosphere rich in burned gas. As an example, the fuel is injected during the compression stroke to ensure ignitability.

The aforementioned control operation of the amounts of injected fuel is performed by feedback control based on the outputs from the airflow sensor 19, the $O_2$ sensor 23, etc. Specifically, a basic fuel injection quantity is so calculated for each cylinder based on the amount of intake air as to produce a specific "lean" air-fuel ratio in the preceding cylinders 2A, 2D and the stoichiometric air-fuel ratio in the following cylinders 2B, 2C. The amounts of fuel injected into the preceding cylinders 2A, 2D are corrected by feedback based on the outputs from the linear $O_2$ sensors 25 provided in the intercylinder gas channels 22, and the amounts of fuel injected into the following cylinders 2B, 2C are corrected by feedback based on the output from the $O_2$ sensor 23 provided in the exhaust passage 20.

When the engine operating condition falls in the operating range B on the high-load, high-speed side, on the other hand, the amounts of injected fuel are so controlled as to produce an air-fuel ratio equal to or larger than the stoichiometric air-fuel ratio in the individual cylinders 2A–2D. For example, the air-fuel ratio is made equal to the stoichiometric air-fuel ratio in most regions of the operating range B and made lower than the stoichiometric air-fuel ratio to produce a rich mixture at and around a full-throttle load region. In this engine operating condition, the injection timing is so set as to produce uniform charge combustion by injecting the fuel in the intake stroke into the individual cylinders 2A–2D.

Figure 5:
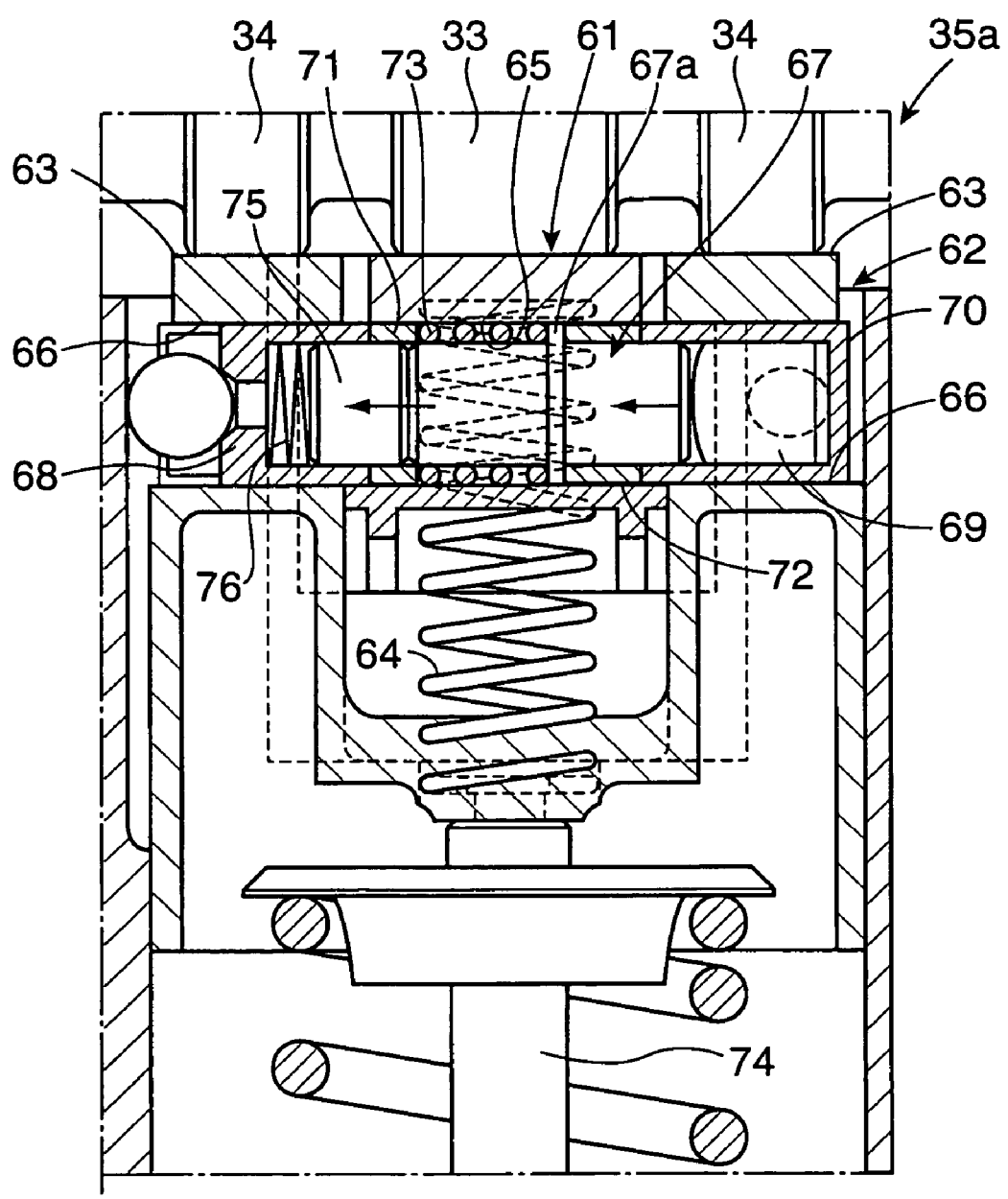
FIG. 5 is a cross-sectional front view showing a specific construction of a valve stop mechanism.
Figure 6:
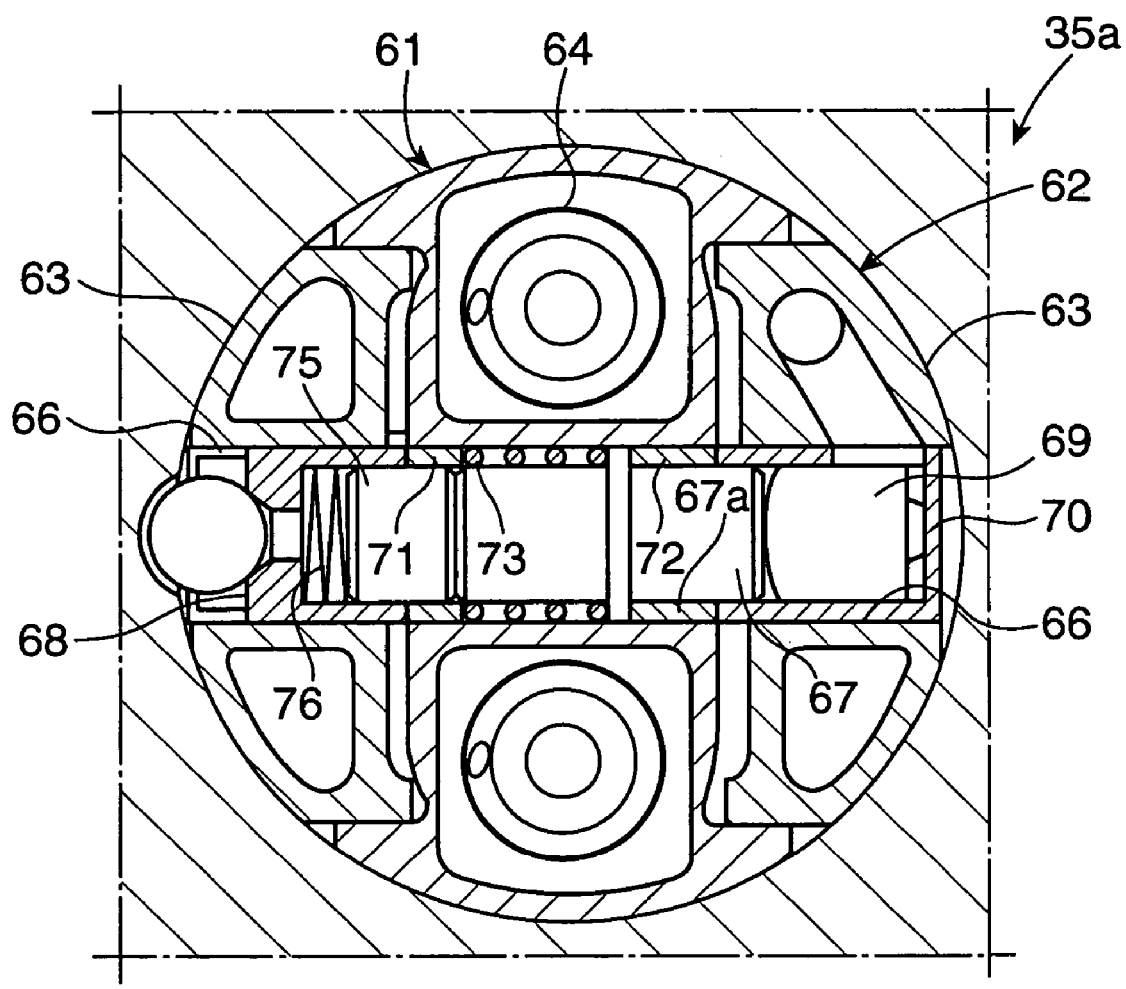
FIG. 6 is a cross-sectional plan view showing the specific construction of the valve stop mechanism.
Figure 8:
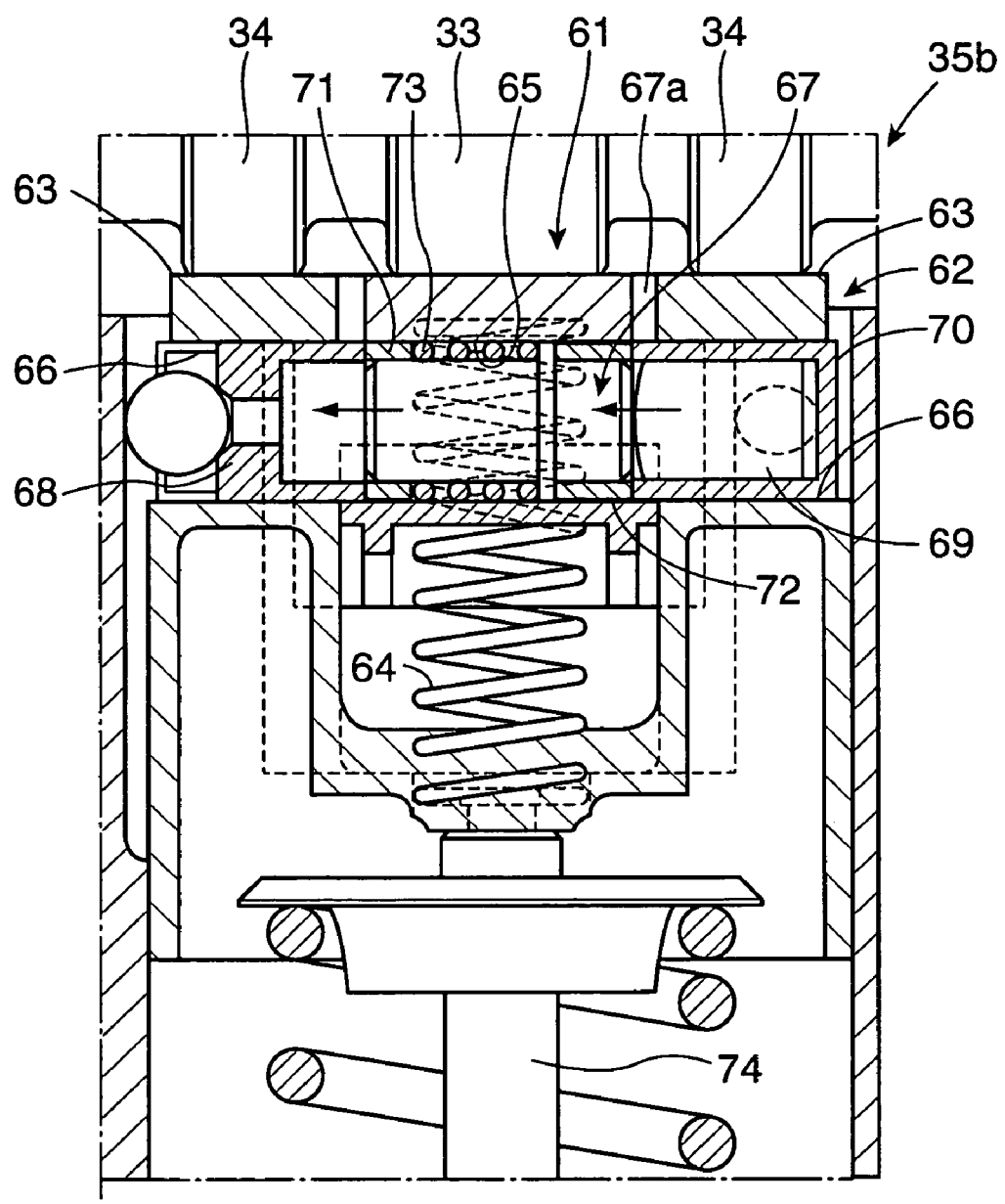
FIG. 8 is a cross-sectional front view showing an example of another specific construction of the valve stop mechanism.

FIGS. 5–7 show a specific example of the mechanism (the valve stop mechanism 35 shown in FIGS. 1–3) for switching the intake and exhaust valves between the activated and deactivated states, and FIG. 8 shows an alternative specific example of the above mechanism.

Referring to these Figures, each camshaft of the valve actuating mechanism for driving the intake and exhaust valves is provided with a first cam 33 for opening and closing the intake or exhaust valve by lifting it and a pair of second cams 34 for retaining the intake or exhaust valve in a closed state by preventing it from being lifted. There is provided a mechanism for switching the camshaft between a state in which motion of the first cam 33 is transmitted to the valve and a state in which no motion of the is transmitted between these cams 33, 34 and the intake or exhaust valve. A mechanism 35a shown in FIGS. 5–7 includes a center tappet 61 provided at a position corresponding to the first cam 33 of the valve actuating mechanism, a side tappet 62 having a pair of projecting parts 63 located at positions corresponding to the second cams 34, and a pair of compression coil springs 64 located between the bottom of the side tappet 62 and the bottom of the center tappet 61 for pushing the center tappet 61 in a direction to keep its top surface in tight contact with the first cam 33.

In the center tappet 61 and the two projecting parts 63 of the side tappet 62, there are formed lock holes 65, 66 at corresponding positions so that these lock holes 65, 66 align to form a single through hole when the center tappet 61 is in its upper position shown in FIG. 5. A lock pin 67 having a flange 67a is fitted slidably in its axial direction in the lock hole 65 of the center tappet 61. A first holder 68 having a cavity for accommodating a first plunger 75 and a pusher 76 formed of a compression coil spring for forcing the first plunger 75 against the lock pin 67 is fitted in the lock hole 66 formed in one of the projecting parts 63 of the side tappet 62, while a second holder 70 for retaining a second plunger 69 is fitted in the lock hole 66 formed in the other projecting part 63.

First and second bushes 71, 72 for holding both ends of the lock pin 67 and a pusher 73 formed of a compression coil spring for forcing the lock pin 67 in the direction of its root end (toward the second plunger 69) are fitted in the lock hole 65 of the center tappet 61. Under normal conditions, the flange 67a of the lock pin 67 is supported at its home position where the flange 67a is in contact with a far end of the second bush 72 due to pushing forces of the pushers 73, 76 as shown in FIGS. 5 and 6, so that the lock pin 67 is accommodated bridging a gap between the lock hole 65 of the center tappet 61 and the second holder 70, and the first plunger 75 is accommodated bridging the first holder 68 and the first bush 71, whereby the center tappet 61 and the side tappet 62 are held in an interlocked condition. As a result, a driving force of the center tappet 61 which is activated by the first cam 33 is transmitted to a stem end 74 of the intake or exhaust valve through the side tappet 62, thereby causing the intake or exhaust valve to open and close.

When the hydraulic oil is supplied from a later-described passage 36a for supplying and drawing the hydraulic oil to a line between a root end of the second plunger 69 and the bottom of the second holder 70, the lock pin 67 forced toward the first plunger 75 moves in a direction shown by an arrow in FIG. 5 up to an activated position where the lock pin 67 is accommodated in the lock hole 65 of the center tappet 61 overwhelming the pushing force of the pusher 73, and the first plunger 75 forced toward the first holder 68 moves in a direction shown by an arrow in FIG. 5 up to an activated position where first plunger 75 is accommodated in the first holder 68 overwhelming the pushing force of the pusher 76, whereby the center tappet 61 is disengaged from the side tappet 62. As a result, transmission of a driving force of the first cam 33 to the intake or exhaust valve through the side tappet 62 is interrupted, thereby holding the intake or exhaust valve in its closed state.

A mechanism 35b shown in FIG. 8 is constructed in a similar fashion as the mechanism 35a shown in FIGS. 5–7 except that the center tappet 61 is disengaged from the side tappet 62 under normal conditions with the lock pin 67 accommodated in the lock hole 65 of the center tappet 61 and the second plunger 69 held at its home position where it is accommodated in the second holder 70.

Under normal conditions, supply of the hydraulic oil to the second switching mechanism 35b is interrupted so that the relevant intake or exhaust valve is held in its closed state. Also, as the hydraulic oil is supplied from the later-described passage 36a for supplying and drawing the hydraulic oil to the line between the root end of the second plunger 69 and the bottom of the second holder 70, a far end of the second plunger 69 goes into the lock hole 65 of the center tappet 61, and the lock pin 67 forced by the second plunger 69 is pushed toward the first holder 68 overwhelming the pushing force of the pusher 73 and moves up to the activated position where a far end of the lock pin 67 is located within the first holder 68 as shown in FIG. 8, whereby the center tappet 61 and the side tappet 62 are joined together. As a result, the driving force of the first cam 33 is transmitted to the stem end 74 of the intake or exhaust valve through the side tappet 62, thereby causing the intake or exhaust valve to open and close.

When the aforementioned specific example is applied to the valve stop mechanism 35 of FIGS. 1–3, the mechanism 35a of FIGS. 5–7 should preferably be adopted to the first exhaust valves 32a of the preceding cylinders 2A, 2D and the first intake valves 31a of the following cylinders 2B, 2C while the mechanism 35b of FIG. 8 should preferably be adopted to the second exhaust valves 32b of the preceding cylinders 2A, 2D and the second intake valves 31b of the following cylinders 2B, 2C, for example.

With this arrangement, the aforementioned first exhaust valves 32a and first intake valves 31a are automatically set in a state in which the driving force of the first cams 33 is transmitted to the valves 31a, 32a, and the aforementioned second exhaust valves 32b and second intake valves 31b are automatically set in a state in which the driving force of the first cams 33 is not transmitted to the valves 31b, 32b under engine stop conditions. It is therefore possible to produce a state in which fresh air is introduced into the individual cylinders 2A–2D without the need to supply hydraulic oil pressure to the aforementioned mechanisms 35a, 35b at engine startup. This serves to ensure ease of engine startup.

Operational effects of the aforementioned device of the present embodiment are now described with reference to FIGS. 9–11.

Figure 10:
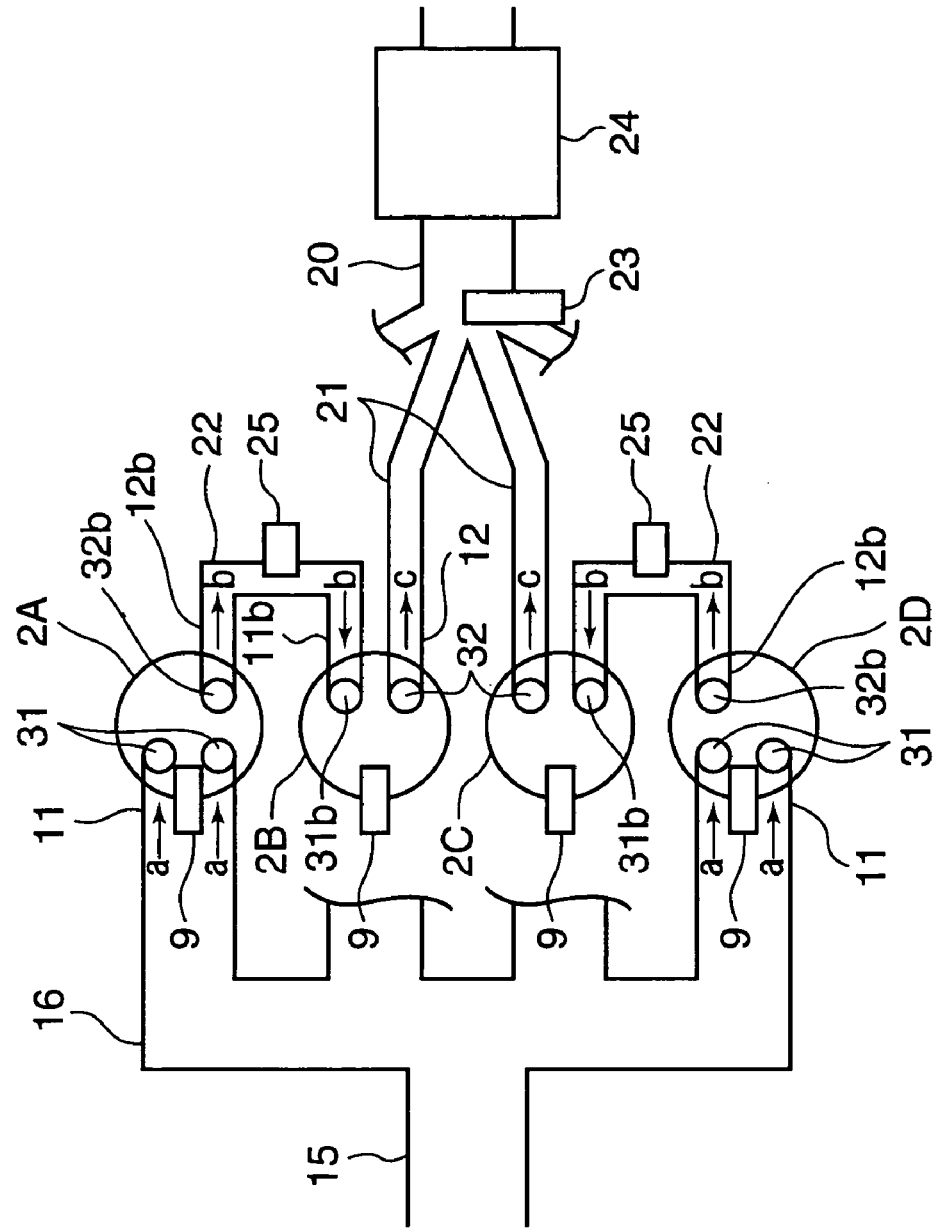
FIG. 10 is an explanatory diagram showing substantial fresh air and gas flow paths formed in a low-load, low-speed operating range.

In the operating range A on the low-load, low-speed side, the first exhaust valves 32a and the first intake valves 31a are in the deactivated state while the second exhaust valves 32b and the second intake valves 31b are in the activated state as stated above, so that substantial fresh air and gas flow paths as shown in FIG. 10 are formed. As a result, there is formed a dual two-cylinder interconnect configuration, in which the burned gas discharged from the preceding cylinders (first and fourth cylinders) 2A, 2D is introduced directly into the respective following cylinders (second and third cylinders) 2B, 2C through the intercylinder gas channels 22 and the burned gas discharged from only the following cylinders 2B, 2C is led to the exhaust passage 20 associated with the three-way catalyst 24.

In this condition, fresh air is introduced through the intake passage 15 (arrows "a" in FIG. 10) into the preceding cylinders 2A, 2D in their intake stroke, the fuel is injected into the preceding cylinders 2A, 2D in their compression stroke with the amounts of injected fuel feedback-controlled such that the air-fuel ratio detected by each linear $O_2$ sensor 25 becomes equal to the aforementioned specific "lean" air-fuel ratio, and the mixture is ignited at specific ignition points to produce stratified charge combustion at the "lean" air-fuel ratio (refer to FIG. 9).

Subsequently, the burned gas discharged from the preceding cylinders 2A, 2D is introduced into the respective following cylinders 2B, 2C through the intercylinder gas channels 22 during periods when the exhaust stroke of the preceding cylinders 2A, 2D overlaps the intake stroke of the following cylinders 2B, 2C (open arrows in FIG. 9 and arrows "b" in FIG. 10). The fuel is injected with appropriate timing (during the compression stroke, for example) into the following cylinders 2B, 2C, with the amounts of injected fuel controlled based on the output of the $O_2$ sensor 23, to achieve the stoichiometric air-fuel ratio by a combination of the burned gas of the "lean" air-fuel ratio introduced from the preceding cylinders 2A, 2D and the newly supplied fuel, and the mixture is ignited at specific ignition points to produce combustion in the following cylinders 2B, 2C (refer to FIG. 9). After combustion in the following cylinders 2B, 2C, the resultant burned gas is discharged into the exhaust passage 20 associated with the three-way catalyst 24 (arrows "c" in FIG. 10).

Since stratified charge combustion is performed at the "lean" air-fuel ratio in the preceding cylinders 2A, 2D as stated above, thermal efficiency is improved and pumping loss is reduced in the preceding cylinders 2A, 2D, and a combined effect thereof results in a significant improvement in fuel economy. In the following cylinders 2B, 2C, on the other hand, the mixture is combusted while being controlled to the stoichiometric air-fuel ratio with additional fuel supplied to the burned gas in an excess-air state. Therefore, although the thermal efficiency of the following cylinders 2B, 2C is slightly low compared to the preceding cylinders 2A, 2D in which the stratified charge combustion is performed at the "lean" air-fuel ratio, it is possible to achieve a sufficient effect of improving the fuel economy due to a reduction in pumping loss.

In addition, it is not necessary to provide a lean NOx catalyst unlike conventional lean burn engines and sufficient emission-cleaning performance is ensured with the three-way catalyst 24 alone, because the gas discharged from the following cylinders 2B, 2C into the exhaust passage 20 is at the stoichiometric air-fuel ratio.

As it is not necessary to provide the lean NOx catalyst as stated above, there is no need to temporarily lower the air-fuel ratio for accelerating release and reduction of NOx when the amount of NOx adsorbed by the lean NOx catalyst has increased, whereby a decrease in fuel economy improvement effect can be avoided. Moreover, the arrangement of the embodiment does not cause the earlier-mentioned problem of poisoning of the lean NOx catalyst by sulfurization.

Furthermore, NOx emission is sufficiently decreased in this embodiment. This is because the air-fuel ratio in the preceding cylinders 2A, 2D is made approximately equal to twice the stoichiometric air-fuel ratio or larger by keeping the amount of NOx generated in these cylinders 2A, 2D to a relatively low level, and the burned gas is introduced from the preceding cylinders 2A, 2D into the following cylinders 2B, 2C to create a condition equivalent to what would occur when a great deal of exhaust gas is introduced by EGR operation. The arrangement of the embodiment is advantageous for improving the quality of emissions from such a point of view as well.

The burned gas is introduced from the preceding cylinders 2A, 2D into the following cylinders 2B, 2C through the respective intercylinder gas channels 22 as stated above. It is possible to regulate the amount of dissipated heat by adjusting the length of each intercylinder gas channel 22, for example, and thereby regulate the temperature of the burned gas introduced into the following cylinders 2B, 2C. By regulating the temperature of the burned gas in this way and also adjusting the timing of fuel injection into the following cylinders 2B, 2C appropriately, it is possible to maintain good ignitability and combustibility in the following cylinders 2B, 2C as well into which a great deal of exhaust gas is introduced.

Although the combustibility in the following cylinders 2B, 2C lessens when the ratio of excess air to the gas introduced from the preceding cylinders 2A, 2D into the following cylinders 2B, 2C decreases, the combustibility in the following cylinders 2B, 2C is maintained as long as the air-fuel ratio in the preceding cylinders 2A, 2D is made approximately equal to twice the stoichiometric air-fuel ratio or larger.

Figure 11:
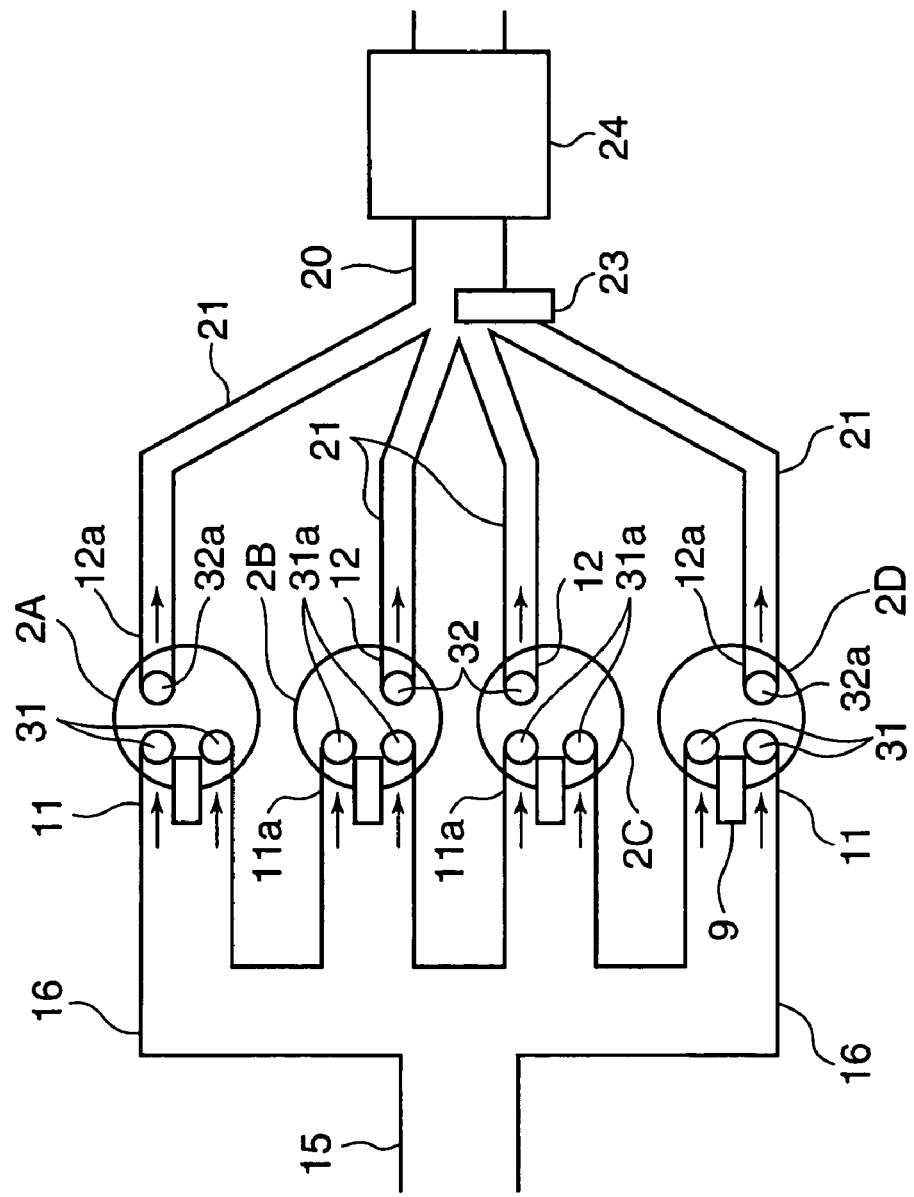
FIG. 11 is an explanatory diagram showing substantial fresh air and gas flow paths formed in a high-load or high-speed operating range.

In the operating range B on the high-load, high-speed side, on the other hand, the first exhaust valves 32a and the first intake valves 31a are in the activated state while the second exhaust valves 32b and the second intake valves 31b are in the deactivated state as stated above, so that substantial fresh air and gas flow paths as shown in FIG. 11 are formed. As a result, the intake ports 11, 11a and the exhaust ports 12, 12a of the individual cylinders 2A–2D work substantially independently of one another, so that fresh air is introduced through the intake passage 15 and the intake ports 11, 11a into the respective cylinders 2A–2D and the burned gas is discharged from the cylinders 2A–2D into the exhaust passage 20 through the respective exhaust ports 12, 12a. In this operating range B, the amount of intake air and the amounts of injected fuel are so controlled that the air-fuel ratio becomes equal to or smaller than the stoichiometric air-fuel ratio to produce a rich mixture to maintain engine output performance.

Figure 12:
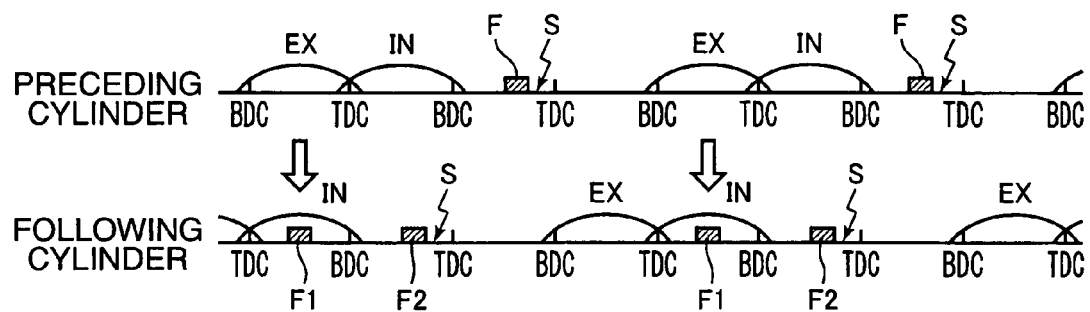
FIG. 12 is a diagram showing another example of timing of fuel injection into following cylinders.

Although stratified charge combustion is performed at the stoichiometric air-fuel ratio in the following cylinders 2B, 2C by setting a fuel injection point in the compression stroke in the foregoing embodiment, multi-point fuel injection (F1, F2) may be performed for each of the following cylinders 2B, 2C by injecting the fuel twice during the intake stroke and the compression stroke as depicted in FIG. 12. It would be possible by doing so to prevent excessive concentration of fuel around the spark plug 7 and produce combustion under slightly stratified conditions.

Figure 13:
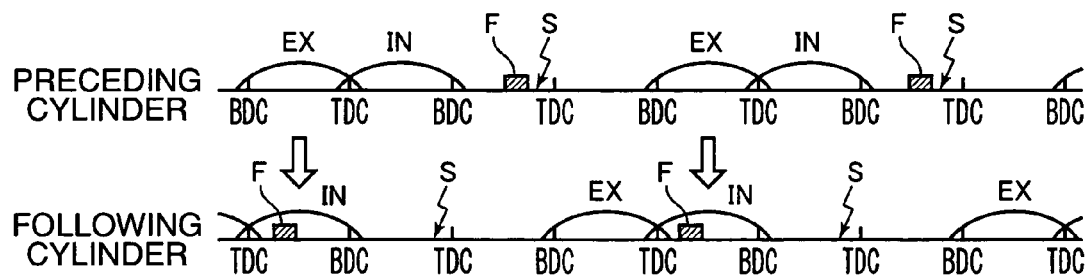
FIG. 13 is a diagram showing still another example of timing of fuel injection into the following cylinders.

If it is possible to maintain ignitability even when the fuel is uniformly dispersed in the following cylinders 2B, 2C due to a sufficiently high temperature of the burned gas introduced from the preceding cylinders 2A, 2D into the following cylinders 2B, 2C, for example, one-point fuel injection may be performed for each of the following cylinders 2B, 2C by injecting the fuel only once during the intake stroke as depicted in FIG. 13.

Figure 14:
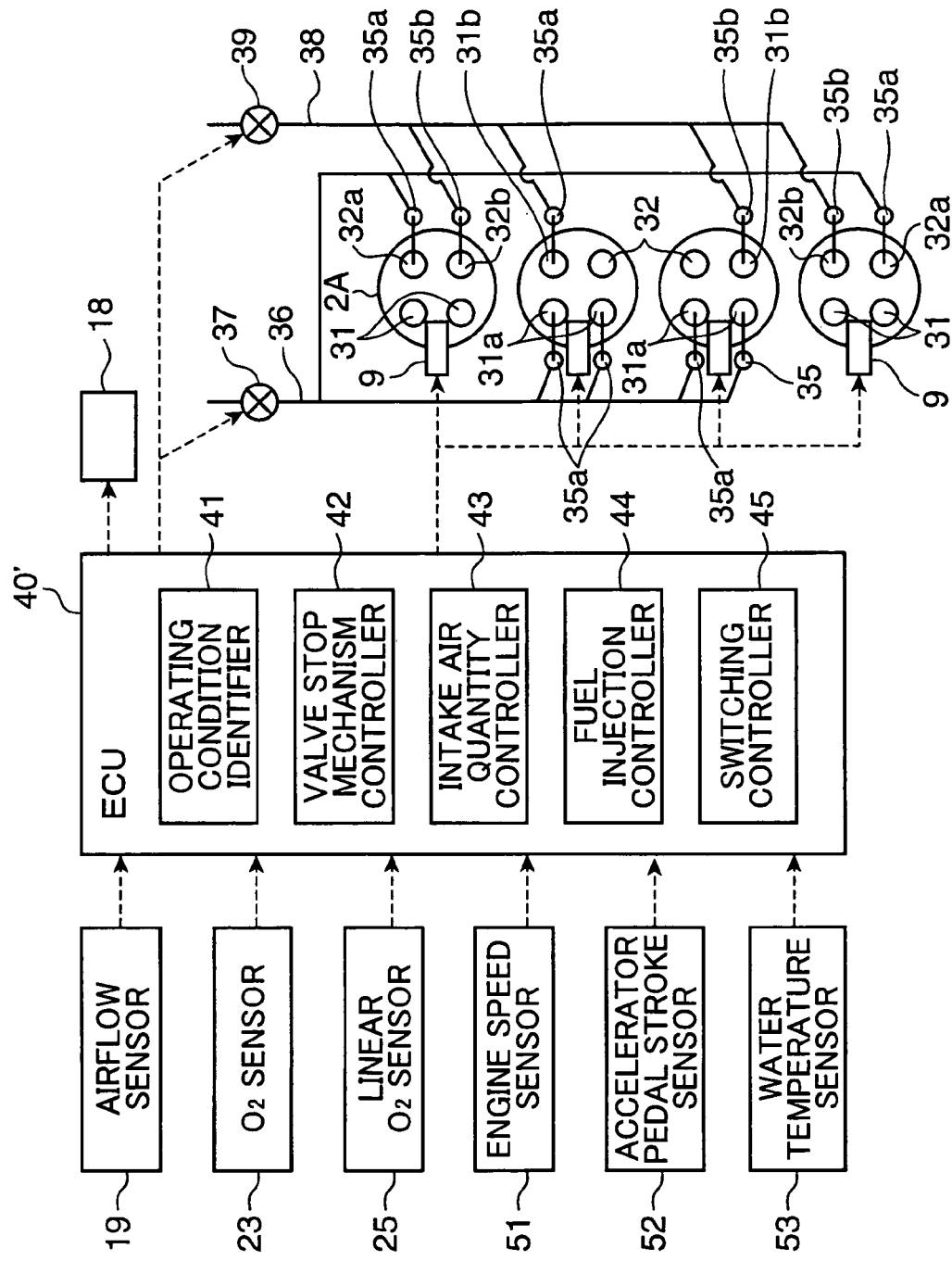
FIG. 14 is a block diagram of a control system according to another embodiment.

FIG. 14 shows a control system according to another embodiment the invention. In this embodiment, the engine is switched between an operation mode in which gas flow paths (refer to FIG. 1) are connected to form a dual two-cylinder interconnect configuration (refer to FIG. 10) and combustion is produced at a "lean" air-fuel ratio in the preceding cylinders 2A, 2D while combustion is produced at the stoichiometric air-fuel ratio in the following cylinders 2B, 2C (this operation mode is hereinafter referred to as the special operation mode) and an operation mode in which combustion is produced at a specific air-fuel ratio with the intake and exhaust ports of the individual cylinders 2A–2D working independently of one another (this operation mode is hereinafter referred to as the normal operation mode) according to engine operating conditions, wherein specially devised control operation is performed at operation mode switching. Referring to FIG. 14, an ECU 40' includes a switching controller 45 in addition to the same means 41–44 as the ECU 40 shown in FIG. 3. Signals output from an airflow sensor 19, an $O_2$ sensor 23, linear $O_2$ sensors 25, an engine speed sensor 51, an accelerator pedal stroke sensor 52 and a water temperature sensor 53 are input to the ECU 40'.

The switching controller 45 serves to judge whether the aforementioned gas flow paths have been switched by detecting the period (time interval) of intake air pulsations corresponding to the number of intake air pulsations occurring while a crankshaft of the engine makes a specific number of turns based on a change in the amount of intake air detected by an intake air quantity detector formed of the airflow sensor 19 and the engine speed detected by the engine speed sensor 51 when the aforementioned operating condition identifier 41 has judged that the operating range of the engine has changed from the operating range A on the low-load, low-speed side to the operating range B on the high-load, high-speed side shown in FIG. 4, or vice versa.

In the dual two-cylinder interconnect configuration in which fresh air is introduced into the preceding cylinders 2A, 2D only, two intake air pulsations occur while the crankshaft of the engine makes one turn. In the aforementioned independent cylinder configuration in which fresh air is separately introduced into the individual cylinders 2A–2D, on the other hand, four intake air pulsations occur while the crankshaft of the engine makes one turn, so that the period of intake air pulsations is suddenly reduced by approximately half due to this increase in the number of intake air pulsations. The switching controller 45 can therefore judge whether intake air and exhaust gas flow paths have been switched by the aforementioned flow path switcher by detecting a change in the period of intake air pulsations. Following a point in time when the switching controller 45 has verified that the intake air flow paths have been switched between the dual two-cylinder interconnect configuration and the independent cylinder configuration as a result of switching of the intake air and exhaust gas flow paths by the flow path switcher, air-fuel ratio control operation corresponding to the operation mode selected after the flow path switching is performed.

Figure 15:
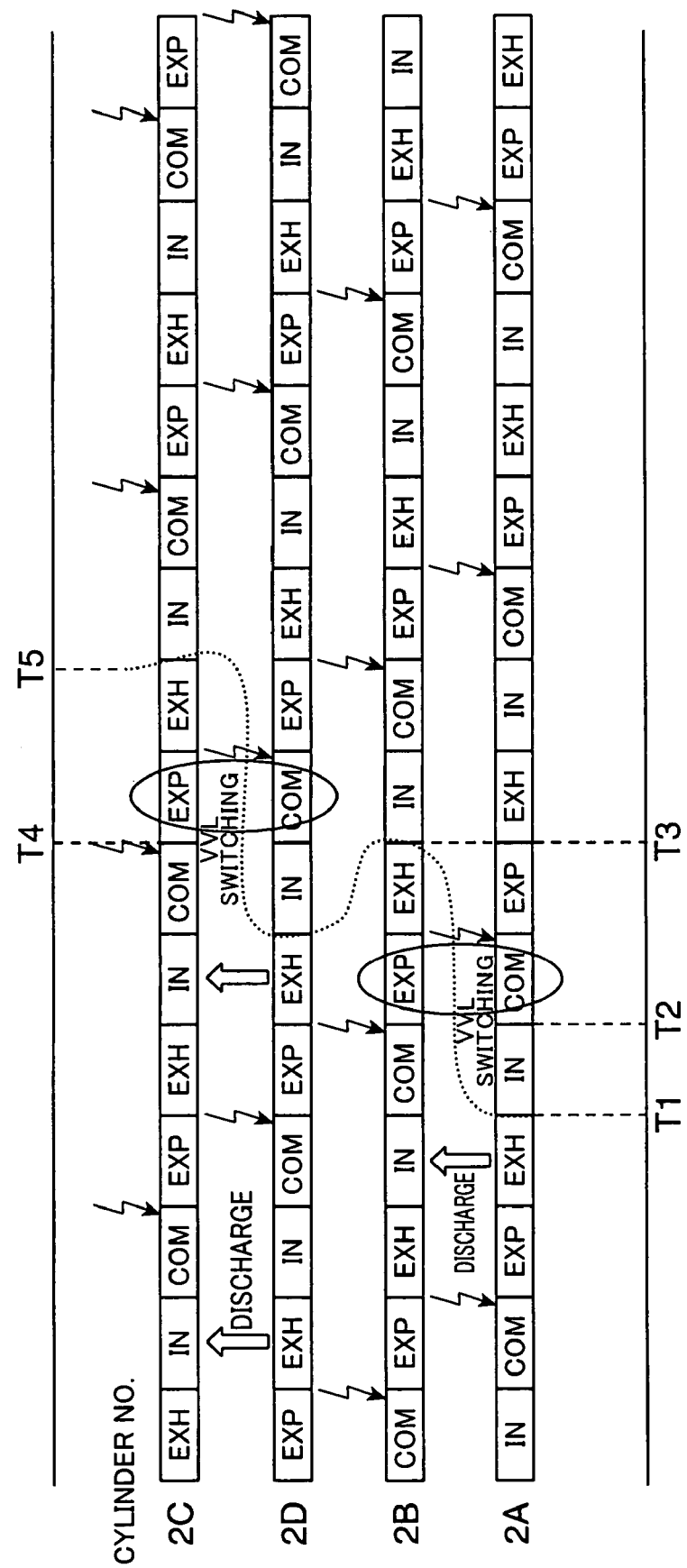
FIG. 15 is a time chart showing timing of switching from special operation mode to normal operation mode.

More specifically, after a switching signal is output from the operating condition identifier 41 to the flow path switcher at time T1 when the operating condition identifier 41 judges that the operating range of the engine has transferred from the operating range A on the low-load, low-speed side to the operating range B on the high-load, high-speed side, switching of the flow paths for the aforementioned two cylinders 2A, 2B is commenced at time T2 when the intake and exhaust valves of the first cylinder 2A which is a preceding cylinder and the intake and exhaust valves of the second cylinder 2B which is a following cylinder are simultaneously set to the closed state as shown in FIG. 15. Then, upon detecting intake air pulsations occurring at time T3 when fresh air is introduced into the second cylinder 2B as a result of execution of this switching of the flow paths, the switching controller 45 judges that the switching of the intake air flow paths has been completed. At this point in time the engine is transferred to a state of air-fuel ratio control operation in the normal operation mode in which the air-fuel ratio in the individual cylinders 2A–2D is set to a value approximately corresponding to the stoichiometric air-fuel ratio.

The flow paths for the fourth cylinder 2D which is a preceding cylinder and the third cylinder 2C which is a following cylinder other than those mentioned above are switched at time T4 when the intake and exhaust valves of the two cylinders 2D, 2C are simultaneously set to the closed state, the time T4 being approximately coinciding with the time T3 when the switching controller 45 judges that the switching of the intake air flow paths has been completed. Switching from the special operation mode to the normal operation mode is completed at time T5 when introduction of fresh air into the third cylinder 2C begins upon completion of the aforementioned switching of the flow paths. Preparation for executing air-fuel ratio control operation after the operation mode switching is begun by gradually increasing the opening of the throttle valves 17 from the time T1 when the switching signal is output from the operating condition identifier 41 to the flow path switcher.

Figure 16:
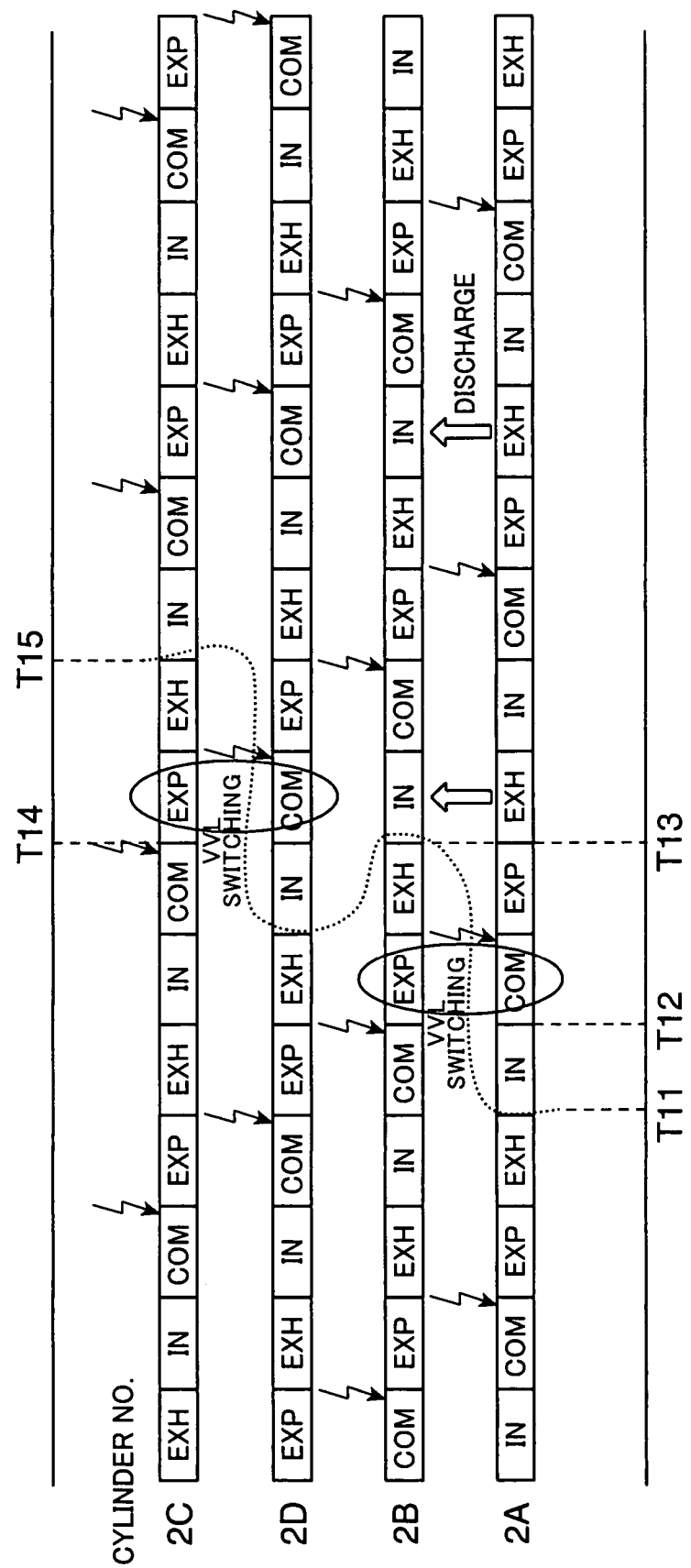
FIG. 16 is a time chart showing switching from the normal operation mode to the special operation mode.

Also, after a switching signal is output from the operating condition identifier 41 to the flow path switcher at time T11 when the operating condition identifier 41 judges that the operating range of the engine has transferred from the operating range B on the high-load, high-speed side to the operating range A on the low-load, low-speed side, switching of the flow paths for the aforementioned two cylinders 2A, 2B is commenced at time T12 when the intake and exhaust valves of the first cylinder 2A which is a preceding cylinder and the intake and exhaust valves of the second cylinder 2B which is a following cylinder are simultaneously set to the closed state as shown in FIG. 16. Then, upon detecting a loss of intake air pulsations at time T13 when introduction of fresh air into the second cylinder 2B is interrupted as a result of execution of this switching of the flow paths, the switching controller 45 judges that the switching of the intake air flow paths has been completed. At this point in time the engine is transferred to a state of air-fuel ratio control operation in the special operation mode in which the air-fuel ratio in the individual cylinders 2A–2D is set to a value approximately corresponding to the stoichiometric air-fuel ratio.

The flow paths for the fourth cylinder 2D which is a preceding cylinder and the third cylinder 2C which is a following cylinder other than those mentioned above are switched at time T14 when the intake and exhaust valves of the two cylinders 2D, 2C are simultaneously set to the closed state, the time T14 being approximately coinciding with the time T13 when the switching controller 45 judges that the switching of the intake air flow paths has been completed.

Figure 17:
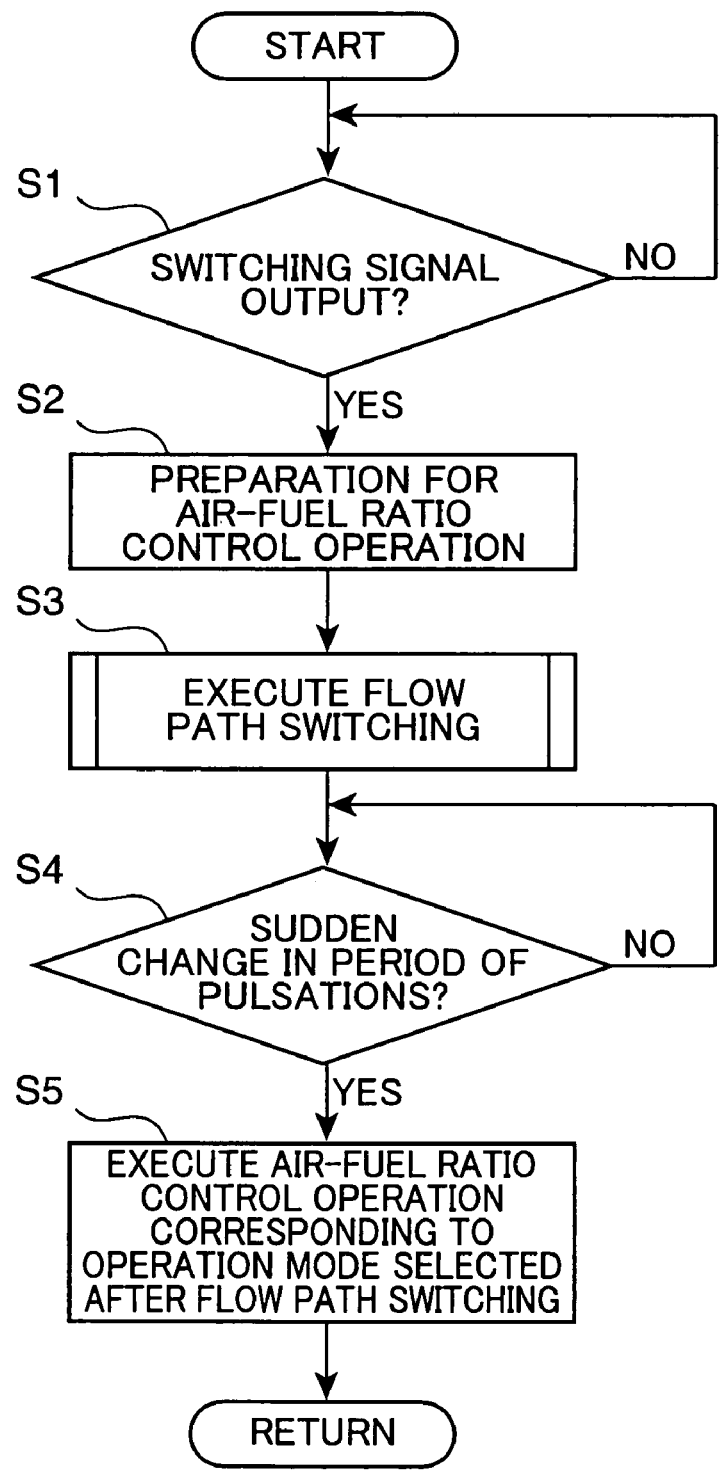
FIG. 17 is a flowchart showing operation mode switching control operation.

Engine control operation performed by a control device according to the present embodiment is now described with reference to FIG. 17. After this control operation has started, the control device judges whether the switching signal has been output from the operating condition identifier 41 to the valve stop mechanism controller 42 of the flow path switcher following a change in engine operating conditions (step S1). At a point in time when the judgment result in step S1 proves to be in the affirmative, preparation for executing air-fuel ratio control operation corresponding to the operation mode selected after its switching is begun (step S2). Then, at the timing of the aforementioned flow path switching, that is, when the intake and exhaust valves of the preceding and following cylinders 2D, 2C are simultaneously closed, control operation for switching the intake air and exhaust gas flow paths is executed (step S3).

Subsequently, a judgment is made by the switching controller 45 to determine whether the period of intake air pulsations has suddenly changed corresponding to a sensing signal of the airflow sensor 19 (step S4), and the aforementioned air-fuel ratio control operation corresponding to the operation mode selected after its switching is executed at a point in time when the judgment result in step S1 proves to be in the affirmative (step S5). When the engine is switched from the special operation mode to the normal operation mode, for example, the amount of intake air and the amounts of injected fuel are controlled in such a manner that the air-fuel ratio in each of the cylinders 2A–2D becomes approximately equal to a value corresponding to the stoichiometric air-fuel ratio. When the engine is switched from the normal operation mode to the special operation mode, on the other hand, the amount of intake air and the amounts of injected fuel are controlled in such a manner that combustion in the preceding cylinders 2A, 2D is produced in a lean mixture state in which the air-fuel ratio is larger than the stoichiometric air-fuel ratio by a specific amount by injecting the fuel into these cylinders 2A, 2D and combustion in the following cylinders 2B, 2C is produced with the air-fuel ratio made approximately equal to the value corresponding to the stoichiometric air-fuel ratio by supplying the burned gas drawn from the preceding cylinders 2A, 2D and the fuel into the following cylinders 2B, 2C.

The above-described device of the present embodiment is so constructed as to judge whether the flow paths have been switched by the flow path switcher with reference to a sensing signal output from an intake air pulsation detector formed of the airflow sensor 19 at the aforementioned operation mode switching and execute the air-fuel ratio control operation corresponding to the operation mode selected after the flow path switching following the point in time when the switching of the flow paths has been detected. Thus, when the switching between the special operation mode and the normal operation mode is made, the air-fuel ratio control operation corresponding to the operation mode selected after the flow path switching is properly performed after completion of the switching of the flow paths has been verified by the flow path switcher with reference to the aforementioned sensing signal.

At the switching from the special operation mode to the normal operation mode, there could arise such a problem as misfire due to an insufficient amount of fresh air introduced into the following cylinders 2B, 2C, for example, if the air-fuel ratio control operation for the normal operation mode, in which combustion is produced with the air-fuel ratio in the individual cylinders 2A–2D made approximately equal to the stoichiometric air-fuel ratio, is performed although the aforementioned independent cylinder configuration has not been completed yet due to a delay in the flow path switching for some reason. In this embodiment, it is possible to effectively prevent this kind of problem and properly perform combustion control operation for the normal operation mode upon verifying that the flow paths have been switched to the independent cylinder configuration.

At the switching from the normal operation mode to the special operation mode, there could arise a problem that NOx generated when the air-fuel ratios in the preceding cylinders 2A, 2D and the following cylinders 2B, 2C increase is led to the exhaust passage 20, for example, if the air-fuel ratio control operation for the special operation mode, in which combustion in the preceding cylinders 2A, 2D is produced with the air-fuel ratio made larger than the stoichiometric air-fuel ratio by a specific amount to create a lean mixture while combustion in the following cylinders 2B, 2C is produced with the air-fuel ratio made approximately equal to the stoichiometric air-fuel ratio, is performed although the aforementioned dual two-cylinder interconnect configuration has not been completed yet due to a delay in the flow path switching. In this embodiment, it is possible to effectively prevent this kind of problem and properly perform combustion control operation for the special operation mode upon verifying that the flow paths have been switched to the dual two-cylinder interconnect configuration.

Since the device of the present embodiment is so constructed as to judge that the flow path switching has been completed at a point in time when a sudden change in the period of intake air pulsations is detected with reference to the sensing signal output from the intake air pulsation detector, it is possible to exactly judge whether or not the flow paths have been actually switched with reference to the sensing signal output from the existing intake air pulsation detector (airflow sensor 19) provided in the intake passage 15. Moreover, the intake air quantity detector, that is, the intake air pulsation detector, has an advantage that it can quickly detect the period of intake air pulsations because it detects changes in intake air pulsations transmitted at the sound velocity.

Furthermore, if the device of the present embodiment is so constructed as to change the intake air and exhaust gas flow paths by varying the amounts of valve lift determined by the valve actuating mechanism for driving the intake and exhaust valves provided in the individual cylinders 2A–2D by means of the valve stop mechanism controller 42 as stated above, it is possible to quickly switch those flow paths when switching the engine between the special operation mode and the normal operation mode and to properly perform the air-fuel ratio control operation corresponding to the operation mode selected after the flow path switching upon verifying that the flow path switching has been completed with reference to the sensing signal output from the aforementioned intake air pulsation detector.

Provided with multiple pairs of the preceding and following cylinders of which intake and exhaust strokes overlap with each other, the engine of the present embodiment is so constructed as to perform the air-fuel ratio control operation corresponding to the operation mode selected after the flow path switching in all the pairs of the preceding and following cylinders following the point in time when the switching of the flow paths has been first verified in one of the multiple pairs of the preceding and following cylinders. Although the flow paths of the multiple pairs of the preceding and following cylinders are switched in a specific order, the air-fuel ratio control operation corresponding to the operation mode selected after the flow path switching is performed in all the pairs of the preceding and following cylinders at the point in time when the switching of the flow paths has been verified in the first pair of the preceding and following cylinders with reference to the sensing signal from the aforementioned intake air pulsation detector. It is therefore possible to quickly and properly execute the air-fuel ratio control operation corresponding to the operation mode.

Furthermore, the device of the present embodiment is so constructed as to judge that the flow paths have been switched at a point in time when the switching signal has been output to the flow path switcher following a change in engine operating conditions and the occurrence of a change in intake air pulsations has been verified with reference to the sensing signal output from the intake air pulsation detector. This construction makes it possible to prevent an incorrect judgment due to sensing errors of the intake air pulsation detector or noise contained in its sensing signal, exactly judge that the flow paths have been switched based on the aforementioned switching signal, and properly perform the air-fuel ratio control operation according to the judgment result.

Furthermore, the device of the present embodiment is so constructed as to begin preparation for executing the air-fuel ratio control operation after the operation mode switching, such as operation for regulating the amount of intake air by varying the opening of each throttle valve 17, for example, at a point in time when it is verified that the flow path switching signal has been output to the flow path switcher. This construction is advantageous in that the air-fuel ratio control operation corresponding to the operation mode selected after the flow path switching can be quickly executed upon verifying that the switching signal has been output to the flow path switcher following a change in engine operating conditions and the flow paths have been switched as a result of the occurrence of a change in intake air pulsations according to the sensing signal output from the intake air pulsation detector.

Figure 18:
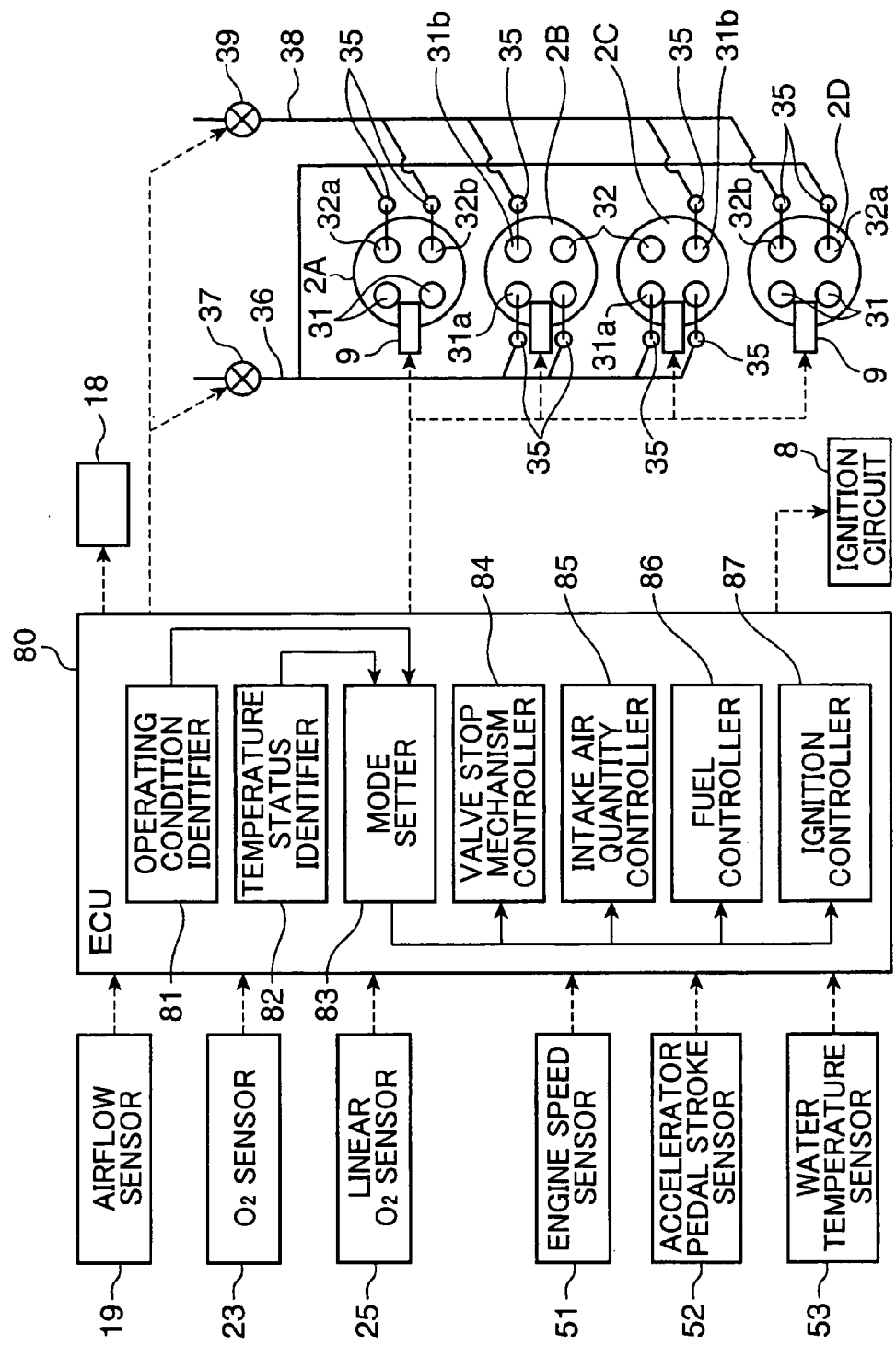
FIG. 18 is a block diagram of a control system according to still another embodiment.

FIG. 18 shows a control system according to still another embodiment the invention. In this embodiment, an ECU 80 includes an operating condition identifier 81, a temperature status identifier 82, a mode setter 83, a valve stop mechanism controller 84, an intake air quantity controller 85, a fuel controller 86 and an ignition controller 87.

Like the operating condition identifier 41 of FIG. 3, the operating condition identifier 81 judges whether the engine operating condition (engine speed and load) falls in the operating range A or B shown in FIG. 4.

The temperature status identifier 82 examines the status of engine temperature based on a signal output from a water temperature sensor 53. Specifically, it judges whether the engine is in a low temperature range in which water temperature (engine temperature) is equal to or lower than a specific value or in a high temperature range in which the water temperature is higher than the specific value.

The mode setter 83 selects the special operation mode in the aforementioned operating range A to combust the burned gas introduced directly from the preceding cylinders 2A, 2D which are in the exhaust stroke into the following cylinders 2B, 2C and the normal operation mode in the aforementioned operating range B to combust the mixture in the individual cylinders 2A–2D independently of one another.

Like the valve stop mechanism controller 42 of FIG. 3, the valve stop mechanism controller 84 controls the individual valve stop mechanisms 35 by controlling the aforementioned control valves 37, 39 depending on whether the engine is in the operating range A or B.

Like the intake air quantity controller 43 of FIG. 3, the intake air quantity controller 85 determines a target intake air quantity from a map, for example, based on the engine operating condition the controls the throttle opening according to the target intake air quantity obtained.

The fuel controller 86 performs basically the same control operation as the fuel injection controller 44 of FIG. 3. Specifically, when the special operation mode has been selected, the fuel controller 86 controls the amounts of fuel injected into the preceding cylinders 2A, 2D such that the air-fuel ratio becomes larger than the stoichiometric air-fuel ratio, preferably approximately equal to twice the stoichiometric air-fuel ratio or larger, to create a lean mixture, and sets injection timing to inject the fuel during the compression stroke to thereby produce stratified charge combustion in the preceding cylinders 2A, 2D. On the other hand, the fuel controller 86 controls the amounts of fuel injected into the following cylinders 2B, 2C to obtain the stoichiometric air-fuel ratio therein by feeding the fuel into burned gas of a "lean" air-fuel ratio introduced from the preceding cylinders 2A, 2D, and sets injection timing to enable ignition and combustion in an atmosphere rich in burned gas. When the normal operation mode has been selected, the fuel controller 86 controls the amounts of injected fuel to make the air-fuel ratio in the individual cylinders 2A–2D equal to or smaller than the stoichiometric air-fuel ratio and sets injection timing to inject the fuel during the intake stroke to thereby produce a uniform mixture.

When the special operation mode is selected, the ratio of the amounts of fuel injected into the following cylinders 2B, 2C to the amounts of fuel injected into the preceding cylinders 2A, 2D is adjusted such that the total amount of fuel injected into the two cylinder pairs with respect to the amount of air introduced into the preceding cylinders 2A, 2D produces the stoichiometric air-fuel ratio and a balance is achieved between a torque generated by the preceding cylinders 2A, 2D and a torque generated by the following cylinders 2B, 2C.

Figure 19:
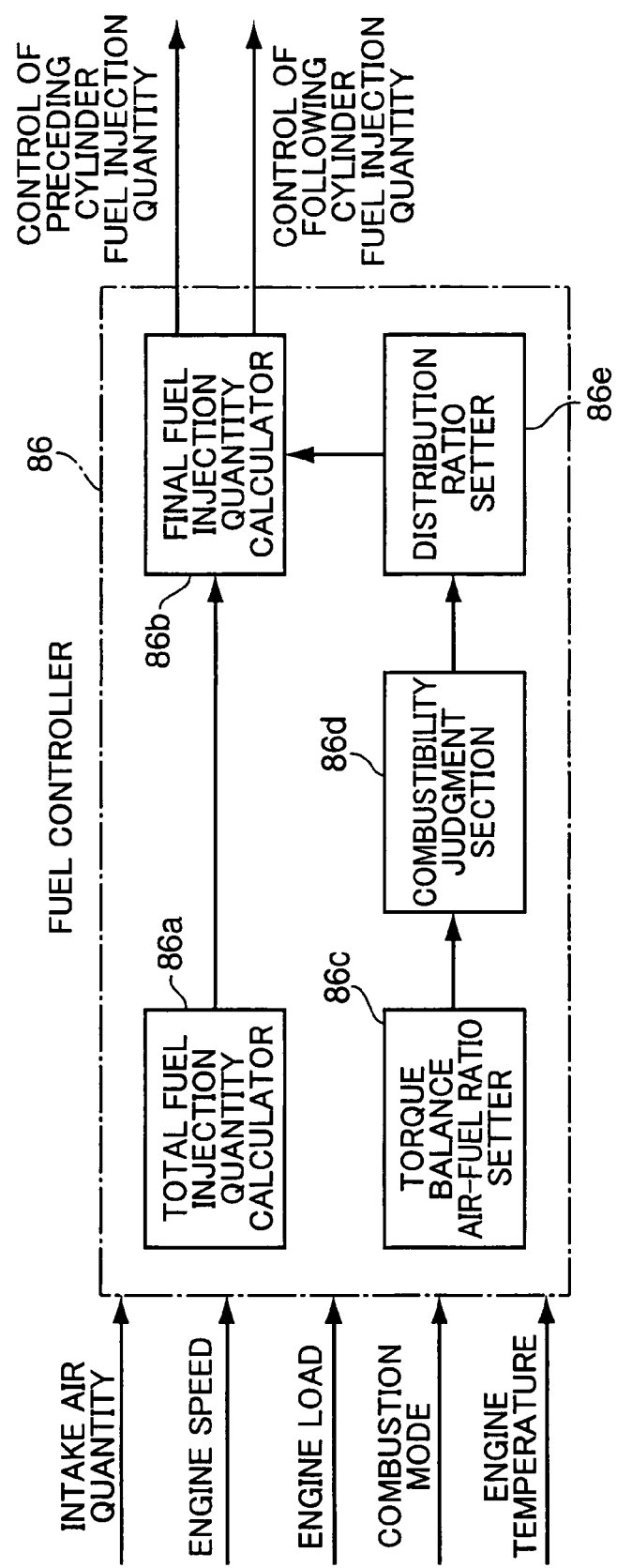
FIG. 19 is a block diagram showing the functional configuration of a fuel controller shown in FIG. 18.

In this respect, the construction of the fuel controller 86 is explained in greater detail referring to FIG. 19. As shown in FIG. 19, the fuel controller 86 includes in its functional configuration a total fuel injection quantity calculator 86a, a final fuel injection quantity calculator 86b, a torque balance air-fuel ratio setter 86c, a combustibility judgment section 86d and a distribution ratio setter 86e.

The total fuel injection quantity calculator 86a calculates the amount of fuel injected from the fuel injectors 9 based on the amount of intake air detected by the airflow sensor 19. In particular, when the special operation mode has been selected, the total fuel injection quantity calculator 86a calculates the sum of the amount of fuel injected into the preceding cylinders 2A, 2D and the amount of fuel injected into the following cylinders 2B, 2C, or the total fuel injection quantity. In this case, the total fuel injection quantity is calculated such that the total amount of injected fuel with respect to the amount of air introduced into the preceding cylinders 2A, 2D produces the stoichiometric air-fuel ratio as stated above.

The final fuel injection quantity calculator 86b determines a final quantity of fuel to be injected. When the normal operation mode has been selected, the final fuel injection quantity calculator 86b adopts the total fuel injection quantity calculated by the total fuel injection quantity calculator 86a as the final fuel injection quantity. When the special operation mode has been selected, on the other hand, the final fuel injection quantity calculator 86b calculates the amounts of fuel injected into the preceding cylinders 2A, 2D and the following cylinders 2B, 2C from the total fuel injection quantity and a later-described distribution ratio and adopts these amounts as the final fuel injection quantity.

The torque balance air-fuel ratio setter 86c, the combustibility judgment section 86d and the distribution ratio setter 86e perform their functions when the special operation mode has been selected.

The torque balance air-fuel ratio setter 86c calculates the air-fuel ratio for the preceding cylinders 2A, 2D from a preprogrammed map according to engine operating conditions (engine speed and load) determined from signals fed from an engine speed sensor 51 and an accelerator pedal stroke sensor 52. The map is produced by experimentally predetermining a difference between the torques generated by the preceding cylinders 2A, 2D and the following cylinders 2B, 2C occurring due to a difference in thermal efficiency including pumping loss, for example, and correcting the air-fuel ratio determined by design in such a manner that this difference in torque becomes "0", wherein the air-fuel ratio so determined is a value equal to the "lean" air-fuel ratio larger than the stoichiometric air-fuel ratio, preferably approximately equal to twice the stoichiometric air-fuel ratio or larger, that is calculated from design. The map correlates such values to the engine operating conditions.

The combustibility judgment section 86d judges in advance whether or not combustion can be normally made based on the ratio of the air-fuel ratios calculated by the torque balance air-fuel ratio setter 86c in accordance with the engine temperature judged by the signal output from the water temperature sensor 53 and the map, and outputs the judgment result to the distribution ratio setter 86e.

The distribution ratio setter 86e determines the distribution ratio of fuel (the total fuel injection quantity mentioned above) to be injected into the preceding and following cylinders 2A–2D from the ratio between the air-fuel ratio of the preceding cylinders 2A, 2D and the air-fuel ratio (stoichiometric air-fuel ratio) of the following cylinders 2B, 2C obtained from the aforementioned map. If the judgment result of the combustibility judgment section 86d is in the affirmative, that is, if it judges that normal combustion can be performed, the distribution ratio setter 86e determines the distribution ratio of fuel based on the ratio of the air-fuel ratios calculated by the torque balance air-fuel ratio setter 86c and outputs the judgment result to the final fuel injection quantity calculator 86b. If the judgment result of the combustibility judgment section 86d is in the negative, on the other hand, that is, if it judges that there is a possibility of misfire or knocking, for instance, the distribution ratio setter 86e outputs a distribution ratio preset within a range in which normal combustion can be performed in the preceding and following cylinders 2A–2D, such as a distribution ratio obtained when the air-fuel ratio of the preceding cylinders 2A, 2D is made equal to the value determined by design (i.e., the value before correction according to the difference in torque), to the final fuel injection quantity calculator 86b. In this embodiment, the distribution ratio setter 86e and the final fuel injection quantity calculator 86b together constitute a final fuel injection quantity controller.

Operational effects of the aforementioned device of the present embodiment are now described.

The special operation mode in which combustion is performed in the dual two-cylinder interconnect configuration is selected in the operating range A on the low-load, low-speed side, while the normal operation mode in which combustion is performed with the intake ports 11, 11a and the exhaust ports 12, 12a of the individual cylinders 2A–2D working independently of one another is selected in the operating range B on the high-load, high-speed side in this embodiment as well. Particularly in the special operation mode, the amounts of fuel injected into the preceding cylinders 2A, 2D and the following cylinders 2B, 2C are controlled such that a balance is achieved between the torques generated by the preceding and following cylinders 2A–2D. This serves to enhance Noise, Vibration and Harshness (NVH) performance of the engine in a desirable fashion. Since there exists a difference in thermal efficiency including pumping loss between the preceding cylinders 2A, 2D and the following cylinders 2B, 2C, noise and vibrations are supposed to occur due to a difference in torque between the cylinders if the amounts of fuel injected into the preceding cylinders 2A, 2D and the following cylinders 2B, 2C are controlled to an equal level. In this embodiment, however, the amounts of injected fuel are controlled as stated above by the fuel controller 86, so that almost no torque difference occurs between the preceding cylinders 2A, 2D and the following cylinders 2B, 2C and, therefore, it is possible to effectively prevent the occurrence of vibrations due to the torque difference.

Furthermore, because the fuel controller 86 judges in advance in a process of setting the amounts of fuel to be injected (distribution ratio) whether combustion can be normally made in the individual preceding and following cylinders 2A–2D (judgment made by the combustibility judgment section 86d) and determines the amounts of fuel to be injected within a range in which normal combustion is possible if there is a possibility that normal combustion can not be performed, it is possible to effectively prevent problems, such as the occurrence of misfire or knocking, caused by controlling the amounts of fuel to be injected such that a balance is achieved between the torques generated by the preceding and following cylinders 2A–2D. More particularly, if priority is given to the achievement of a balance of the generated torques, the amounts of fuel to be injected (distribution ratio) might be set in a range in which the air-fuel ratio in the preceding or following cylinders exceeds a range in which normal combustion is possible, potentially causing misfire or knocking. In the device of the present embodiment, however, the amounts of fuel to be injected are determined after the aforementioned judgment has been made in advance, so that the amounts of fuel to be injected into the preceding and following cylinders 2A–2D are continuously controlled to fall within the range in which normal combustion is possible. It is therefore possible to prevent misfire and knocking and maintain normal operating conditions.

In one variation of the present embodiment, it is possible to control the amounts of fuel to be injected to achieve a balance between the torques generated by the preceding cylinders 2A, 2D and the following cylinders 2B, 2C while producing combustion in the following cylinders 2B, 2C by compressed self-ignition, using a phenomenon that the temperature in the following cylinders 2B, 2C rises as a result of introduction of the burned gas from the preceding cylinders 2A, 2D.

For example, the fuel controller 86 selects, based on the judgment of the engine temperature status, forced ignition mode in which combustion in the following cylinders 2B, 2C is made by forced ignition at low temperatures and compressed self-ignition mode in which combustion in the following cylinders 2B, 2C is made by compressed self-ignition at high temperatures. Particularly in the compressed self-ignition mode, the fuel controller 86 controls the engine to inject the fuel during the intake stroke. As an alternative, the fuel controller 86 selects the compressed self-ignition mode in a high-load region of the operating range A in which the special operation mode is selected as in a later-described embodiment shown in FIGS. 20–25.

Since the amounts of fuel to be injected into the preceding cylinders 2A, 2D and the following cylinders 2B, 2C are so controlled that a balance is achieved between the torques generated by the preceding and following cylinders 2A–2D in the aforementioned compressed self-ignition mode as well, the NVH performance is enhanced, making it possible to ensure desirable operating conditions. In this variation of the embodiment, it is necessary to configure the device such that the torque balance air-fuel ratio setter 86c separately stores a map for determining the ratio of the air-fuel ratios for the compressed self-ignition mode besides the map for determining the ratio of the air-fuel ratios for the forced ignition mode and the ratio of the air-fuel ratios is set based on the map corresponding to the selected mode. As will be later described in detail, the thermal efficiency is improved when compressed self-ignition is performed compared to a case where forced ignition is performed. Therefore, the difference between the torques generated by the preceding cylinders 2A, 2D and the following cylinders 2B, 2C is supposed to become even larger in the compressed self-ignition mode than in the forced ignition mode. The aforementioned separate maps for the compressed self-ignition mode and the forced ignition mode are required because it is difficult to completely eliminate the difference between the torques generated by the preceding and following cylinders 2A–2D by just determining the ratio of the air-fuel ratios based on the same map as used in the case of forced ignition.

In the foregoing embodiment, values held in the map (i.e., the map stored in the torque balance air-fuel ratio setter 86c for setting the ratio of the air-fuel ratios) used as the basis for determining the amounts of fuel to be injected into the preceding and following cylinders 2A–2D are obtained by experimentally determining the difference between the torques generated by the preceding cylinders 2A, 2D and the following cylinders 2B, 2C and by correcting the air-fuel ratio determined by design in such a manner that this difference in torque becomes "0", wherein the air-fuel ratio so determined is a value equal to the "lean" air-fuel ratio larger than the stoichiometric air-fuel ratio, preferably approximately equal to twice the stoichiometric air-fuel ratio or larger, that is calculated from design. Needless to say, it is possible to use values theoretically obtained (or calculated) from parameters concerning pumping loss and thermal efficiency of the preceding and following cylinders 2A–2D using design values.

Figure 20:
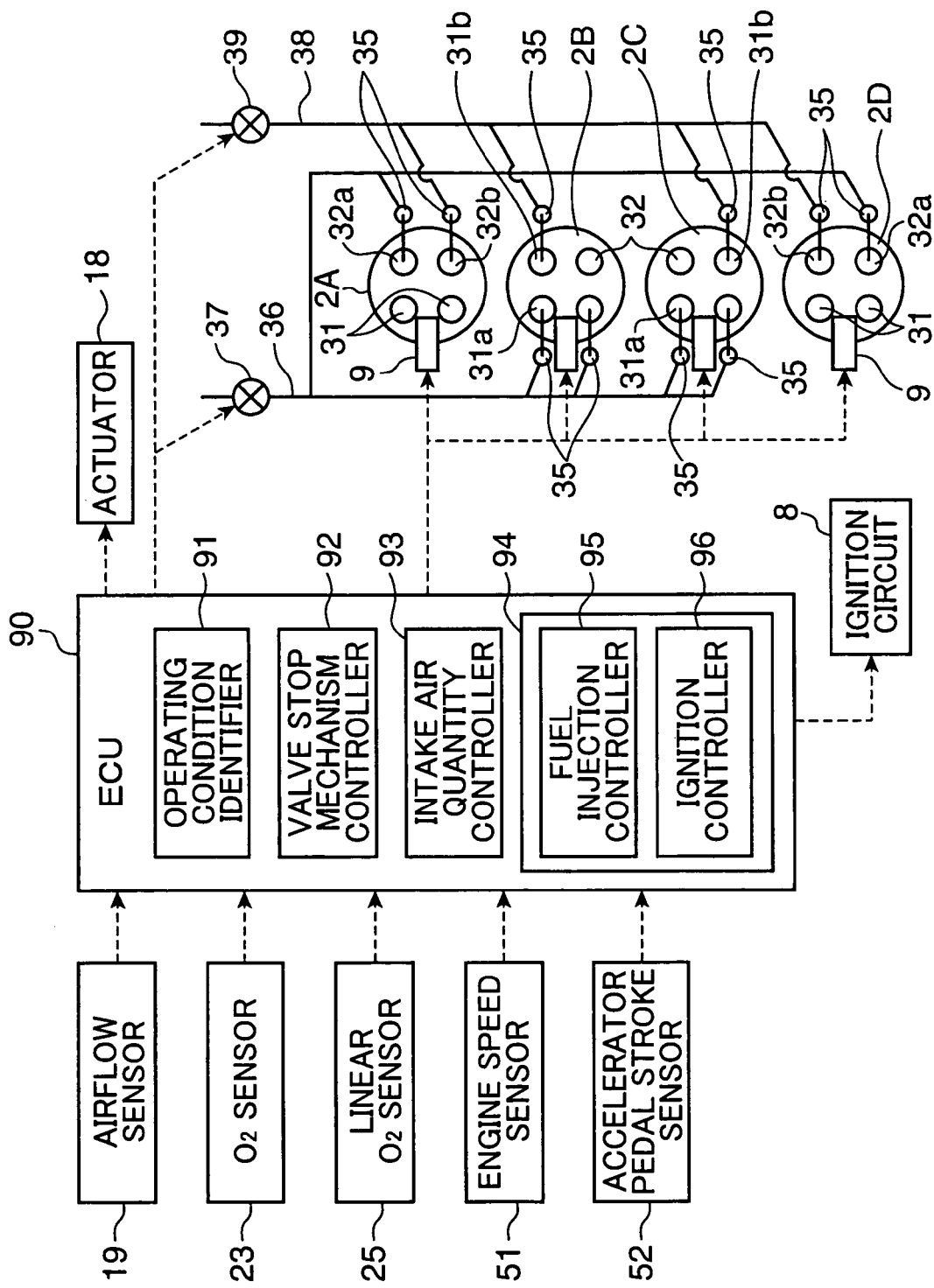
FIG. 20 is a block diagram of a control system according to yet another embodiment.

FIG. 20 shows a control system according to yet another embodiment the invention. An ECU 90 shown in this Figure constitutes a controller for producing combustion with gas flow paths connected to form a dual two-cylinder interconnect configuration (refer to FIG. 10) at least in a low-speed, low-load range. It includes an operating condition identifier 91, a valve stop mechanism controller 92, an intake air quantity controller 93 and a combustion controller 94.

Figure 21:
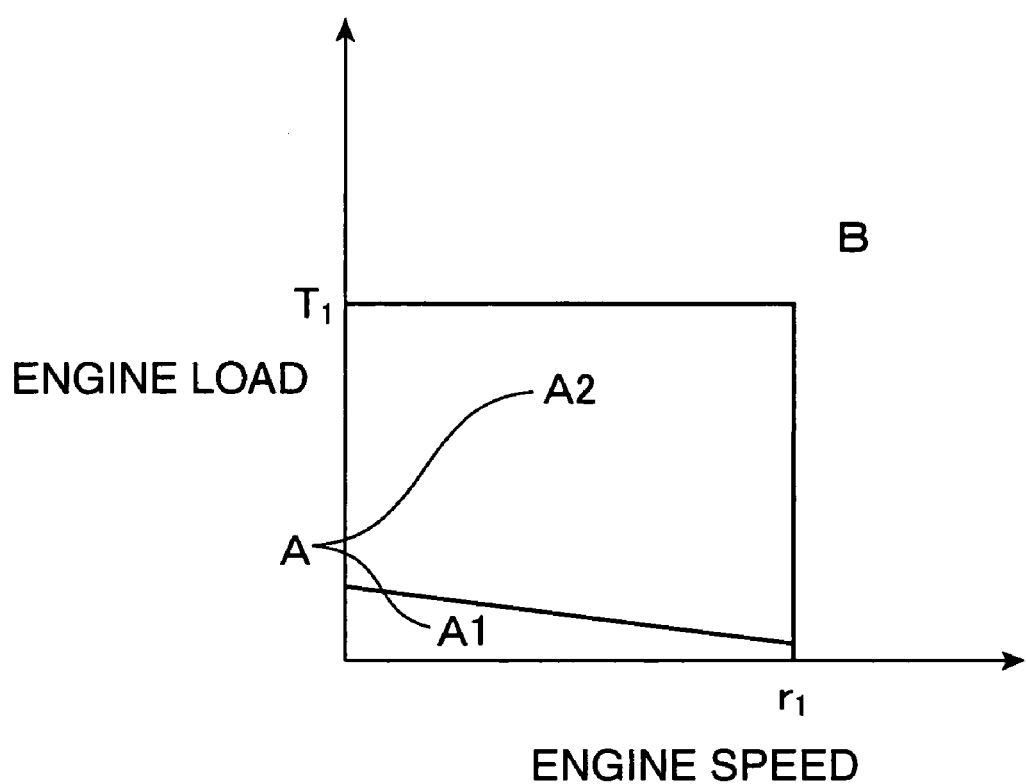
FIG. 21 is an explanatory diagram showing engine operating ranges.
Figure 22:
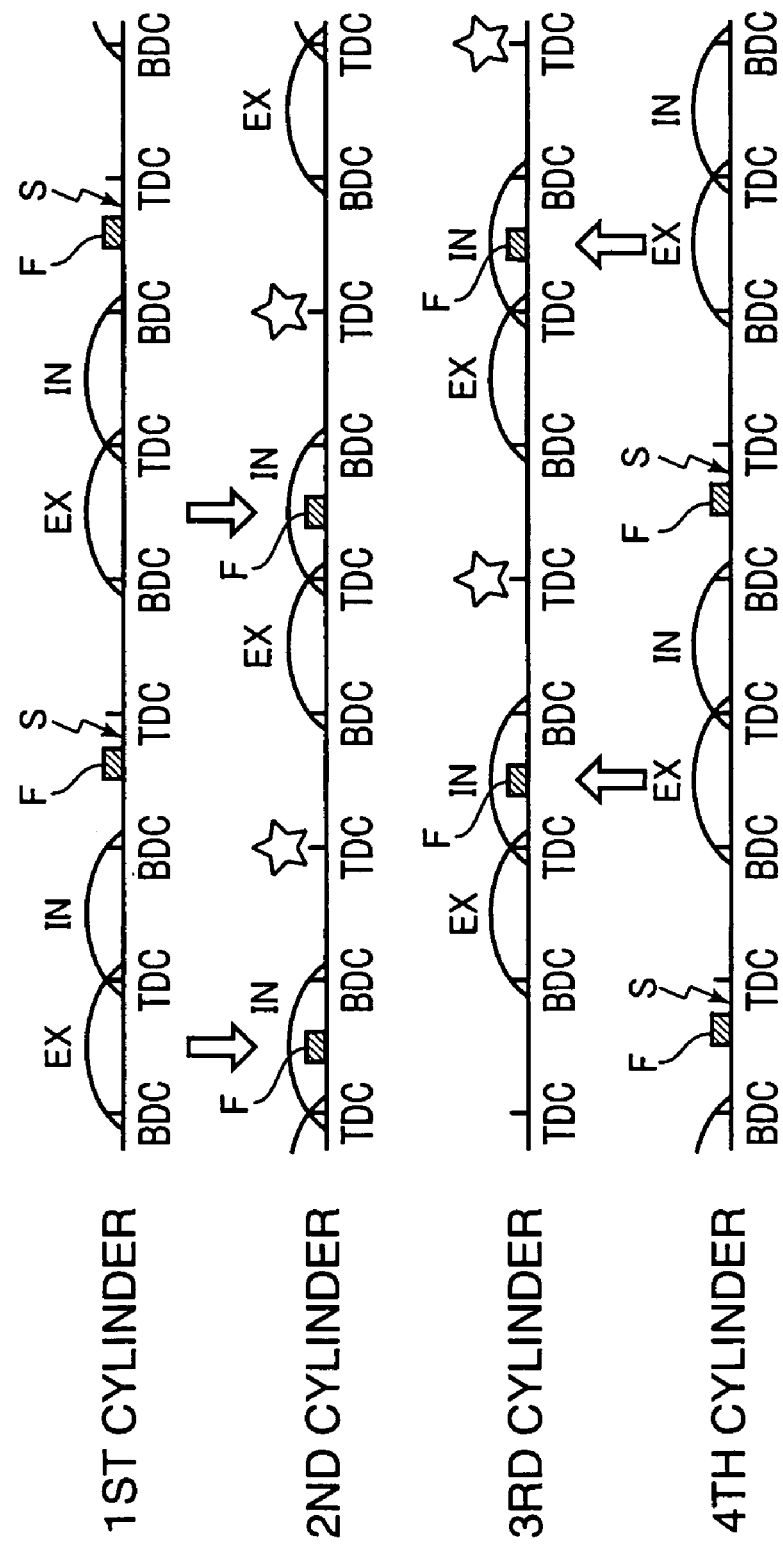
FIG. 22 is a diagram showing timing of exhaust strokes and intake strokes as well as fuel injection timing and ignition timing of the individual cylinders.

The operating condition identifier 91 examines the operating condition of the engine (engine speed and load) based on signals fed from an engine speed sensor 51 and an accelerator pedal stroke sensor 52 and judges whether the engine operating condition falls in an operating range A (including subranges A1 and A2) on a low-load, low-speed side or in an operating range B on a high-load, high-speed side shown in FIG. 21. Of the operating range A, the operating subrange A1 is a region on the low-load side, in which the engine is still in a low-temperature state where the temperature in the following cylinders 2B, 2C has not reached a level suitable for combustion by compressed self-ignition. The operating subrange A1 is made variable with the temperature in the following cylinders 2B, 2C. When the temperature of engine water is relatively low, for example, the temperature in the following cylinders 2B, 2C is also low and, therefore, the operating subrange A1 is expanded. When the engine water temperature is high, on the contrary, the operating subrange A1 is reduced. The operating range A also includes engine idling conditions. On the other hand, the operating subrange A2 is a region of higher load than the operating subrange A1, in which combustion is made by compressed self-ignition in the following cylinders 2B, 2C.

In principle, the operating condition identifier 91 selects the special operation mode in the operating range A to produce combustion in the aforementioned dual two-cylinder interconnect configuration, the normal operation mode in the operating range B to produce combustion in the aforementioned independent cylinder configuration.

The valve stop mechanism controller 92 and the intake air quantity controller 93 are identical in their working to the valve stop mechanism controller 42 and the intake air quantity controller 43 shown in FIG. 3, respectively.

The combustion controller 94 Including a fuel injection controller 95 and an ignition controller 96, the combustion controller 94 differently controls combustion (i.e., fuel injection and ignition) depending particularly on whether the engine is operated in the special operation mode or the normal operation mode.

When the special operation mode is selected, the amounts of fuel injected into the preceding cylinders (first and fourth cylinders 2A, 2D) are so controlled as to produce a "lean" air-fuel ratio larger than the stoichiometric air-fuel ratio, the injection timing is so set as to inject the fuel in the compression stroke to produce a stratified mixture, and the ignition timing is so set as to perform forced ignition near the top dead center in the compression stroke. On the other hand, the amounts of fuel injected into the following cylinders (first and fourth cylinders 2B, 2C) are so controlled as to produce a substantial stoichiometric air-fuel ratio by supplying additional fuel to the burned gas introduced from the preceding cylinders 2A, 2D, and the injection timing is so set as to inject the fuel in the intake stroke. The combustion controller 94 causes combustion by forced ignition when the engine is operated in the operating subrange A1 of FIG. 21 and causes combustion by compressed self-ignition when the engine is operated in the operating subrange A2 of FIG. 21.

Figure 23:
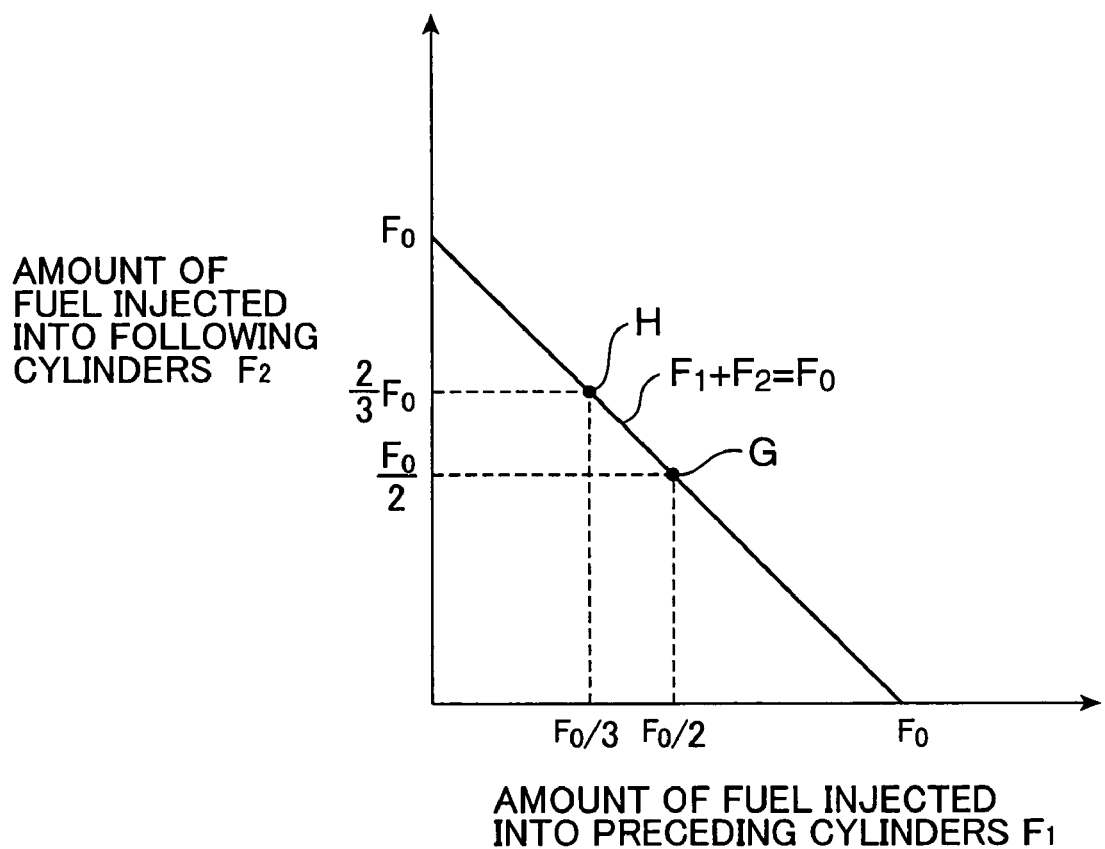
FIG. 23 is a diagram showing excess-air factors in the individual cylinders.

FIG. 23 is a graph showing the relationship between the amounts of fuel injected into the preceding cylinders 2A, 2D and the following cylinders 2B, 2C in the special operation mode on condition that the amount of intake air is unchanged. In FIG. 23, the horizontal axis indicates the amount of fuel F1 injected into each of the preceding cylinders 2A, 2D and vertical axis indicates the amount of fuel F2 injected into each of the following cylinders 2B, 2C. If the amount of fuel to be supplied into each of the preceding cylinders 2A, 2D for producing the stoichiometric air-fuel ratio in relation to the amount of intake air introduced into the same cylinders 2A, 2D is F0, the amounts of fuel F1, F2 have a relationship expressed by the equation F1+F2=F0 as shown in FIG. 23. Thus, the amount of fuel F2 injected into each of the following cylinders 2B, 2C varies inversely when the amount of fuel F1 injected into each of the preceding cylinders 2A, 2D is increased or decreased.

In the higher load region (operating subrange A2 of FIG. 21), a setting at which the amount of fuel F1 injected into each of the preceding cylinders 2A, 2D becomes equal to one-half of the amount of fuel F0 to be supplied for producing the stoichiometric air-fuel ratio (point G shown in FIG. 23) is used as a criterion, and the ratio of F1 to F0 is varied with load. Specifically, the ratio F1/F0 is decreased as the load decreases. In the lower load region (operating subrange A1 of FIG. 21), on the other hand, the amount of fuel F1 injected into each of the preceding cylinders 2A, 2D is set to a value equal to or smaller than one-third of the amount of fuel F0 to be supplied for producing the stoichiometric air-fuel ratio (point H shown in FIG. 23). In this case, the amount of fuel F2 injected into each of the following cylinders 2B, 2C is equal to or larger than two-thirds of the amount of fuel F0.

Figure 24:
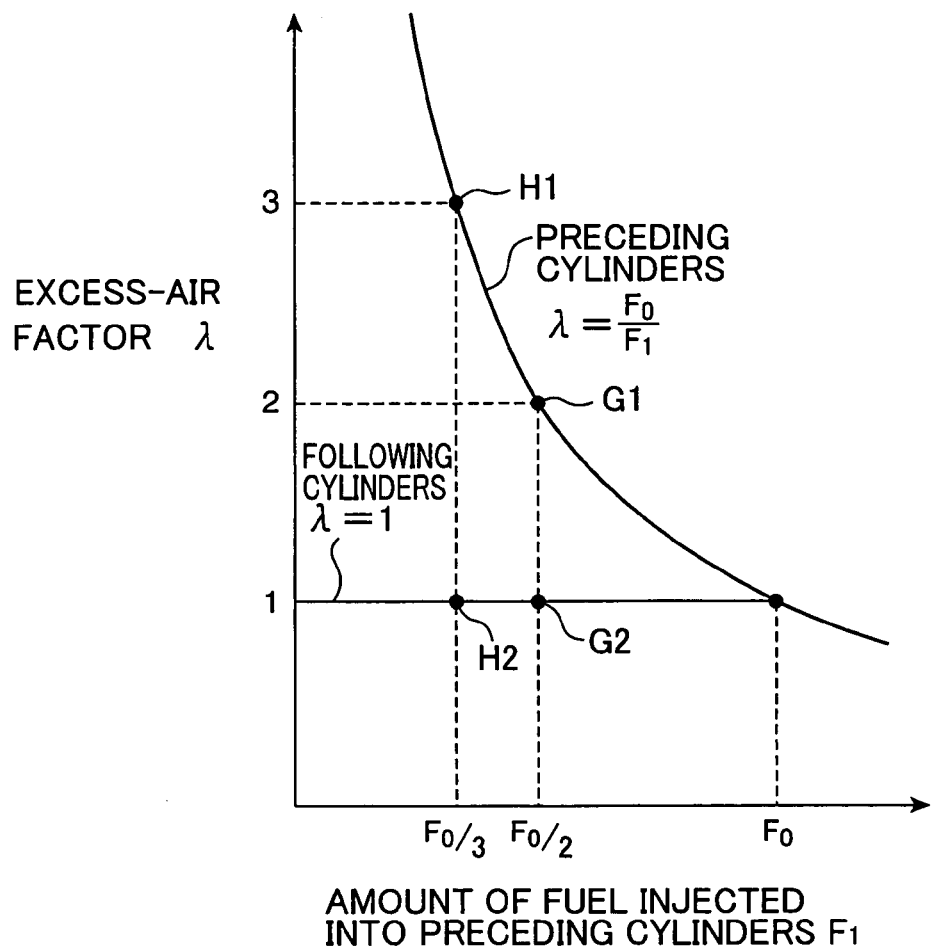
FIG. 24 is a graph showing the amounts of fuel injected into the individual cylinders.

FIG. 24 is a graph showing the relationship between the amounts of fuel injected into the preceding cylinders 2A, 2D and excess-air factors in the preceding and following cylinders 2A–2D. In FIG. 24, the horizontal axis indicates the amount of fuel F1 injected into each of the preceding cylinders 2A, 2D and vertical axis indicates the excess-air factors in the individual cylinders 2A–2D. The excess-air factor $\lambda$ is a parameter indicating how many times as large as the stoichiometric air-fuel ratio ($\lambda=1$) is the air-fuel ratio. When there is the relationship F1+F2=F0 shown in FIG. 23 between the amounts of fuel injected into the individual cylinders 2A–2D, the excess-air factor $\lambda$ in the preceding cylinders 2A, 2D is given by the equation $\lambda=F0/F1$ as shown in FIG. 24. As can be seen this relationship, the excess-air factor $\lambda$ decreases when the amount of fuel F1 injected into each of the preceding cylinders 2A, 2D is increased, and the excess-air factor $\lambda$ increases when the amount of fuel F1 injected into each of the preceding cylinders 2A, 2D is decreased.

When the amount of fuel F1 injected into each of the preceding cylinders 2A, 2D is one-half of the amount of fuel F0 to be supplied for producing the stoichiometric air-fuel ratio (point G shown in FIG. 23), the excess-air factor $\lambda$ in the preceding cylinders 2A, 2D becomes 2 (point G1 shown in FIG. 24). Also, when the amount of fuel F1 injected into each of the preceding cylinders 2A, 2D is one-third of the amount of fuel F0 to be supplied for producing the stoichiometric air-fuel ratio (point H shown in FIG. 23), the excess-air factor $\lambda$ in the preceding cylinders 2A, 2D becomes 3 (point H1 shown in FIG. 24). In the operating subrange A1 on the low-load side, the excess-air factor is equal to or larger than 3 ($\lambda \geq 3$). For example, the excess-air factor is set to $\lambda=3.4$ (air-fuel ratio $\approx 50$).

On the other hand, the amount of fuel F2 injected into each of the following cylinders 2B, 2C is varied inversely when the amount of fuel F1 injected into each of the preceding cylinders 2A, 2D is increased or decreased as shown in FIG. 23. Therefore, the air-fuel ratio becomes substantially equal to the stoichiometric air-fuel ratio and the excess-air factor $\lambda$ is kept constant at $\lambda=1$ in the following cylinders 2B, 2C as shown by points G2 and H2 in FIG. 24.

Figure 25:
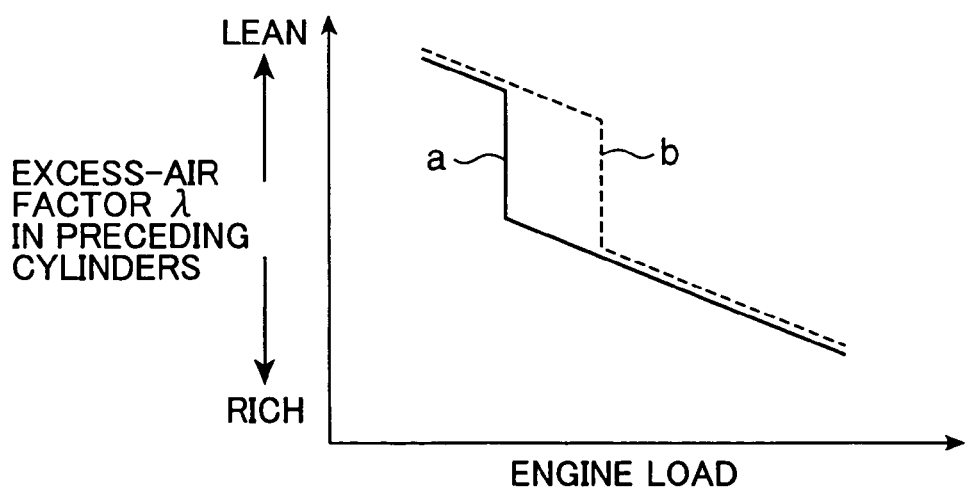
FIG. 25 is a graph showing the relationship between engine load and excess-air factor.

FIG. 25 is a graph showing the relationship between engine load and the excess-air factor $\lambda$ in the preceding cylinders 2A, 2D in the special operation mode, in which a solid line "a" and a broken line "b" indicate engine characteristics at normal temperatures and low temperatures, respectively. As shown in this Figure, the excess-air factor $\lambda$ is so set as to become progressively larger (to produce a leaner mixture) as the engine load becomes smaller. Bending points in the graph where the engine characteristics suddenly change correspond to boundaries between regions in which forced ignition is executed or compressed self-ignition is executed in the following cylinders 2B, 2C. Specifically, the excess-air factor $\lambda$ in the preceding cylinders 2A, 2D is set to become large particularly when combustion is made by forced ignition in the following cylinders 2B, 2C.

Operational effects of the aforementioned device of the present embodiment are now described.

The special operation mode is selected in the operating range A on the low-load, low-speed side, while the normal operation mode is selected in the operating range B on the high-load, high-speed side in this embodiment as well. In the special operation mode, the engine is set to the dual two-cylinder interconnect configuration (refer to FIG. 10). In this condition, fresh air is introduced through the intake passage 15 into the individual preceding cylinders 2A, 2D in the intake stroke and the fuel is injected in the compression stroke with the amounts of injected fuel feedback-controlled such that the air-fuel ratio becomes larger than the stoichiometric air-fuel ratio to produce a lean mixture in the preceding cylinders 2A, 2D. Then, the mixture is ignited at specific ignition points to cause combustion. In the following cylinders 2B, 2C, on the other hand, the fuel is injected in the intake stroke, with the amounts of injected fuel controlled such that the air-fuel ratio becomes substantially equal to the stoichiometric air-fuel ratio by a combination of the burned gas of a "lean" air-fuel ratio introduced from the preceding cylinders 2A, 2D and the newly supplied fuel. Then, combustion is made by forced ignition when the engine is in the lower load region (operating subrange A1 of FIG. 21), while combustion is made by compressed self-ignition as a result of pressure and temperature rises in the combustion chambers 4 near the top dead center in the compression stroke when the engine is in the higher load region (operating subrange A2 of FIG. 21).

Both thermal efficiency and fuel economy are improved particularly in the present embodiment. This is because the amount of fuel F1 injected into each of the preceding cylinders 2A, 2D is set to a value equal to or smaller than one-third of the total amount of fuel F0 and stratified charge combustion is made at an extremely "lean" air-fuel ratio which makes the excess-air factor equal to or larger than 3 ($\lambda \geq 3$). On the other hand, the amount of fuel F2 injected into each of the following cylinders 2B, 2C is set to a value equal to or larger than two-thirds of the total amount of fuel F0 and combustion is made by forced ignition substantially at the stoichiometric air-fuel ratio ($\lambda=1$). Since intake air introduced into the following cylinders 2B, 2C is the high-temperature burned gas circulated from the preceding cylinders 2A, 2D, evaporation of the fuel is accelerated resulting in an improvement in combustibility and pumping loss in the following cylinders 2B, 2C is smaller than in the preceding cylinders 2A, 2D. As the proportion of the fuel combusted in the following cylinders 2B, 2C so controlled is increased, the fuel economy is further improved as a whole.

Furthermore, the temperature in the following cylinders 2B, 2C rises relatively quickly as the amounts of fuel supplied to these cylinders are increased. When the temperature in the following cylinders 2B, 2C has increased, the operating subrange A1 becomes smaller, so that it becomes easier for these cylinders to transfer to the operating subrange A2. For this reason, the following cylinders 2B, 2C can be transferred to a state of combustion by compressed self-ignition so early that a still further improvement in fuel economy can be achieved.

Since the aforementioned control operation is performed close to idling engine speed as well, it is possible to achieve stable combustion free of misfire and produce a high fuel economy improvement effect by swiftly increasing the temperature in the following cylinders 2B, 2C.

When the special operation mode is selected in the operating subrange A2, a setting at which the amount of fuel F1 injected into each of the preceding cylinders 2A, 2D becomes equal to the amount of fuel F2 injected into each of the following cylinders 2B, 2C is used as a criterion, and the proportion of the amount of fuel F1 injected into each of the preceding cylinders 2A, 2D is increased as the engine load increases. For this reason, the temperature of the burned gas introduced into the following cylinders 2B, 2C is apt to further increase, and this results in an increase in ignitability by compressed self-ignition. On the other hand, the temperature in the following cylinders 2B, 2C has already been sufficiently increased, combustion by compressed self-ignition is performed. Thus, the mixture in the entire combustion chambers 4 of the following cylinders 2B, 2C burns up in an instant. It is therefore possible to prevent delayed combustion which would not produce any work and gain a high fuel economy improvement effect.

In addition, since the air-fuel ratio in the preceding cylinders 2A, 2D is set to progressively larger values (to produce a leaner mixture) as the engine load decreases in the special operation mode, it is possible to obtain the fuel economy improvement effect without reversing the tendency of change of the air-fuel ratio with respect to changes in the engine load. This facilitates the control operation and helps achieve stable combustion.

Although the operating subrange A1 shown in FIG. 21 is judged to be the low-temperature state in which the temperature in the following cylinders 2B, 2C has not reached the level suitable for combustion by compressed self-ignition and this status is considered variable with such parameters as the engine water temperature in the present embodiment, other parameters such as intake air temperature may be additionally taken into account in judging the low-temperature state. Alternatively, a temperature estimating device may be provided to estimate the temperature in the following cylinders 2B, 2C or the temperature in the following cylinders 2B, 2C may be directly or indirectly measured, such that the low-temperature state can be judged based on the estimated or measured temperature.

The engine characteristics shown in FIG. 25 need not necessarily be used in setting the excess-air factor λ of the preceding cylinders 2A, 2D, but other engine characteristics expressed by rightward-descending curves may be used. Furthermore, such curves may be more finely segmented according to the engine speed or other conditions.

While the invention has thus far been described with reference to the several embodiments thereof, it is not limited thereto but various alternatives and changes are possible. Other embodiments of the invention and variations thereof are described in the following.

Figure 26:
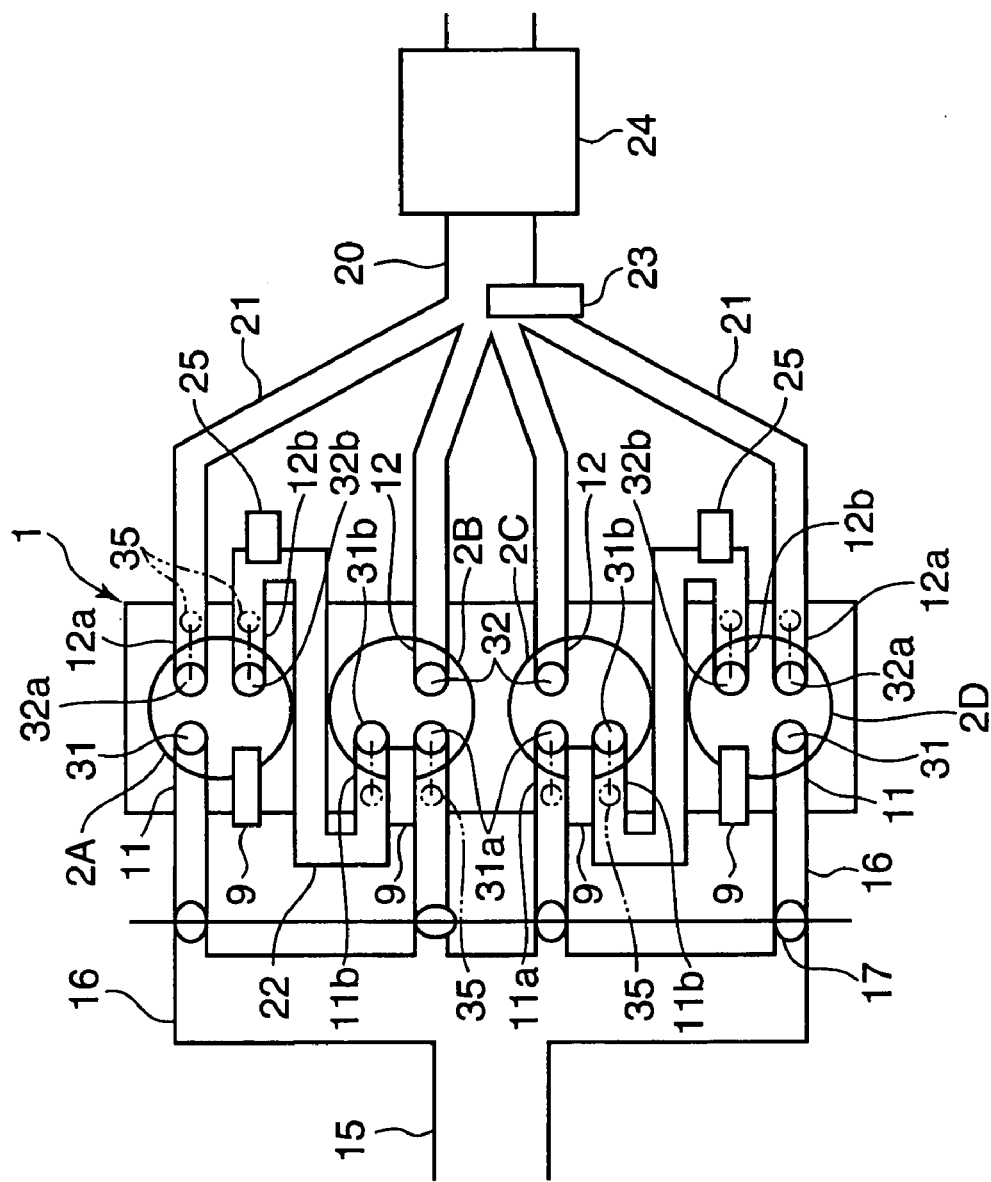
FIG. 26 is a general plan view showing the construction of intake and exhaust ports, intercylinder gas channels and associated elements according to another embodiment.

(1) Intake and exhaust ports and intercylinder gas channels may be arranged as shown in FIG. 26.

As illustrated in this Figure, the first and fourth cylinders 2A, 2D which are preceding cylinders are each provided with an intake port 11 in a left half of the combustion chamber 4 and a first exhaust port 12a and a second exhaust port 12b in a right half of the combustion chamber 4. Also, the second and third cylinders 2B, 2C which are following cylinders are each provided with a first intake port 11a and a second intake port 11b in the left half of the combustion chamber 4 and an exhaust port 12 in the right half of the combustion chamber 4. One each intercylinder gas channel 22 connects the second exhaust ports 12b of the preceding cylinders 2A, 2D to the second intake ports 11b of the following cylinders 2B, 2C, the intercylinder gas channels 22 running across the engine body 1 perpendicular to its cylinder bank. The construction of the engine is otherwise the same as the embodiment shown in FIGS. 1 and 2.

Figure 27:
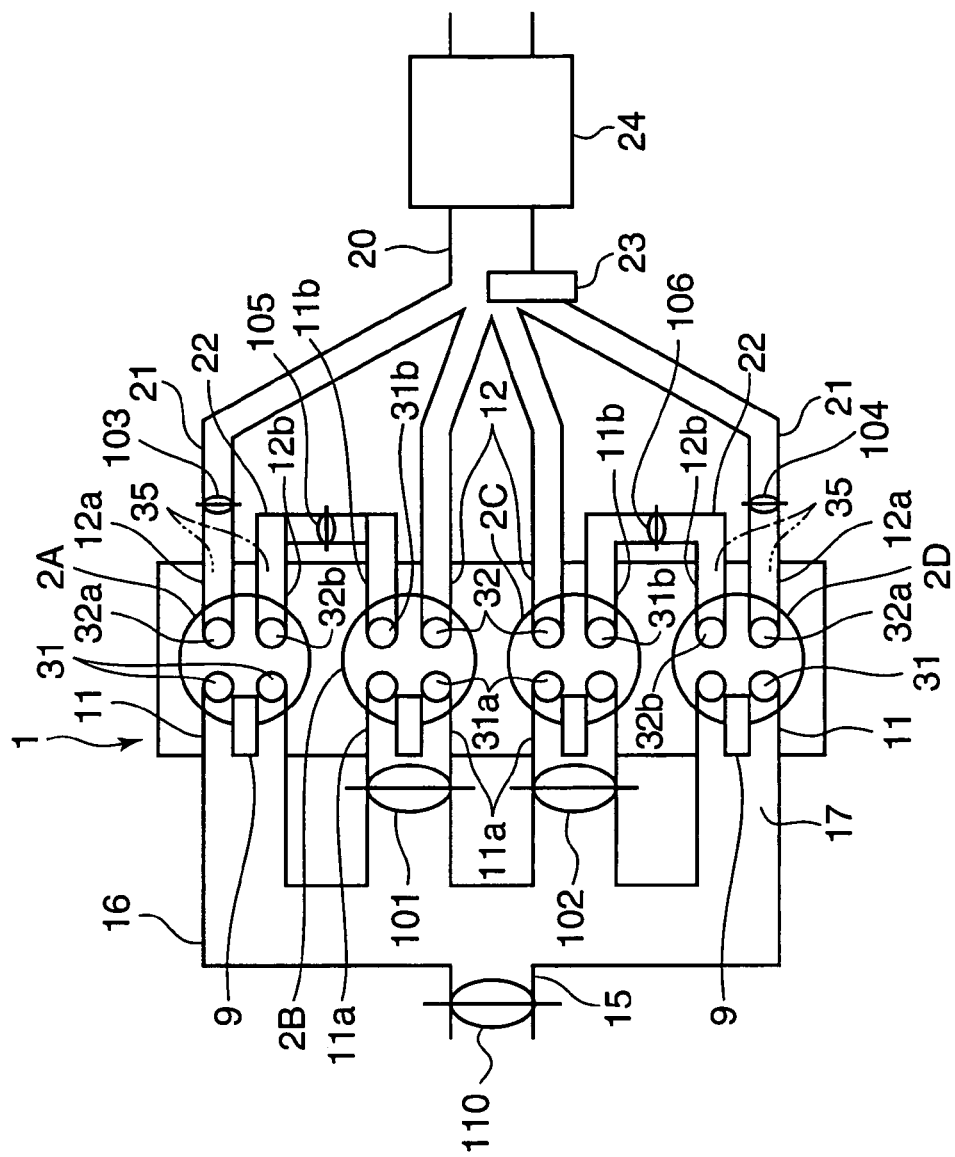
FIG. 27 is a general plan view showing a flow path switcher and associated elements according to another embodiment.

(2) While the flow path switcher is formed by using the valve stop mechanisms 35 in each of the aforementioned embodiments, the flow path switcher may be formed by using on-off valves provided in flow channels as shown in FIG. 27.

As illustrated in this Figure, intake on-off valves 101, 102 are provided in the branched intake channels 16 individually connected to the first intake ports 11a of the second and third cylinders 2B, 2C which are following cylinders, and exhaust on-off valves 103, 104 are provided in the branched exhaust channels 21 individually connected to the first exhaust ports 12a of the first and fourth cylinders 2A, 2D which are preceding cylinders. Further, gas channel on-off valves 105, 106 are provided in the intercylinder gas channels 22 between the first cylinder 2A and the second cylinder 2B, and between the fourth cylinder 2D and the third cylinder 2C. Driven by unillustrated actuators, these on-off valves 101–106 are individually switchable between a state of opening the respective flow channels (open state) and a state of closing the respective flow channels (closed state).

The aforementioned on-off valves 101–106 are controlled by an unillustrated controller as follows depending on whether the engine operating condition falls in the operating range A on the low-load, low-speed side or in the operating range B on the high-load, high-speed side.

Operating range A: The intake on-off valves 101, 102 and the exhaust on-off valves 103, 104 are in the closed state, while the gas channel on-off valves 105, 106 are in the open state.

Operating range B: The intake on-off valves 101, 102 and the exhaust on-off valves 103, 104 are in the open state, while the gas channel on-off valves 105, 106 are in the closed state.

Figure 28:
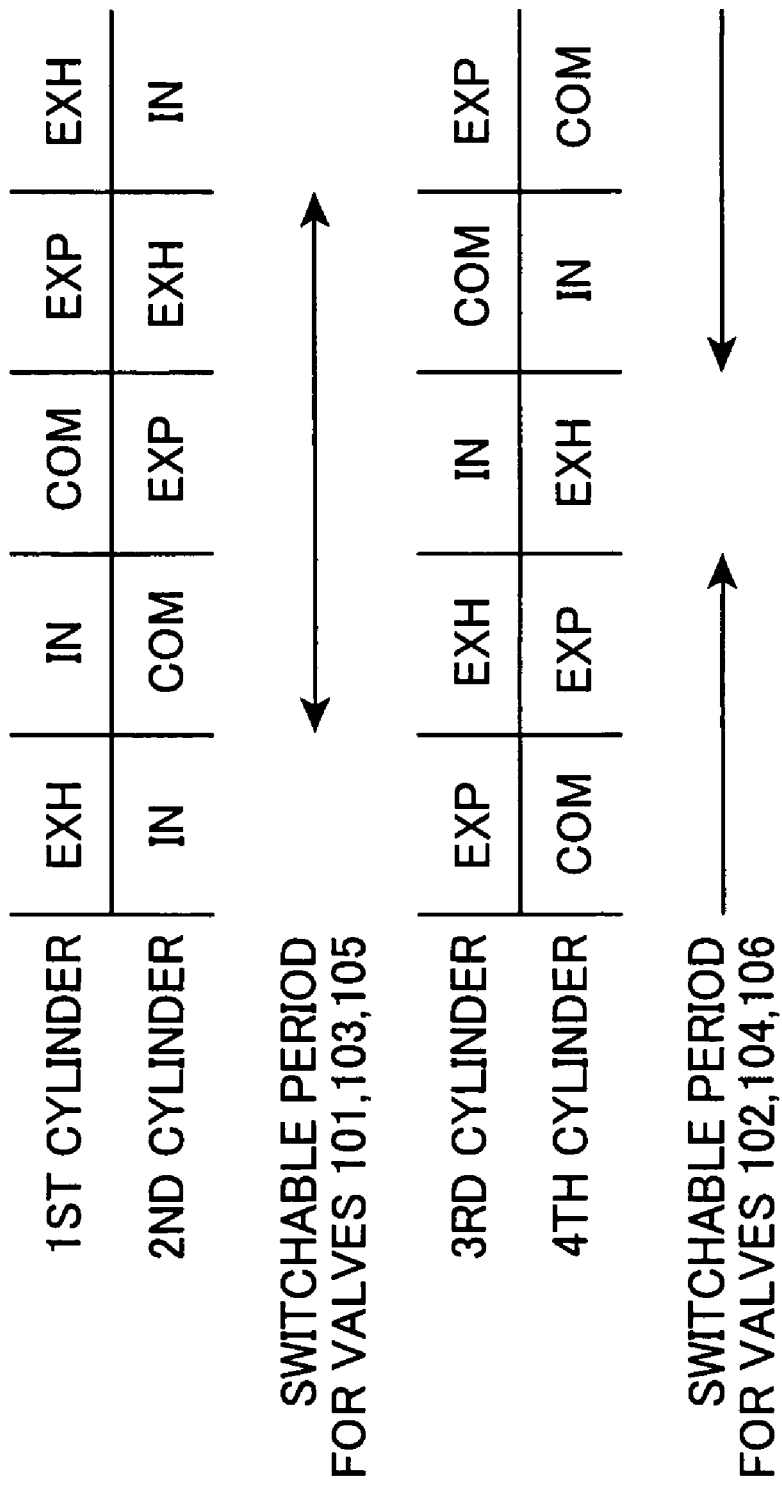
FIG. 28 is an explanatory diagram showing switchable periods during which on-off valves may be switched when engine operating condition has changed according to the embodiment of FIG. 27.

When the engine operating condition is switched between the operating ranges A and B, the individual on-off valves 101–106 should be switched between their open and closed states during valve switchable periods shown in FIG. 28. Specifically, if the state of the individual on-off valves is switched during a period when the exhaust stroke and the intake stroke of a pair of the preceding and following cylinders overlap, there arises a such problem that the burned gas drawn from the preceding cylinder mixes with fresh air and they are introduced together into the following cylinder. Thus, the on-off valves 101, 103, 105 should be switched within a period excluding the period when the exhaust stroke of the first cylinder 2A and the intake stroke of the second cylinder 2B overlap, and the on-off valves 102, 104, 106 should be switched within a period excluding the period when the exhaust stroke of the fourth cylinder 2D and the intake stroke of the third cylinder 2C overlap.

The on-off valves 101–106 and the controller for controlling them in this fashion together constitute the aforementioned flow path switcher.

The intake valves 31, the first and second exhaust valves 32a, 32b, the first and second intake valves 31a, 31b and the exhaust valves 32 provided in the ports of the individual cylinders 2A–2D are caused to continually open and close by an unillustrated valve actuating mechanism. Operation for controlling fuel injection from the individual fuel injectors 9 is the same as that of the foregoing embodiments.

Designated by the numeral 110 in FIG. 27 is a throttle valve provided in the intake passage 15.

The engine is set to the dual two-cylinder interconnect configuration in the operating range A and extremely lean mixture combustion is performed in the preceding cylinders 2A, 2D in this embodiment as well. In the operating range A, the burned gas discharged from the preceding cylinders 2A, 2D is introduced into the respective following cylinders 2B, 2C through the intercylinder gas channels 22, combustion in the following cylinders 2B, 2C is made under conditions in which the stoichiometric air-fuel ratio has been produced by a combination of the burned gas of a "lean" air-fuel ratio and newly supplied fuel, and the burned gas discharged from only the following cylinders 2B, 2C is led to the exhaust passage 20 associated with the three-way catalyst 24. In the operating range B, on the other hand, the intake ports 11, 11a and the exhaust ports 12, 12a of the individual cylinders. 2A–2D work independently of one another, so that fresh air is introduced through the intake passage 15 and the intake ports 11, 11a into the respective cylinders 2A–2D and the burned gas discharged through the exhaust ports 12, 12a of the individual cylinders 2A–2D is led to the exhaust passage 20. The present embodiment provides the same operational and working effects as the earlier-mentioned basic embodiment in this fashion.

According to this embodiment, the construction of the flow path switcher can be made relatively simple. When the engine operating condition is switched, the on-off valves 101–106 should just be switched during the switchable periods shown in FIG. 28 and extremely high accuracy is not required in their switching timing, so that their control operation is easy.

Figure 29:
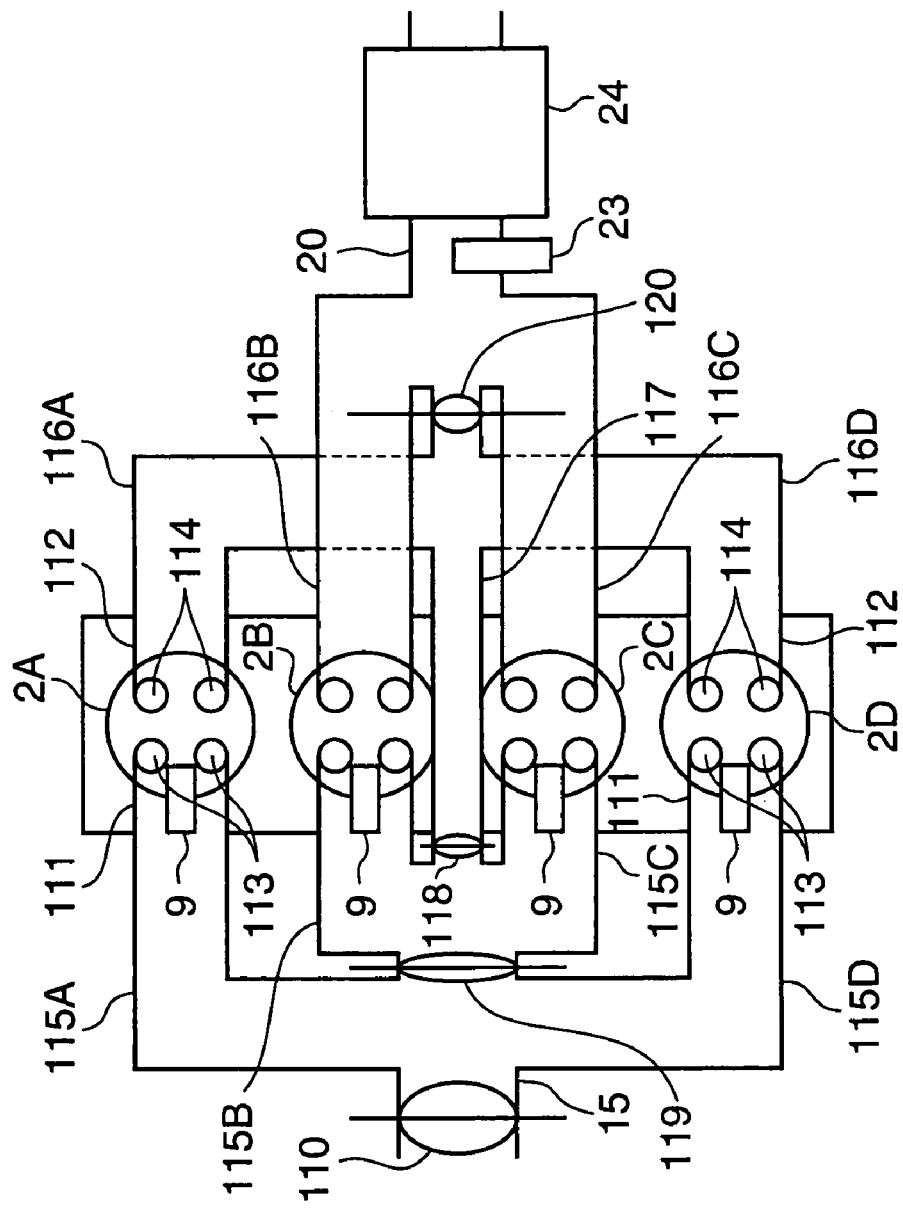
FIG. 29 is a general plan view showing a flow path switcher and associated elements according to still another embodiment.

(3) Flow channels for the individual cylinders 2A–2D and the flow path switcher may be configured as shown in FIG. 29.

As illustrated in this Figure, there are provided intake ports 111 and exhaust ports 112 individually opening to the cylinders 2A–2D of the engine body 1, and an unillustrated valve actuating mechanism continually open and close intake valves 113 and exhaust valves 114 provided in these ports 111, 112. Branched intake channels 115A–115D are connected to the intake ports 111 of the cylinders 2A–2D while branched exhaust channels 116A–116D are connected to the exhaust ports 112 of the cylinders 2A–2D. An intercylinder gas channel 117 is connected between a joint portion of the branched exhaust channels 116A, 116D of the preceding cylinders (first and fourth cylinders) 2A, 2D and a joint portion of the branched exhaust channels 116B, 116C of the following cylinders (second and third cylinders) 2B, 2C, and a first on-off valve 118 is provided in the intercylinder gas channel 117.

A joint portion of the branched intake channels 115A, 115D of the preceding cylinders 2A, 2D is always connected to an upstream portion of the intake passage 15, and a second on-off valve 119 is provided in a connecting portion between a joint portion of the branched intake channels 115B, 115C of the following cylinders 2B, 2C and the upstream portion of the intake passage 15 for opening and closing this connecting portion. On the other hand, the joint portion of the branched exhaust channels 116B, 116C of the following cylinders 2B, 2C is always connected to a downstream portion the exhaust passage 20, and a third on-off valve 120 is provided in a connecting portion between the joint portion of the branched exhaust channels 116A, 116D of the preceding cylinders 2A, 2D and the downstream portion the exhaust passage 20 for opening and closing this connecting portion.

The aforementioned on-off valves 118–120 are controlled by an unillustrated controller as follows depending on whether the engine operating condition falls in the operating range A on the low-load, low-speed side or in the operating range B on the high-load, high-speed side.

Operating range A: The first on-off valve 118 is in the open state, while the second and third on-off valves 119, 120 are in the closed state.

Operating range B: The first on-off valve 118 is in the closed state, while the second and third on-off valves 119, 120 are in the open state.

The on-off valves 118–120 and the controller for controlling them in this fashion together constitute the aforementioned flow path switcher. Operation for controlling fuel injection from the individual fuel injectors 9 is the same as that of the foregoing embodiments.

The engine is set to the dual two-cylinder interconnect configuration in the operating range A, in which the burned gas discharged from the preceding cylinders 2A, 2D is introduced directly into the following cylinders 2B, 2C through the intercylinder gas channel 117 between two cylinders of which intake and exhaust strokes overlap, and the burned gas discharged from only the following cylinders 2B, 2C is led to the exhaust passage 20 associated with the three-way catalyst 24 in this embodiment as well. In the operating range B, on the other hand, the intake ports 111 and the exhaust ports 112 of the individual cylinders 2A–2D work independently of one another, so that fresh air is introduced through the intake passage 15 and the intake ports 111 into the respective cylinders 2A–2D and the burned gas discharged through the exhaust ports 112 of the individual cylinders 2A–2D is led to the exhaust passage 20.

Figure 30:
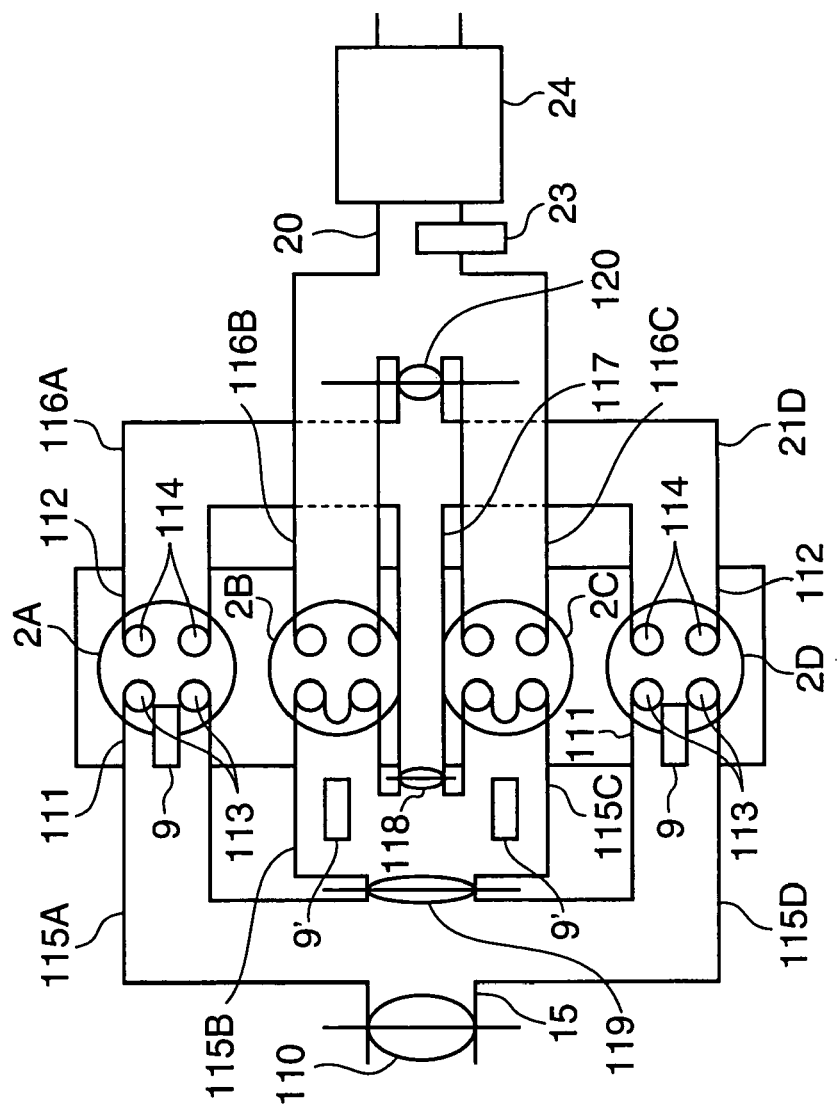
FIG. 30 is a general plan view showing an embodiment in which fuel injectors are provided in intake channels of the following cylinders.

(4) If ignitability can be maintained even when the fuel is uniformly dispersed in the following cylinders 2B, 2C as described heretofore, fuel injectors provided in the following cylinders 2B, 2C need not necessarily be of a direct injection type for injecting the fuel directly into the combustion chambers 4. For example, fuel injectors 9' for injecting the fuel into the following cylinders 2B, 2C may be provided in the branched intake channels 115B, 115C which constitute intercylinder gas channels as shown in FIG. 30. In this case, uniform charge combustion is performed in the following cylinders 2B, 2C by injecting the fuel in the intake stroke from the fuel injectors 9' to produce the stoichiometric air-fuel ratio in the following cylinders 2B, 2C.

According to this arrangement, heat of exhaust gas introduced from the preceding cylinders 2A, 2D into the following cylinders 2B, 2C is moderately dissipated, and the fuel is supplied to a great deal of ideal EGR gas in which excess air and burned gas are mixed during a process of introducing the gas into the following cylinders 2B, 2C. As a result, evaporation of the fuel and its mixing with the EGR gas are accelerated, and combustibility in the following cylinders 2B, 2C is further improved with a great deal of EGR gas introduced thereinto.

Figure 31:
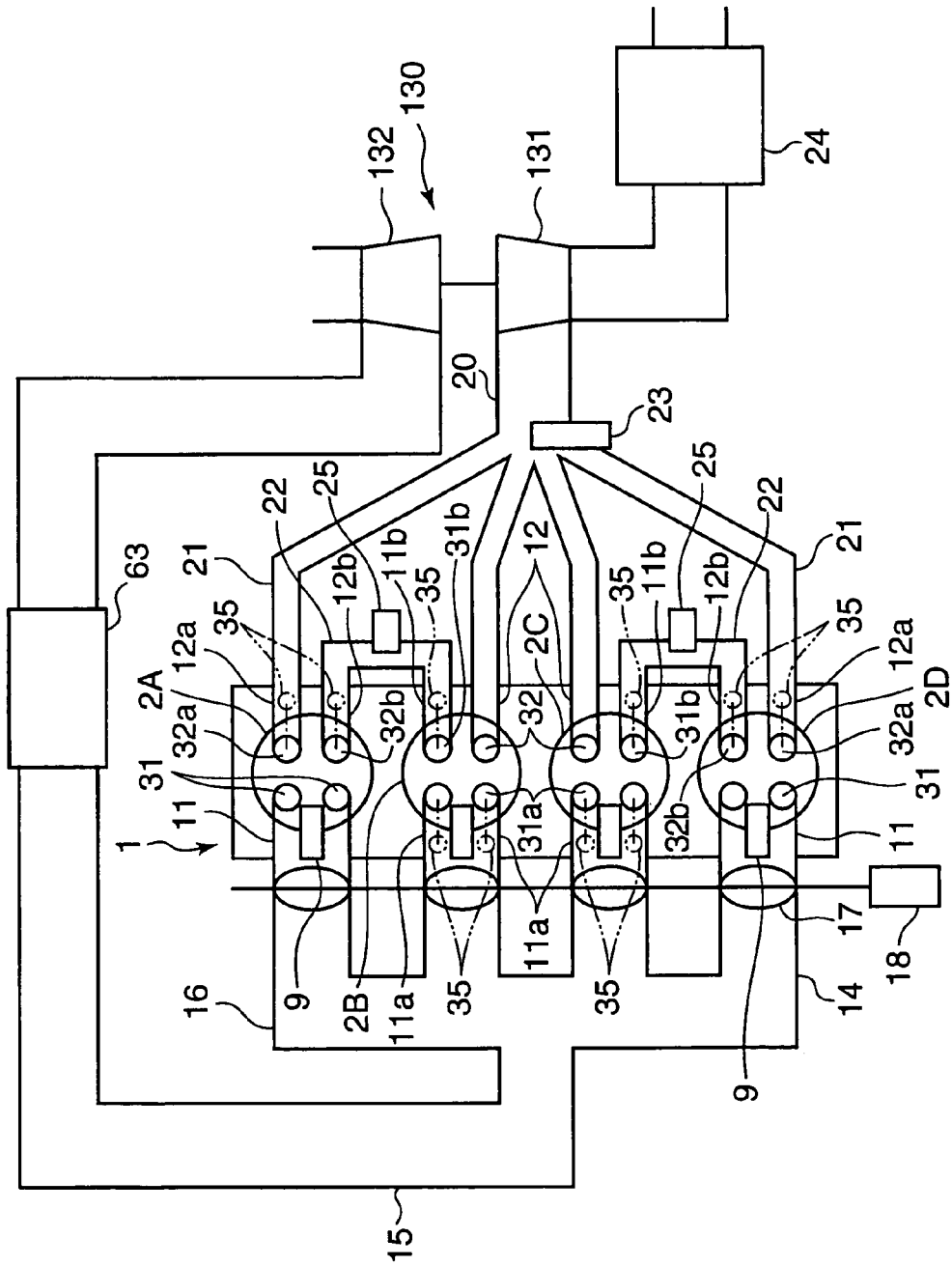
FIG. 31 is a general plan view showing an embodiment provided with a turbocharger.

(5) Furthermore, a supercharger like a turbocharger 130 shown in FIG. 31, for example, may be provided in each of the aforementioned embodiments. Referring to FIG. 31, the turbocharger 130 includes a turbine 131 provided in the exhaust passage 20 and a compressor 132 provided in the intake passage 15. The turbine 131 is caused to turn by energy of the exhaust gas flowing through the exhaust passage 20, whereby the compressor 132 interlocked with the turbine 131 turns and produces a high intake-air pressure. Designated by the numeral 133 is an intercooler provided in the intake passage 15 downstream of the compressor 132.

This arrangement makes it possible to achieve a fuel economy improvement effect by using the aforementioned dual two-cylinder interconnect configuration up to relatively high-load regions.

(6) While the gas flow paths are switched by the flow path switcher depending on whether the engine operating condition falls in the operating range A on the low-load, low-speed side or in the operating range B on the high-load, high-speed side in the foregoing embodiments, the gas flow paths may be connected to form the aforementioned dual two-cylinder interconnect configuration in the entire operating ranges of the engine.

(7) The device of this invention is also applicable to multicylinder engines other than the four-cylinder engine. In a six-cylinder engine, for example, the exhaust stroke of one cylinder does not perfectly coincide in timing with the intake stroke of another cylinder. In such a case, each pair of preceding and following cylinders should be such that the exhaust stroke of one cylinder precedes and coincides in part with the intake stroke of the other cylinder.

(8) The construction of the foregoing embodiments may be modified such that EGR operation is performed on the preceding cylinders 2A, 2D only. Since the amount of NOx generated in the preceding cylinders 2A, 2D is reduced and the burned gas introduced from the preceding cylinders 2A, 2D into the following cylinders 2B, 2C serves to reduce the amount of NOx generated therein in the same way that the EGR operation works on the preceding cylinders 2A, 2D, it is possible to effectively reduce NOx emissions.

INDUSTRIAL APPLICABILITY

As thus far described, the control device of the invention serves to significantly improve fuel economy due to an improvement in thermal efficiency and a reduction in pumping loss in the preceding cylinders achieved by lean burn operation therein and yet realize sufficient emission-cleaning performance by use of a three-way catalyst alone. Accordingly, the provision of a lean NOx catalyst becomes unnecessary, resulting in a cost reduction, and it becomes unnecessary to temporarily decrease the air-fuel ratio (to produce a richer mixture) during lean burn operation, making is possible to avoid a decrease in fuel economy improvement effect due to temporary enrichment of the mixture. In addition, the control device of the invention serves to get rid of the earlier-mentioned sulfur-poisoning problem of the lean NOx catalyst.

Furthermore, high-temperature burned gas discharged from the preceding cylinders is introduced into the following cylinders through intercylinder gas channels. The provision of the intercylinder gas channels serves to regulate gas temperature by heat dissipation along their length and sufficiently mix the burned gas with excess air, thereby offering improved combustibility in the following cylinders.

The invention claimed is:

1. A control device for a multicylinder spark-ignition engine of which individual cylinders go through successive cycles of intake, compression. expansion and exhaust strokes with specific phase delays, in which fresh air and gas flow paths are connected to form a two-cylinder interconnect configuration at least in a low-load, low-speed operating range such that, in a pair of preceding and following cylinders whose exhaust and intake strokes overlap each other, burned gas discharged from the preceding cylinder which is currently in the exhaust stroke is introduced directly into the following cylinder which is currently in the intake stroke through an intercylinder gas channel and gas discharged from only the following cylinder is led to an exhaust passage provided with a three-way catalyst, said control device comprising:

a controller for controlling fuel supply to the individual cylinders in such a manner that combustion in the preceding cylinder is made under lean mixture conditions at an air-fuel ratio larger than the stoichiometric air-fuel ratio by a specific amount, fuel for the following cylinder is supplied in an amount corresponding to the burned gas which was generated by combustion in the preceding cylinder, and a whole amount of which is supplied to the following cylinder and combustion in the following cylinder is made under conditions of the stoichiometric air-fuel ratio when the engine is in the two-cylinder interconnect configuration; and a flow path switcher for switching the fresh air and gas flow paths to form an independent cylinder configuration in a high-load, high-speed operating range, in which intake ports and exhaust ports of the individual cylinders work independently of one another such that fresh air is introduced through an intake passage into the intake ports of the individual cylinders and exhaust gas discharged through the exhaust ports of the individual cylinders is led to the exhaust passage;

wherein said controller makes the air-fuel ratio in the individual cylinders equal to or smaller than the stoichiometric air-fuel ratio in the high-load, high-speed operating range.

2. The control device for the spark-ignition engine according to claim 1, wherein said preceding cylinder is provided with an intake port connected to the intake passage, a first exhaust port connected to the exhaust passage and a second exhaust port connected to the intercylinder gas channel, while said following cylinder is provided with a first intake port connected to the intake passage, a second intake port connected to the intercylinder gas channel and an exhaust port connected to the exhaust passage, said flow path switcher including:

a valve stop mechanism which individually switches first and second exhaust valves for opening and closing the first and second exhaust ports of the preceding cylinder as well as first and second intake valves for opening and closing the first and second intake ports of the following cylinder between activated and deactivated states; and a valve stop mechanism controller which sets the first exhaust valve and the first intake valve to the deactivated state and the second exhaust valve and the second intake valve to the activated state in the low-speed, low-load operating range, and sets the first exhaust valve and the first intake valve to the activated state and the second exhaust valve and the second intake valve to the deactivated state in the high-load, high-speed operating range.

3. The control device for the spark-ignition engine according to claim 1, wherein the engine is made switchable between special operation mode in which combustion is made in said two-cylinder interconnect configuration and normal operation mode in which combustion is made with the intake ports and the exhaust ports of the individual cylinders working independently of one another according to engine operating conditions, said control device further comprising:

an intake air pulsation detector for detecting intake air pulsations;

wherein said control device judges at switching of the engine operation mode whether the fresh air and gas flow paths have been switched by the flow path switcher with reference to a sensing signal output from the intake air pulsation detector and performs air-fuel ratio control operation corresponding to the operation mode selected after switching of the flow paths following a point in time when the switching of the flow paths has been detected.

4. The control device for the spark-ignition engine according to claim 3, wherein the control device judges that the switching of the flow paths has been completed at a point in time when a sudden change in the period of intake air pulsations is verified with reference to a sensing signal output from an intake air quantity detector for detecting the amount of intake air.

5. The control device for the spark-ignition engine according to claim 4, wherein the control device judges at the switching of the engine operation mode that the switching of the flow paths from the two-cylinder interconnect configuration to the independent cylinder configuration has been done when it is verified that the period of intake air pulsations has become shorter.

6. The control device for the spark-ignition engine according to claim 3, wherein the intake and exhaust flow paths are changed by varying the amount of valve lift determined by a valve actuating mechanism provided to each cylinder.

7. The control device for the spark-ignition engine according to claim 3, wherein multiple pairs of the preceding and following cylinders of which intake and exhaust strokes overlap with each other are provided, and the control device performs the air-fuel ratio control operation corresponding to the operation mode selected after the switching of the flow paths in all the pairs of the preceding and following cylinders following a point in time when the switching of the flow paths has been first verified in one of the multiple pairs of the multiple pairs of the preceding and following cylinders.

8. The control device for the spark-ignition engine according to claim 3, wherein the control device judges that the flow paths have been switched at a point in time when a switching signal has been output to the flow path switcher following a change in the engine operating conditions and the occurrence of a change in intake air pulsations has been verified with reference to the sensing signal output from the intake air pulsation detector.

9. The control device for the spark-ignition engine according to claim 8, wherein the control device begins preparation for executing the air-fuel ratio control operation after the switching of the engine operation mode at a point in time when it is verified that the flow path switching signal has been output to the flow path switcher.

10. A control device for a multicylinder spark-ignition engine of which individual cylinders go through successive cycles of intake, compression, expansion and exhaust strokes with specific phase delays, in which fresh air and gas flow paths are connected to form a two-cylinder interconnect configuration at least in a low-load, low-speed operating range such that, in a pair of preceding and following cylinders whose exhaust and intake strokes overlap each other, burned gas discharged from the preceding cylinder which is currently in the exhaust stroke is introduced directly into the following cylinder which is currently in the intake stroke through an intercylinder gas channel and gas discharged from only the following cylinder is led to an exhaust passage provided with a three-way catalyst, said control device comprising:

a controller for controlling fuel supply to the individual cylinders in such a manner that combustion in the preceding cylinder is made under lean mixture conditions at an air-fuel ratio larger than the stoichiometric air-fuel ratio by a specific amount, fuel for the following cylinder is supplied in an amount corresponding to the burned gas which was generated by combustion in the preceding cylinder, and a whole amount of which is supplied to the following cylinder and combustion in the following cylinder is made under conditions of the stoichiometric air-fuel ratio when the engine is in the two-cylinder interconnect configuration;

an exhaust gas concentration detector disposed in the exhaust passage provided with the three-way catalyst for detecting the stoichiometric air-fuel ratio; and an exhaust gas concentration detector disposed in the intercylinder gas channel for detecting a lean mixture state;

wherein said controller feedback-controls the amounts of fuel injected into the individual cylinders based on values detected by the individual exhaust gas concentration detectors in such a manner that the air-fuel ratio in the preceding cylinder becomes larger than the stoichiometric air-fuel ratio by a specific amount and the air-fuel ratio in the following cylinder becomes equal to the stoichiometric air-fuel ratio when the engine is in the two-cylinder interconnect configuration.

11. A control device for a multicylinder spark-ignition engine of which individual cylinders go through successive cycles of intake, compression, expansion and exhaust strokes with specific phase delays, in which fresh air and gas flow paths are connected to form a two-cylinder interconnect configuration at least in a low-load, low-speed operating range such that, in a pair of preceding and following cylinders whose exhaust and intake strokes overlap each other, burned gas discharged from the preceding cylinder which is currently in the exhaust stroke is introduced directly into the following cylinder which is currently in the intake stroke through an intercylinder gas channel and gas discharged from only the following cylinder is led to an exhaust passage provided with a three-way catalyst, said control device comprising:

a controller for controlling fuel supply to the individual cylinders in such a manner that combustion in the preceding cylinder is made under lean mixture conditions at an air-fuel ratio larger than the stoichiometric air-fuel ratio by a specific amount, fuel for the following cylinder is supplied in an amount corresponding to the burned gas which was generated by combustion in the preceding cylinder, and a whole amount of which is supplied to the following cylinder and combustion in the following cylinder is made under conditions of the stoichiometric air-fuel ratio when the engine is in the two-cylinder interconnect configuration, said engine having a fuel injector for injecting fuel directly into the preceding cylinder, wherein said controller causes stratified charge combustion to occur in the preceding cylinder by injecting the fuel during its compression stroke from the fuel injector while producing a lean mixture state therein when the engine is in the two-cylinder interconnect configuration.

12. The control device for the spark-ignition engine according to claim 11, said engine further having a fuel injector for injecting fuel directly into the following cylinder, wherein said controller causes stratified charge combustion to occur in the following cylinder by injecting at least part of the fuel during its compression stroke while producing the stoichiometric air-fuel ratio therein when the engine is in the two-cylinder interconnect configuration.

13. The control device for the spark-ignition engine according to claim 11, wherein said controller causes uniform charge combustion to occur in the following cylinder while producing the stoichiometric air-fuel ratio therein when the engine is in the two-cylinder interconnect configuration.

14. The control device for the spark-ignition engine according to claim 11, said engine further having a fuel injector disposed in an intake passage of the following cylinder for injecting fuel directly into the following cylinder, the intake passage constituting the intercylinder gas channel, wherein said controller causes uniform charge combustion to occur in the following cylinder by injecting the fuel during its intake stroke while producing the stoichiometric air-fuel ratio therein when the engine is in the two-cylinder interconnect configuration.

15. The control device for the spark-ignition engine according to claim 11, wherein the air-fuel ratio in the preceding cylinder is made approximately equal to twice the stoichiometric air-fuel ratio or larger when the engine is in the two-cylinder interconnect configuration.

16. A control device for a multicylinder spark-ignition engine of which individual cylinders go through successive cycles of intake, compression, expansion and exhaust strokes with specific phase delays, in which fresh air and gas flow paths are connected to form a two-cylinder interconnect configuration at least in a low-load, low-speed operating range such that, in a pair of preceding and following cylinders whose exhaust and intake strokes overlap each other, burned gas discharged from the preceding cylinder which is currently in the exhaust stroke is introduced directly into the following cylinder which is currently in the intake stroke through an intercylinder gas channel and gas discharged from only the following cylinder is led to an exhaust passage provided with a three-way catalyst, said control device comprising:
 a controller for controlling fuel supply to the individual cylinders in such a manner that combustion in the preceding cylinder is made under lean mixture conditions at an air-fuel ratio larger than the stoichiometric air-fuel ratio by a specific amount, fuel for the following cylinder is supplied in an amount corresponding to the burned gas which was generated by combustion in the preceding cylinder, and a whole amount of which is supplied to the following cylinder and combustion in the following cylinder is made under conditions of the stoichiometric air-fuel ratio when the engine is in the two-cylinder interconnect configuration;
 wherein the engine is controlled in a manner that makes combustion by compressed self-ignition in the following cylinder at least in part of an operating range in which the engine is in the two-cylinder interconnect configuration, and wherein, when the engine is in the operating range in which the two-cylinder interconnect configuration is formed and the engine is still in a specific low-temperature state in which the temperature in the following cylinder is judged to have not reached a level suitable for combustion by compressed self-ignition, the air-fuel ratio in the following cylinder is made substantially equal to the stoichiometric air-fuel ratio to make combustion by forced ignition therein, whereas the air-fuel ratio in the preceding cylinder is made larger than a case where combustion is made by compressed self-ignition in the following cylinder.

17. The control device for the spark-ignition engine according to claim 16, wherein the air-fuel ratio in the preceding cylinder is set such that the excess-air factor becomes substantially equal to or larger than 3 and stratified charge combustion is made in the preceding cylinder when the engine is in said specific low-temperature state.

18. The control device for the spark-ignition engine according to claim 16, wherein the air-fuel ratio in the preceding cylinder is made relatively large in a specific low-load region of the operating range in which the engine is in the two-cylinder interconnect configuration compared to a higher-load region.

19. The control device for the spark-ignition engine according to claim 16, wherein control operation for said specific low-temperature state is performed when the engine is at or close to its idling speed.

20. A control device for a four-cycle multicylinder spark-ignition engine of which individual cylinders provided with spark plugs go through successive cycles of intake, compression, expansion and exhaust strokes with specific phase delays, said engine having an intercylinder gas channel interconnecting a pair of preceding and following cylinders whose exhaust and intake strokes overlap each other for introducing burned gas discharged from the preceding cylinder which is currently in the exhaust stroke into the following cylinder which is currently in the intake stroke;
 wherein said preceding cylinder is provided with an intake port connected to an intake passage, a first exhaust port connected to an exhaust passage and a second exhaust port connected to the intercylinder gas channel, while said following cylinder is provided with a first intake port connected to the intake passage, a second intake port connected to the intercylinder gas channel and an exhaust port connected to the exhaust passage;
 wherein first and second exhaust valves for opening and closing the first and second exhaust ports of the preceding cylinder as well as first and second intake valves for opening and closing the first and second intake ports of the following cylinder are made individually switchable between activated and deactivated states;
 wherein a two-cylinder interconnect configuration is formed in a low-load, low-speed operating range such that burned gas discharged from the preceding cylinder which is currently in the exhaust stroke is introduced into the following cylinder which is currently in the intake stroke by bringing the second exhaust valve and the second intake valve to the activated state;
 wherein exhaust gas discharged from the exhaust port of the following cylinder is caused to go through a theeway catalyst provided in the exhaust passage when the engine is in the two-cylinder interconnect configuration;
 said control device comprising:
 a controller for controlling fuel supply to the individual cylinders in such a manner that combustion in the preceding cylinder is made under lean mixture conditions at an air-fuel ratio larger than the stoichiometric air-fuel ratio by a specific amount, fuel for the following cylinder is supplied to the burned gas generated by combustion in the preceding cylinder, and combustion in the following cylinder is made under conditions of the stoichiometric air-fuel ratio when the engine is in the two-cylinder interconnect configuration.

21. The control device for the spark-ignition engine according to claim 20, wherein the engine is made switchable between special operation mode in which combustion is made in said two-cylinder interconnect configuration and normal operation mode in which combustion is made under conditions in which intake and exhaust operations of the individual cylinders are performed independently of one another with the first exhaust valve and the first intake valve set to the activated state and the second exhaust valve and the second intake valve set to the deactivated state according to engine operating conditions, said control device further comprising:

an intake air pulsation detector for detecting intake air pulsations;

wherein said control device judges at switching of the engine operation mode whether fresh air and gas flow paths have been switched by a flow path switcher with reference to a sensing signal output from the intake air pulsation detector and performs air-fuel ratio control operation corresponding to the operation mode selected after switching of the flow paths following a point in time when the switching of the flow paths has been detected.

22. The control device for the spark-ignition engine according to claim 20, said controller including:

a total fuel injection quantity calculator for calculating the sum of the amounts of fuel to be injected into the preceding cylinder and the following cylinder based on the amount of intake air introduced into the preceding cylinder in such a manner that combustion in the preceding cylinder is made under said lean mixture conditions at the air-fuel ratio larger than the stoichiometric air-fuel ratio by the specific amount and combustion in the following cylinder is made under said conditions of the stoichiometric air-fuel ratio when the engine is in the two-cylinder interconnect configuration;

a ratio setter for setting a ratio of the air-fuel ratio for the preceding cylinder to the air-fuel ratio for the following cylinder according to engine operating conditions in such a manner that a balance is achieved between a torque generated by the preceding cylinder and a torque generated by the following cylinder when the engine is in the two-cylinder interconnect configuration; and a final fuel injection quantity calculator for calculating final amounts of fuel to be injected into the preceding cylinder and the following cylinder based on the ratio of the air-fuel ratios set by the ratio setter and the sum of the amounts of fuel to be injected calculated by the total fuel injection quantity calculator.

23. The control device for the spark-ignition engine according to claim 20, wherein the engine is so controlled as to make combustion by compressed self-ignition in the following cylinder at least in part of an operating range, and wherein when the engine is in the operating range in which the two-cylinder interconnect configuration is formed and the engine is still in a specific low-temperature state in which the temperature in the following cylinder is judged to have not reached a level suitable for combustion by compressed self-ignition, the air-fuel ratio in the following cylinder is made substantially equal to the stoichiometric air-fuel ratio to make combustion by forced ignition therein, whereas the air-fuel ratio in the preceding cylinder is made larger than a case where combustion is made by compressed self-ignition in the following cylinder.

24. A control device for a multicylinder spark-ignition engine of which individual cylinders go through successive cycles of intake, compression, expansion and exhaust strokes with specific phase delays, in which fresh air and gas flow paths are connected to form a two-cylinder interconnect configuration at least in a low-load, low-speed operating range such that, in a pair of preceding and following cylinders whose exhaust and intake strokes overlap each other, burned gas discharged from the preceding cylinder which is currently in the exhaust stroke is introduced directly into the following cylinder which is currently in the intake stroke through an intercylinder gas channel and gas discharged from only the following cylinder is led to an exhaust passage provided with a three-way catalyst, said control device comprising:

a control unit for controlling the engine;

wherein said control unit controls fuel supply to the individual cylinders in such a manner that combustion in the preceding cylinder is made under lean mixture conditions at an air-fuel ratio larger than the stoichiometric air-fuel ratio by a specific amount, fuel for the following cylinder is supplied in an amount corresponding to the burned gas which was generated by combustion in the preceding cylinder, and a whole amount of which is supplied to the following cylinder and combustion in the following cylinder is made under conditions of the stoichiometric air-fuel ratio when the engine is in the two-cylinder interconnect configuration, and wherein the engine is made switchable between special operation mode in which combustion is made in said two-cylinder interconnect configuration and normal operation mode in which combustion is made with intake ports and exhaust ports of the individual cylinders working independently of one another according to engine operating conditions; and an airflow sensor for detecting intake air pulsations;

wherein said control unit judges at switching of the engine operation mode whether the fresh air and gas flow paths have been switched by a flow path switcher with reference to a sensing signal output from the airflow sensor and performs air-fuel ratio control operation corresponding to the operation mode selected after switching of the flow paths following a point in time when the switching of the flow paths has been detected.

25. The control device for the spark-ignition engine according to claim 24, wherein said control unit for controlling the engine;

calculates the sum of the amounts of fuel to be injected into the preceding cylinder and the following cylinder based on the amount of intake air introduced into the preceding cylinder in such a manner that combustion in the preceding cylinder is made under said lean mixture conditions at the air-fuel ratio larger than the stoichiometric air-fuel ratio by the specific amount and combustion in the following cylinder is made under said conditions of the stoichiometric air-fuel ratio when the engine is in the two-cylinder interconnect configuration;

sets a ratio of the air-fuel ratio for the preceding cylinder to the air-fuel ratio for the following cylinder according to engine operating conditions in such a manner that a balance is achieved between a torque generated by the preceding cylinder and a torque generated by the following cylinder when the engine is in the two-cylinder interconnect configuration; and calculates final amounts of fuel to be injected into the preceding cylinder and the following cylinder based on said ratio of the air-fuel ratios and said sum of the amounts of fuel to be injected.

26. A control device for a multicylinder spark-ignition engine of which individual cylinders go through successive cycles of intake, compression, expansion and exhaust strokes with specific phase delays, in which fresh air and gas flow paths are connected to form a two-cylinder interconnect configuration at least in a low-load, low-speed operating range such that, in a pair of preceding and following cylinders whose exhaust and intake strokes overlap each other, burned gas discharged from the preceding cylinder which is currently in the exhaust stroke is introduced directly into the following cylinder which is currently in the intake stroke through an intercylinder gas channel and gas discharged from only the following cylinder is led to an exhaust passage provided with a three-way catalyst, said control device comprising:

a controller for controlling fuel supply to the individual cylinders in such a manner that combustion in the preceding cylinder is made under lean mixture conditions at an air-fuel ratio larger than the stoichiometric air-fuel ratio by a specific amount, fuel for the following cylinder is supplied in an amount corresponding to the burned gas which was generated by combustion in the preceding cylinder, and a whole amount of which is supplied to the following cylinder and combustion in the following cylinder is made under conditions of the stoichiometric air-fuel ratio when the engine is in the two-cylinder interconnect configuration;

wherein said control unit for controlling the engine controls the engine in a manner that makes combustion by compressed self-ignition in the following cylinder at least in part of an operating range in which the engine is in the two-cylinder interconnect configuration, and wherein, when the engine is in the operating range in which the two-cylinder interconnect configuration is formed and the engine is still in a specific low-temperature state in which the temperature in the following cylinder is judged to have not reached a level suitable for combustion by compressed self-ignition, the air-fuel ratio in the following cylinder is made substantially equal to the stoichiometric air-fuel ratio to make combustion by forced ignition therein, whereas the air-fuel ratio in the preceding cylinder is made larger than a case where combustion is made by compressed self-ignition in the following cylinder.

* * * * *